United States Patent
Kamio et al.

(10) Patent No.: US 6,992,451 B2
(45) Date of Patent: Jan. 31, 2006

(54) MOTOR CONTROL APPARATUS OPERABLE IN FAIL-SAFE MODE

(75) Inventors: Shigeru Kamio, Nagoya (JP); Yasuhiro Nakai, Kariya (JP)

(73) Assignee: DENSO Corporation, Kariya (JP)

( * ) Notice: Subject to any disclaimer, the term of this patent is extended or adjusted under 35 U.S.C. 154(b) by 80 days.

(21) Appl. No.: 10/674,437

(22) Filed: Oct. 1, 2003

(65) Prior Publication Data

US 2004/0066165 A1   Apr. 8, 2004

(30) Foreign Application Priority Data

Oct. 7, 2002   (JP) ............................. 2002-293269
Mar. 19, 2003   (JP) ............................. 2003-074824

(51) Int. Cl.
*H02P 3/18* (2006.01)
*H02P 5/28* (2006.01)
*H02P 7/36* (2006.01)

(52) U.S. Cl. ...................... 318/434; 318/254; 318/706; 318/707

(58) Field of Classification Search ................ 318/138, 318/254, 430, 434, 696, 701, 706, 707, 685; 361/23, 24, 31, 33
See application file for complete search history.

(56) References Cited

U.S. PATENT DOCUMENTS

| | | | | |
|---|---|---|---|---|
| 4,707,650 A | * | 11/1987 | Bose | 318/685 |
| 4,772,839 A | * | 9/1988 | MacMinn et al. | 318/696 |
| 4,896,088 A | * | 1/1990 | Jahns | 318/696 |
| 4,896,089 A | * | 1/1990 | Kliman et al. | 318/701 |
| 5,111,095 A | * | 5/1992 | Hendershot | 310/168 |
| 5,140,243 A | * | 8/1992 | Lyons et al. | 318/701 |
| 5,446,354 A | * | 8/1995 | Hiruma | 318/439 |
| 5,737,164 A | * | 4/1998 | Ferreira et al. | 361/31 |
| 5,783,940 A | * | 7/1998 | Kolomeitsev | 324/207.25 |
| 5,789,883 A | * | 8/1998 | Gilman | 318/254 |
| 6,064,172 A | * | 5/2000 | Kuznetsov | 318/716 |
| 6,153,956 A | * | 11/2000 | Branecky | 310/68 B |
| 6,448,736 B1 | * | 9/2002 | Lajsner et al. | 318/701 |
| 6,653,811 B2 | * | 11/2003 | Branecky | 318/701 |

FOREIGN PATENT DOCUMENTS

JP   2001-271917   10/2001

* cited by examiner

*Primary Examiner*—Marlon T. Fletcher
*Assistant Examiner*—Eduardo Colon Santana
(74) *Attorney, Agent, or Firm*—Nixon & Vanderhye, P.C.

(57) ABSTRACT

In a motor feedback control, the current supply phase is set on the basis of the encoder count of an encoder and the current supply phase is also set on the basis of the encoder count by time-synchronous processing. In the feedback control, a maximum value or a minimum value of encoder counts is stored with updating. The rotation reversing is determined by comparing the present encoder count with the maximum value or the minimum value. If reversing is detected, the reverse rotation is stopped by fixing the current supply phase. If a disconnection is detected in windings of one phase in starting a motor feedback control, one of the other two phases for which no disconnection is detected is set to the first current supply phase.

16 Claims, 36 Drawing Sheets

ENCODER COUNTER

READ A(i), B(i) — 301

ΔN=f(A(i), B(i), A(i-1), B(i-1)) — 302

Ncnt=Ncnt+ΔN — 303

A(i)=A(i-1)
B(i)=B(i-1) — 304

END

| B (i) | A (i) | B (i-1) | A (i-1) | ΔN |
|---|---|---|---|---|
| 0 | 1 | 0 | 0 | -1 |
| 1 | 0 | 0 | 0 | +1 |
| 0 | 0 | 0 | 0 | 0 |
| 1 | 1 | 0 | 0 | 0 |
| 1 | 1 | 0 | 1 | -1 |
| 0 | 0 | 0 | 1 | +1 |
| 0 | 1 | 0 | 1 | 0 |
| 1 | 0 | 0 | 1 | 0 |
| 0 | 0 | 1 | 0 | -1 |
| 1 | 1 | 1 | 0 | +1 |
| 1 | 0 | 1 | 0 | 0 |
| 0 | 1 | 1 | 0 | 0 |
| 1 | 0 | 1 | 1 | -1 |
| 0 | 1 | 1 | 1 | +1 |
| 1 | 1 | 1 | 1 | 0 |
| 0 | 0 | 1 | 1 | 0 |

| Mptn%12 | 0 | 1 | 2 | 3 | 4 | 5 | 6 | 7 | 8 | 9 | 10 | 11 |
|---|---|---|---|---|---|---|---|---|---|---|---|---|
| CURRENT SUPPLY | VW | VW | W | W | UW | UW | U | U | UV | UV | V | V |

| B (i) | A (i) | B (i-1) | A (i-1) | ΔN |
|---|---|---|---|---|
| 0 | 1 | 0 | 0 | -1 |
| 1 | 0 | 0 | 0 | +1 |
| 0 | 0 | 0 | 0 | 0 |
| 1 | 1 | 0 | 0 | 0 |
| 1 | 1 | 0 | 1 | -1 |
| 0 | 0 | 0 | 1 | +1 |
| 0 | 1 | 0 | 1 | 0 |
| 1 | 0 | 0 | 1 | 0 |
| 0 | 0 | 1 | 0 | -1 |
| 1 | 1 | 1 | 0 | +1 |
| 1 | 0 | 1 | 0 | 0 |
| 0 | 1 | 1 | 0 | 0 |
| 1 | 0 | 1 | 1 | -1 |
| 0 | 1 | 1 | 1 | +1 |
| 1 | 1 | 1 | 1 | 0 |
| 0 | 0 | 1 | 1 | 0 |

MOTOR CONTROL APPARATUS OPERABLE IN FAIL-SAFE MODE

CROSS REFERENCE TO RELATED APPLICATION

This application is based on and incorporates herein by reference Japanese Patent Applications No. 2002-293269 filed on Oct. 7, 2002 and No. 2003-74824 filed on Mar. 19, 2003.

FIELD OF THE INVENTION

The present invention relates to a motor control apparatus for rotationally driving (rotating) the rotor of a motor to a target position by detecting the rotation position of the rotor and sequentially switching the current supply phase of the motor.

BACKGROUND OF THE INVENTION

Brushless motors such as switched reluctance motors are increasingly demanded because they are inexpensive and simple in structure. Those motors incorporate an encoder for outputting a pulse signal in synchronism with the rotation of the rotor, which is rotated by sequentially switching the current supply phase by counting pulses of a pulse signal of the encoder and detecting the rotation position of the rotor on the basis of the encoder count. Since it is possible to detect the rotation position of the rotor on the basis of the encoder count after starting, motors of this type having an encoder are used as drive sources of various position switching devices in which a position switching control (positioning control) for rotating the rotor to a target position by means of a feedback control system is performed (JP-A-2001-271917).

In such a motor incorporating an encoder, a feedback control is performed in such a manner that the rotor is rotated toward a target position by switching the current supply phase on the basis of the encoder count in synchronism with pulses of a pulse signal of the encoder. When the encoder count has reached a target count that is set in accordance with the target position, the feedback control is finished with a determination that the rotor has reached the target position. The rotor is stopped at the target position.

In the above conventional motor feedback control, the current supply phase is switched in synchronism with pulses of a pulse signal of the encoder. Therefore, if the rotation of the rotor is stopped for a certain reason and the encoder comes to output no pulse signal, a problem occurs that the current supply phase can no longer be switched and hence the rotor cannot be rotated to the target position.

On the other hand, even if a disconnection occurs in the winding of one phase among the three-phase windings, it is determined that the disconnection has occurred in one of the two systems of drive coils to which the winding of the one phase belongs and the feedback control is continued by using only the drive coil of the other system. However, this configuration requires two systems of drive coils and hence is high in manufacturing cost. In addition, where a feedback control is performed by using only one of the two systems of drive coils, the drive torque is made a half of that of the normal case and insufficient drive torque tends to cause loss of synchronism. As a result, a normal feedback control may not be performed. To secure, with only one drive coil, such high drive torque as enables a normal feedback control, a problem arises that a large drive coil is necessary and the motor becomes large-sized.

SUMMARY OF THE INVENTION

It is a first object of the present invention to provide a motor control apparatus which can rotate a rotor to a position that is as close to a target position as possible even if the rotation of the rotor is stopped for a certain reason, and which can stop reverse rotation when it has occurred.

To attain the first object, the invention provides a motor control apparatus in which the current supply phase is set on the basis of the encoder count in synchronism with pulses of a pulse signal of an encoder during a feedback control of a motor and is also set on the basis of the encoder count in a prescribed cycle by time-synchronous processing until the rotor is rotated to a target position. Every time these two current supply phases are set, a current is caused to flow through the winding of the thus-set current supply phase. If the rotation direction of the rotor is reversed on its way to the target position, the rotation reversing is detected. Upon the detection of the rotation reversing, the current supply phase is fixed to a preceding current supply phase.

With this configuration, even if the rotation of the rotor is stopped for a certain reason during a motor feedback control and the encoder comes not to output a pulse signal, a current supply phase can be set by time-synchronous processing in a prescribed cycle on the basis of an encoder count at that time point. Therefore, the current supply phase can be switched even in a state that the rotation of the rotor is stopped, and the rotor can be rotated to a position that is as close to a target position as possible. In addition, if the rotation direction of the rotor is reversed on its way to the target position, the reverse rotation can be stopped by detecting the reversing and fixing the current supply phase.

It is a second object of the invention to provide a motor control apparatus which can continue a feedback control using the windings of the other phases even if a disconnection occurs in the winding of one phase, having an inexpensive configuration.

To attain the second object, the invention provides a motor control apparatus in which a possible disconnection in the winding of each phase of a motor is detected for each phase. If a disconnection is detected in the winding of one phase when a feedback control is started, at least first two current supply phases are set to phases for which no disconnection is detected.

With this configuration, even if the winding of one phase is disconnected, rotation of the rotor can be started by using the windings of the other phases to perform a feedback control.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS (First Embodiment)

A first embodiment in which the present invention is applied to a position switching device of an automatic transmission of a vehicle will be described with reference to FIGS. 1–48.

Figure 1:
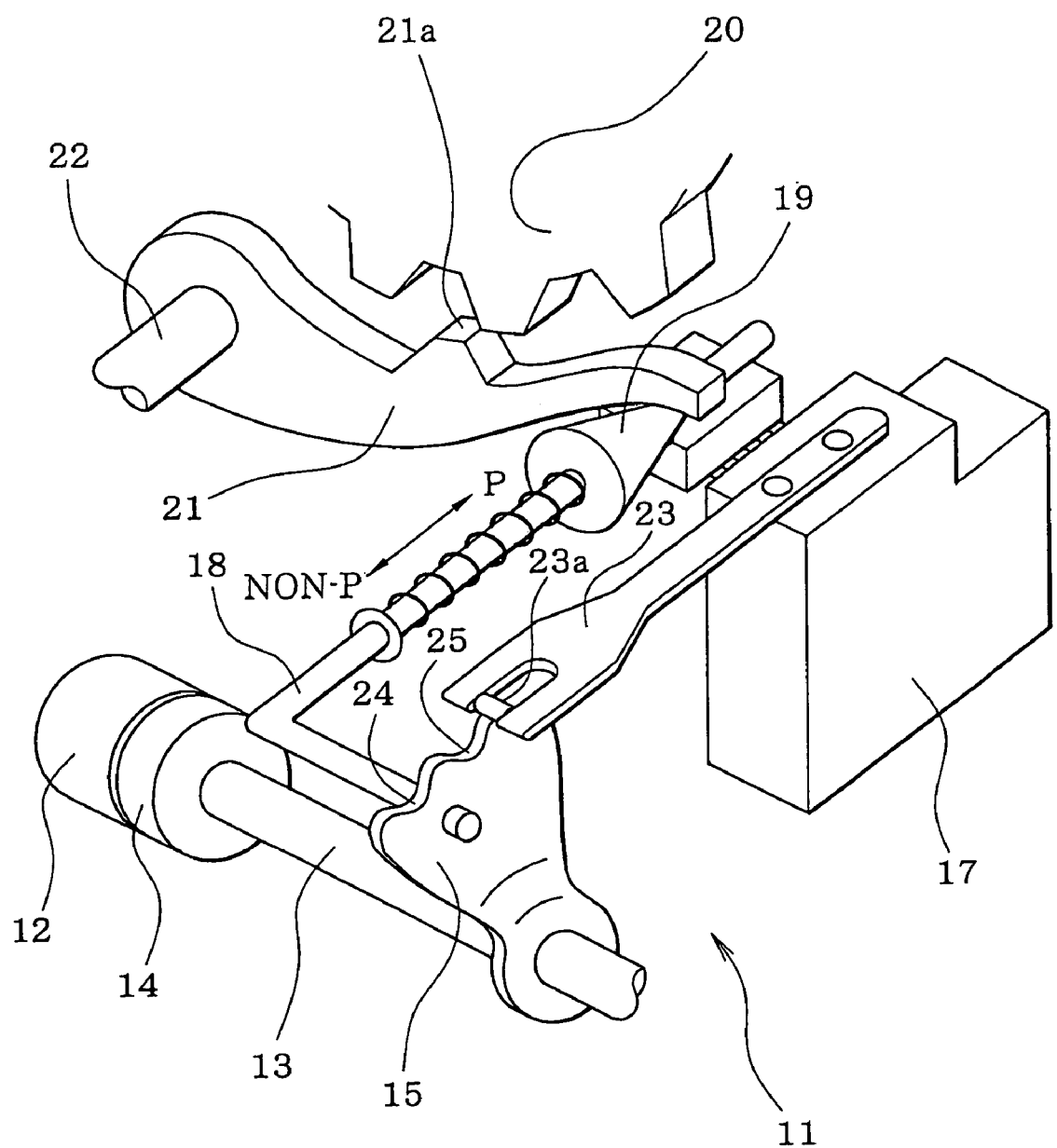
FIG. 1 is a perspective view of a position switching device according to a first embodiment of the invention.

Referring first to FIG. 1, a position switching mechanism 11 is indicated with numeral 11. A motor 12 as a drive source of the position switching mechanism 11 is a switched reluctance motor, for example, incorporates a speed-reducing mechanism 26 (FIG. 4), and is equipped with an output shaft sensor 14 for detecting a rotation position of an output shaft 13 of the speed-reducing mechanism 26. A detent lever 15 is fixed to the output shaft 13.

Figure 4:
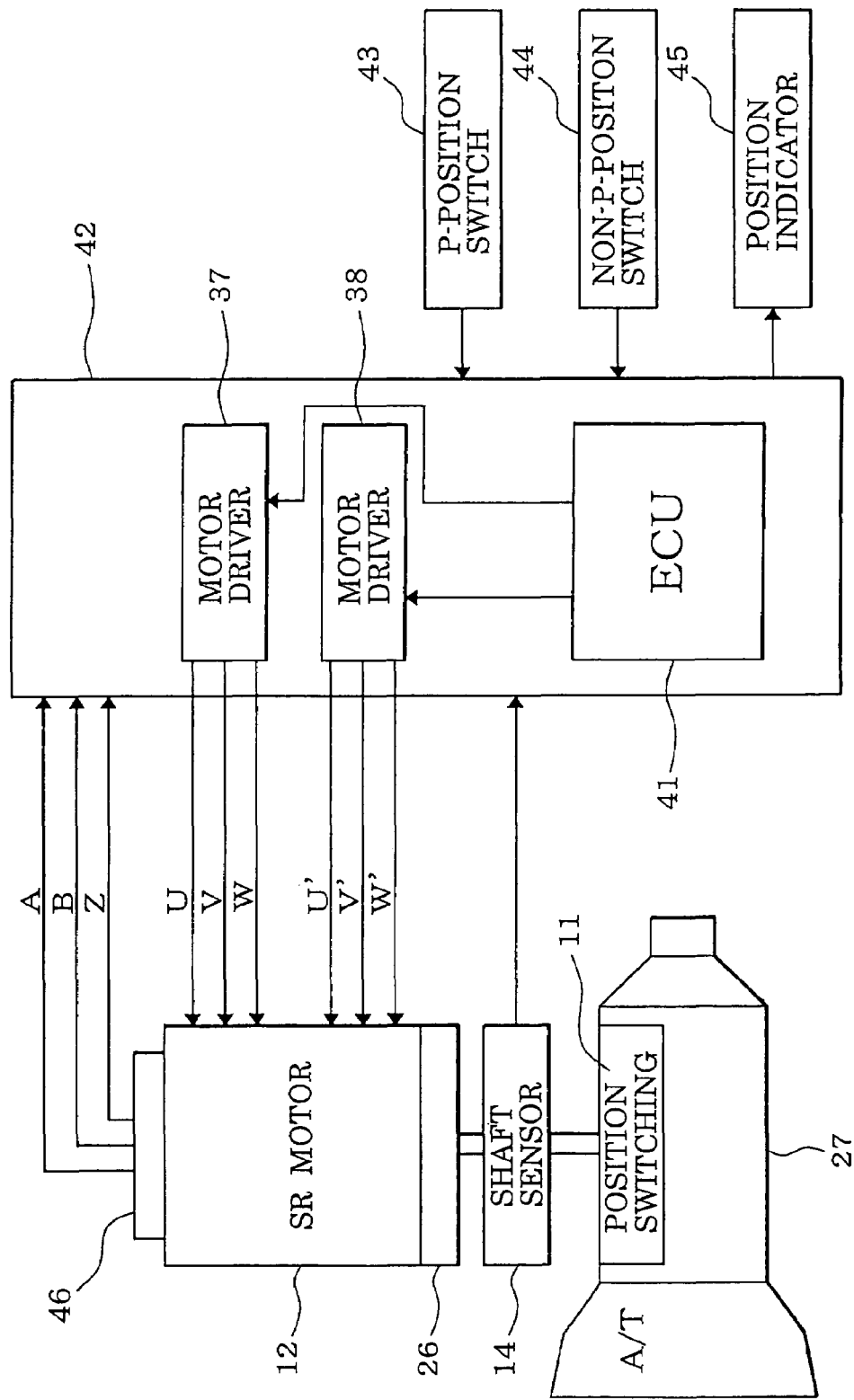
FIG. 4 schematically shows the entire configuration of a control system of the position switching device.

An L-shaped parking rod 18 is fixed to the detent lever 15. A conical body 19 that is provided at the tip of the parking rod 18 is in contact with a lock lever 21. The lock lever 21 is moved in the vertical direction in accordance with the position of the conical body 19 and thereby locks or unlocks a parking gear 20. The parking gear 20 is attached to the output shaft of an automatic transmission 27 (FIG. 4). If the parking gear 20 is locked by the lock lever 21, the drive wheels of the vehicle are kept in a rotation-prevented state (i.e., a parking state).

On the other hand, a detent spring 23 for keeping the detent lever 15 at the position of a parking position (hereinafter abbreviated as "P-position") or the other range (hereinafter referred to as "non-P-position") is fixed to a support base 17. The detent lever 15 is kept at the P-position when an engaging portion 23a that is provided at the tip of the detent spring 23 moves into a P-position holding recess 24 of the detent lever 15. The detent lever 15 is kept at the non-P-position when the engaging portion 23a of the detent spring 23 moves into a non-P-position holding recess 25 of the detent lever 15.

In the P-position, the parking rod 18 is moved in such a direction as to approach the lock lever 21, whereby a thick portion of the conical body 19 lifts up the lock lever 21 and a projection 21a of the lock lever 21 moves into a tooth space of the parking gear 20 to lock it. As a result, the output shaft of the automatic transmission 27 (and the drive wheels) is kept in a locked state (i.e., a parking state).

On the other hand, in the non-P-position, the parking rod 18 is moved in such a direction as to move away from the lock lever 21, whereby the thick portion of the conical body 19 moves out of contact with the lock lever 21 and hence the lock lever 21 moves down. As a result, the projection 21a of the lock lever 21 disengages from the parking gear 20 and hence the parking gear 20 is unlocked. The output shaft of the automatic transmission 27 is kept in a rotatable state (i.e., a state that the vehicle is capable of running).

The output shaft sensor 14 is a rotary sensor (e.g., a potentiometer) for outputting a voltage corresponding to a rotation angle of the output shaft 13 of the speed-reducing mechanism 26 of the motor 12. Whether the current shift range (position) is the P-position or the non-P-position can be recognized on the basis of the output voltage of the output shaft sensor 14.

Figure 2:
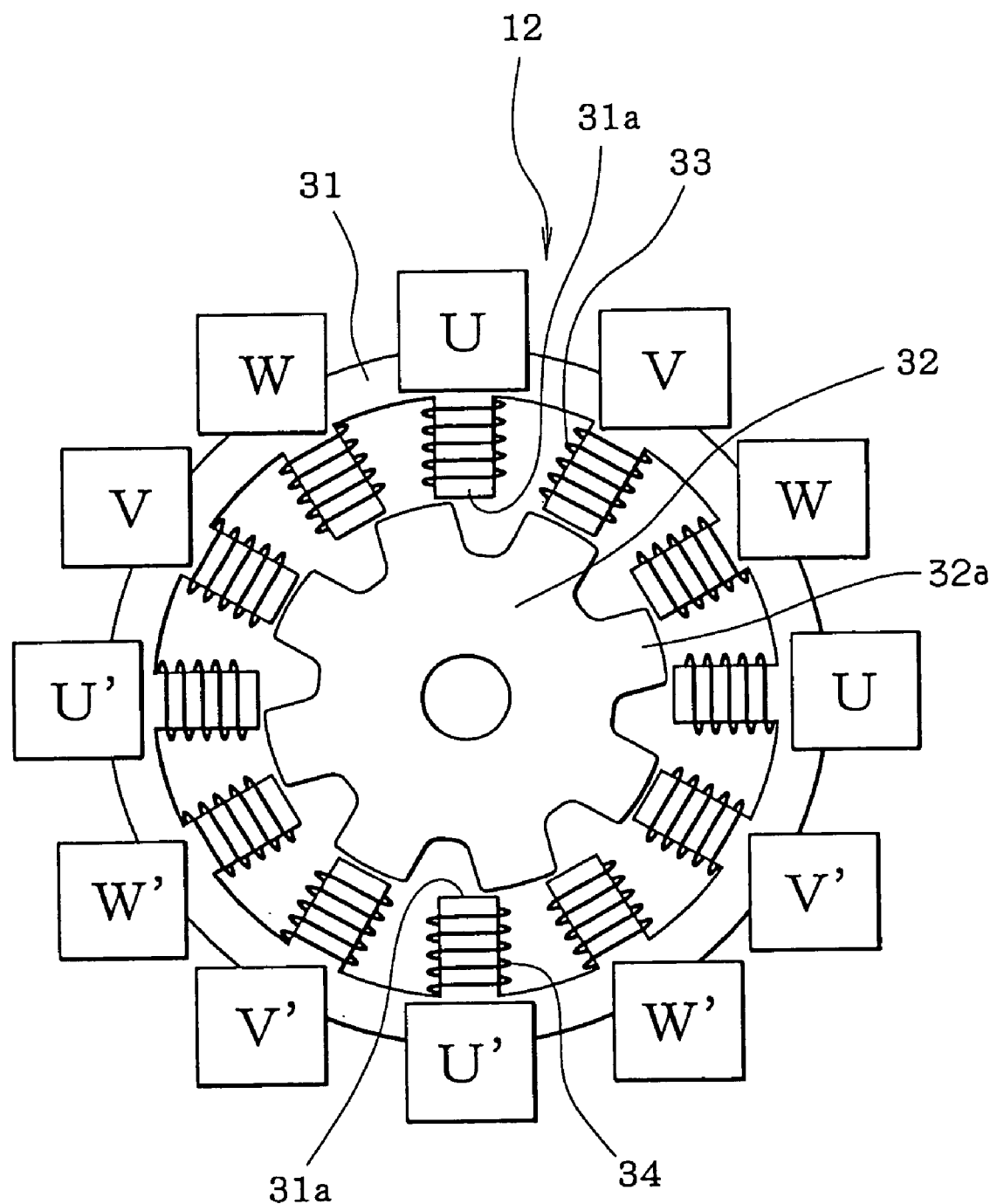
FIG. 2 shows the structure of an SR motor.

Next, the structure of the motor 12 will be described with reference to FIG. 2. In this embodiment, the motor 12 is a switched reluctance motor (hereinafter abbreviated as "SR motor"). The SR motor 12, in which both of a stator 31 and a rotor 32 have salient poles, has an advantage that no permanent magnet is necessary and hence the structure is simple. The inner circumferential surface of a cylindrical body of the stator 31 is formed with 12 salient poles 31a, for example, at regular intervals.

On the other hand, the rotor 32 has eight salient poles 32a, for example, that project outward and are arranged at regular intervals in the circumferential direction. As the rotor 32 rotates, each salient pole 32a of the rotor 32 faces the salient poles 31a of the stator 31 in order with a small gap interposed in between. The 12 salient poles 31a of the stator 31 are wound with a total of six windings 33 of U, V, and W-phases and a total of six windings 34 of U', V', and W'-phases in order. The number of salient poles 31a of the stator 31 and the number of salient poles 32a of the rotor 32 may be changed as appropriate.

Figure 3:
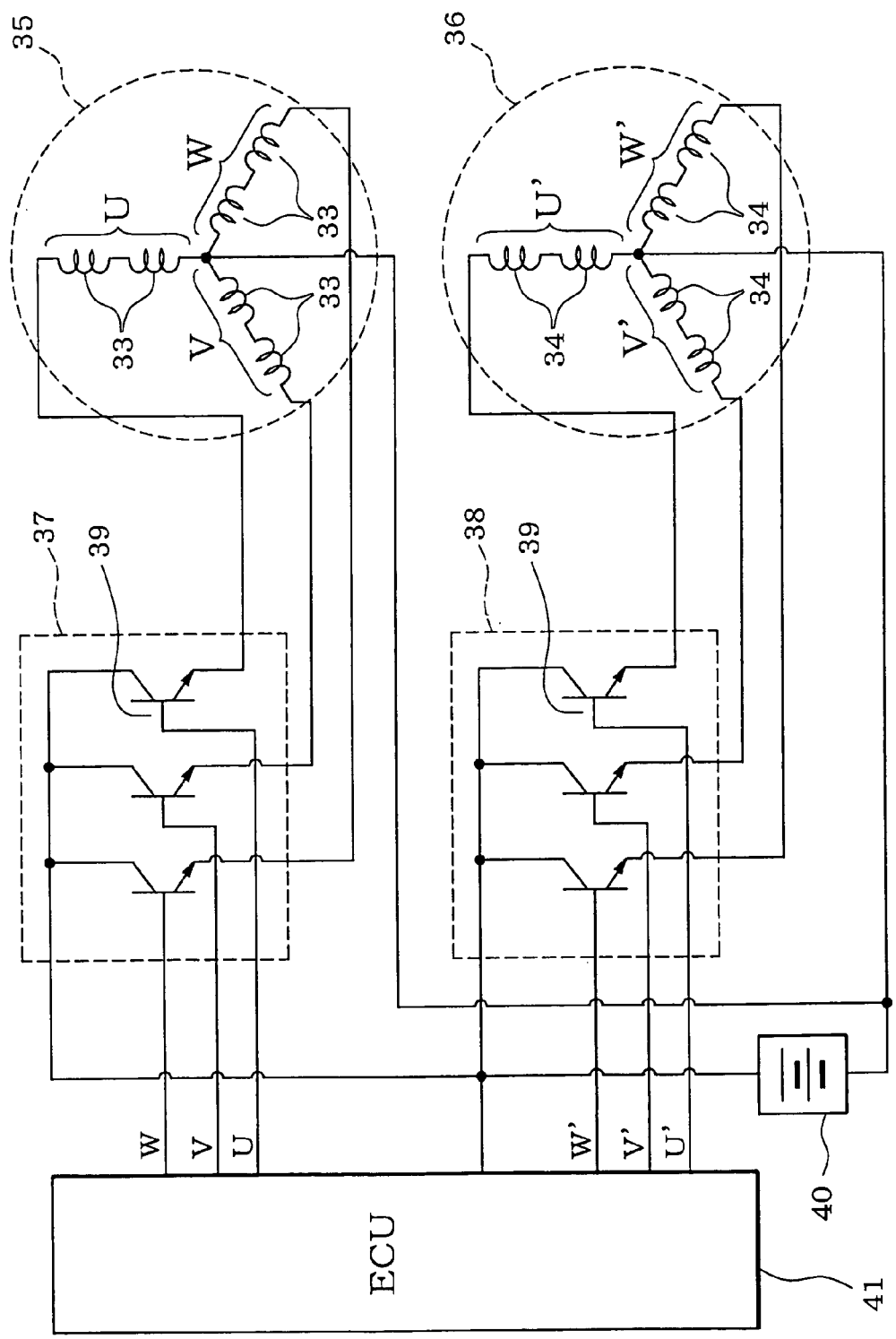
FIG. 3 is a circuit diagram of a circuit for driving the SR motor.

In this embodiment, the windings 33 and 34 are wound on the 12 salient poles 31a of the stator 31 in order of V-phase→W-phase→U-phase→V-phase→W-phase→U-phase→V'-phase→W'-phase→U'-phase→V'-phase→W'-phase→U-phase, for example. As shown in FIG. 3, the six windings 33 of the U, V, and W-phases and the six windings 34 of the U', V', and W'-phases are connected to each other so as to form two systems of motor energizing sections 35 and 36. The one motor energizing section 35 is formed by Y-connecting the six windings 33 of the U, V, and W-phases (the two windings 33 of the same phase are connected to each other in series). The other one motor energizing section 36 is formed by Y-connecting the six windings 34 of the U', V', and W'-phases (the two windings 34 of the same phase are connected to each other in series). In the two motor energizing sections 35 and 36, the windings of the U-phase and the U'-phase are energized at the same time, the windings of the V-phase and the V'-phase are energized at the same time, and the windings of the W-phase and the W'-phase are energized at the same time.

The two motor energizing sections 35 and 36 are driven by separate motor drivers 37 and 38, respectively, with a battery 40 of the vehicle used as a power source. Providing the two systems of motor energizing sections 35 and 36 and the two systems of motor drivers 37 and 38 in this manner makes it possible to rotate the SR motor 12 through the other system even if one system fails. Although the circuit configuration of each of the motor drivers 37 and 38 is of a unipolar driving type in which a switching element 39 such as a transistor is provided for each phase, a bipolar driving type circuit configuration may be employed in which two switching elements are provided for each phase. This configuration is also applicable to a case in which only a single-system motor energizing section and only a single-system motor driver are provided.

The on/off control on the switching elements 39 of the motor drivers 37 and 38 is performed by an ECU 41 (electronic control unit). As shown in FIG. 4, the ECU 41 and the motor drivers 37 and 38 are incorporated in a position switching controller 42. Manipulation signals from a P-position switch 43 for a manipulation of switching to the P-position and a non-P-position switch 44 for a manipulation of switching to the non-P-position are input to the position switching controller 42. A range that has been selected by manipulating the P-position switch 43 or the non-P-position switch 44 is indicated in a range indication section 45 that is provided in an instrument panel (not shown). The P-position switch 43 or the non-P-position switch 44 are momentary switches, for example.

Figure 5:
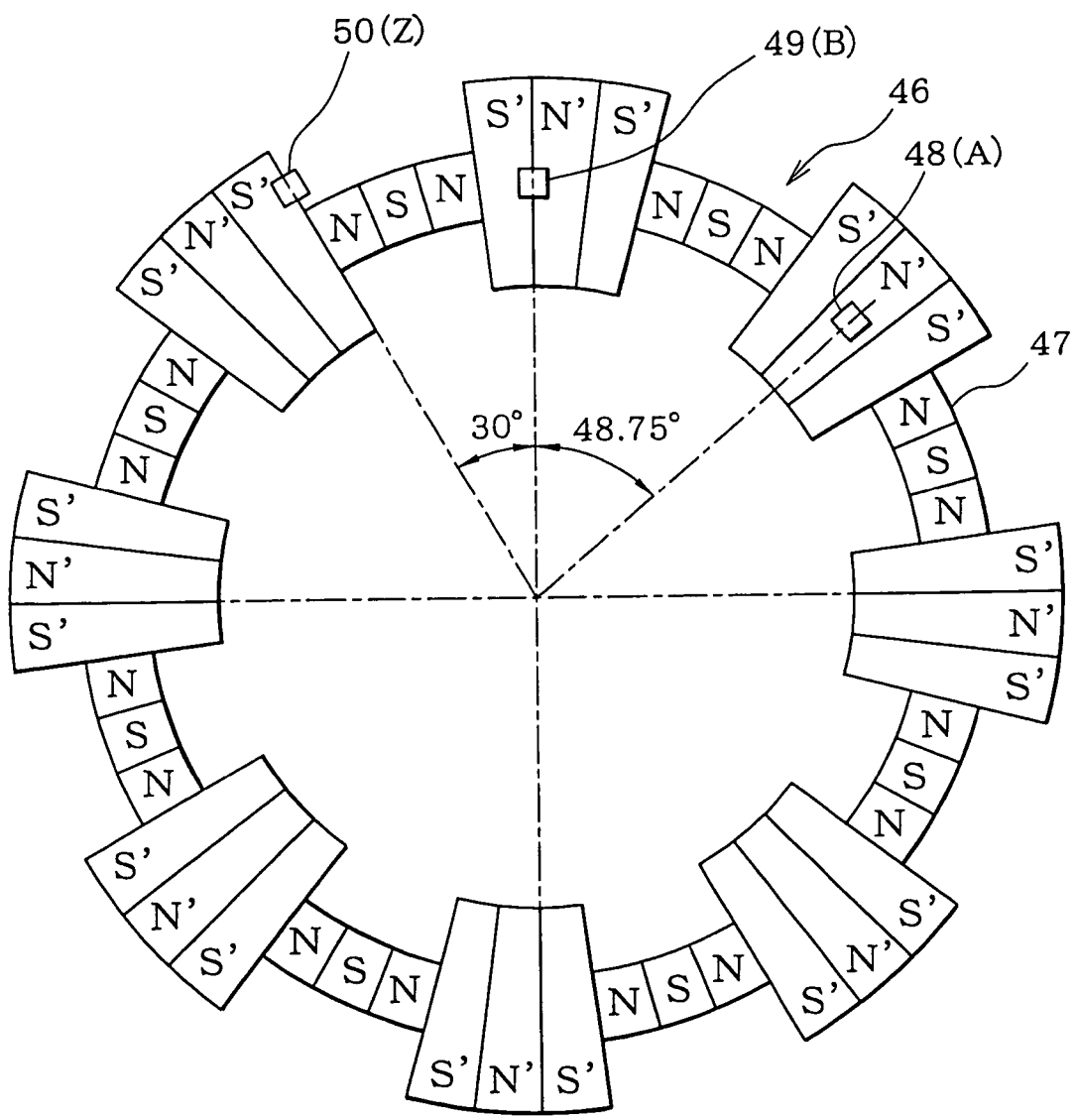
FIG. 5 is a plan view showing the structure of a rotary magnet of an encoder.
Figure 6:
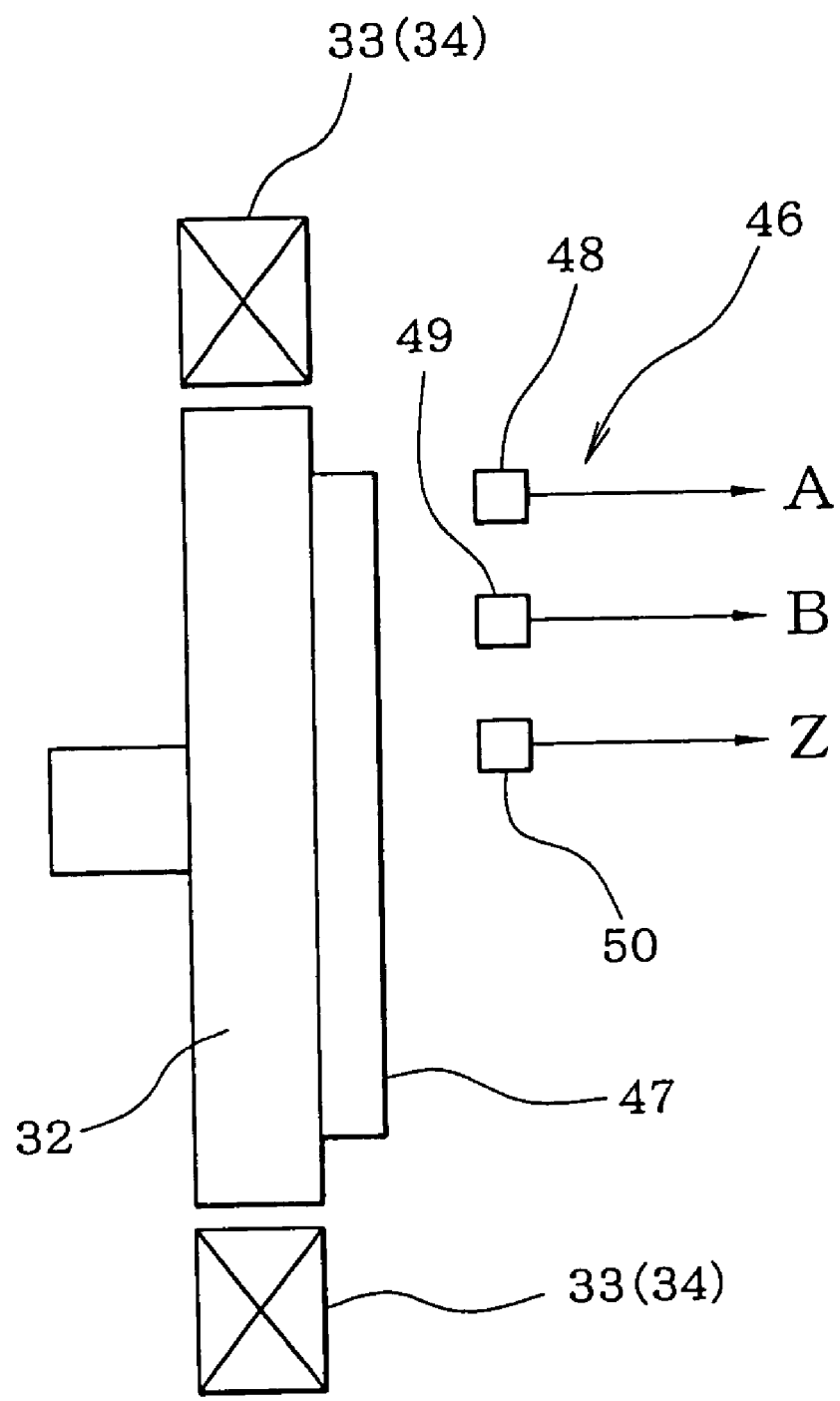
FIG. 6 is a side view of the encoder.

The SR motor 12 is equipped with an encoder 46 for detecting a rotation position of the rotor 32. A specific structure of the encoder 46, which is a magnetic rotary encoder, for example, is as follows. As shown in FIGS. 5 and 6, an annular rotary magnet 47 that is magnetized in such a manner that N poles and S poles are arranged alternately in the circumferential direction with a constant pitch is fixed to a side surface of the rotor 32 concentrically. Three magnetism detecting elements 48–50 such as Hall ICs are opposed to the rotary magnet 47. In this embodiment, the magnetization pitch of the N poles and the S poles of the rotary magnet 47 is set at 7.5°, which is equal to a rotation angle of the rotor 32 corresponding to single current supply on the SR motor 12. As described later, when the current supply phase of the SR motor 12 is switched six times by a one/two-phase current supply method, current supply is effected for all the phases around and the rotor 32 and the rotary magnet 47 rotate together by 7.5°×6=45°. The number of N poles and S poles existing in this rotation angle range 45° of the rotary magnet 47 is six in total.

N poles (N' poles) corresponding to reference rotation positions of the rotor 32 and S poles (S' poles) on both sides of each of those N poles are wider than the other magnetic poles in the radial direction. In this embodiment, in view of the fact that the rotor 32 and the rotary magnet 47 rotate together by 45° while current supply is effected for all the phases of the SR motor 12 around, the wide magnetized portions (N') corresponding to the reference rotation positions of the rotor 32 are formed with a pitch of 45°. Therefore, a total of eight wide magnetized portions (N') corresponding to the reference rotation positions are formed in the entire rotary magnet 47. Alternatively, a single wide magnetized portion (N') corresponding to a reference rotation position may be formed in the entire rotary magnet 47.

Figure 7A:
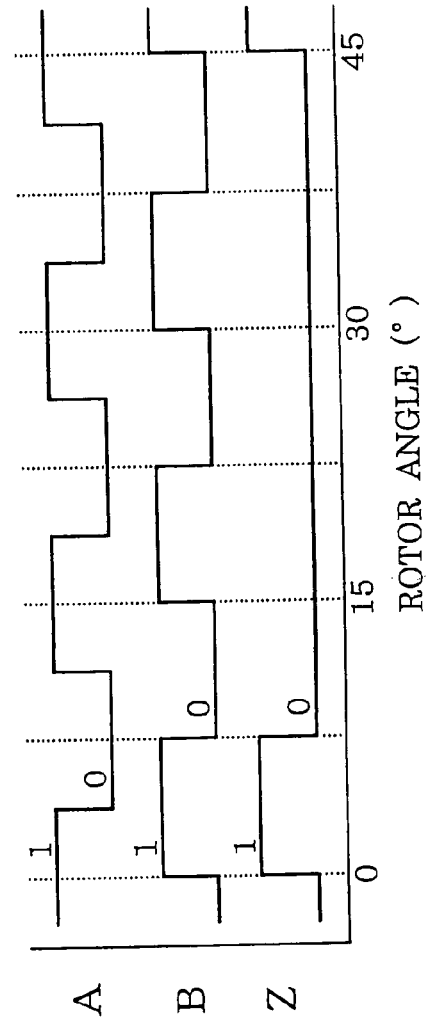
FIG. 7A is a time chart showing output waveforms of the encoder.

The three magnetism detecting elements 48–50 are disposed so as to have the following positional relationships with each other and with the rotary magnet 47. The magnetism detecting element 48 for outputting the A-phase signal and the magnetism detecting element 49 for outputting the B-phase signal are disposed on the same circle at such positions as to be able to face both of the narrow magnetized portions (N and S) and the wide magnetized portions (N' and S') of the rotary magnet 47. On the other hand, the magnetism detecting element 50 for outputting a Z-phase signal is disposed outside or inside the narrow magnetized portions (N and S) of the rotary magnet 47 at such positions as to be able to face only the wide magnetized portions (N' and S'). The interval between the two magnetism detecting elements 48 and 49 for outputting the A-phase signal and the B-phase signal, respectively, is set so that the phase difference between the A-phase signal and the B-phase signal becomes 90° in terms of an electrical angle (3.75° in terms of a mechanical angle) as shown in FIG. 7A.

The term "electrical angle" means an angle that is obtained when the cycle of occurrence of each of the A-phase signal and the B-phase signal is regarded as 360°. The term "mechanical angle" is an angle that is obtained when the angle of one rotation of the rotor 32 is regarded as 360°; that is, the mechanical angle of the phase difference between the A-phase signal and the B-phase signal is an angle by which the rotor 32 rotates in a time from a trailing edge (or rising edge) of the A-phase signal to that of the B-phase signal. The magnetism detecting element 50 for outputting the Z-phase signal is disposed so that the phase difference between the Z-phase signal and the B-phase signal (or A-phase signal) becomes 0.

The outputs of the respective magnetism detecting elements 48–50 are at a high level "1" when they face an N pole (or N' pole) and are at a low level "0" when they face an S pole (or S' pole). The output (Z-phase signal) of the magnetism detecting element 50 is at a high level "1" when it faces a wide N' pole corresponding to a reference rotation position of the rotor 32 and is at a low level when it is located at the other positions.

In this embodiment, the rotor 32 is rotated as the ECU 41 counts both of rising edges and trailing edges of the A-phase signal and the B-phase signal according to an encoder counter routine (described later) and switches the current supply phase of the SR motor 12 on the basis of the encoder count. In this operation, the ECU 41 determines the rotation direction of the rotor 32 on the basis of the order of occurrence of the A-phase signal pulse and the B-phase signal pulse. The ECU 41 increases the encoder count in the case of normal rotation (i.e., rotation in a direction from the P-position to the non-P position), and decreases the encoder count in the case of reverse rotation (i.e., rotation in a direction from the non-P-position to the P-position). With this measure, the correspondence between the encoder count and the rotation position of the rotor 32 is maintained irrespective of whether the rotor 32 is rotating in the normal direction or the reverse direction. Therefore, the rotor 32 can be rotated in either the normal direction or the reverse direction by detecting the rotation position (i.e., rotation angle) of the rotor 32 on the basis of the encoder count and energizes windings 33 or 34 of A-phase corresponding to the detected rotation position.

Figure 7B:
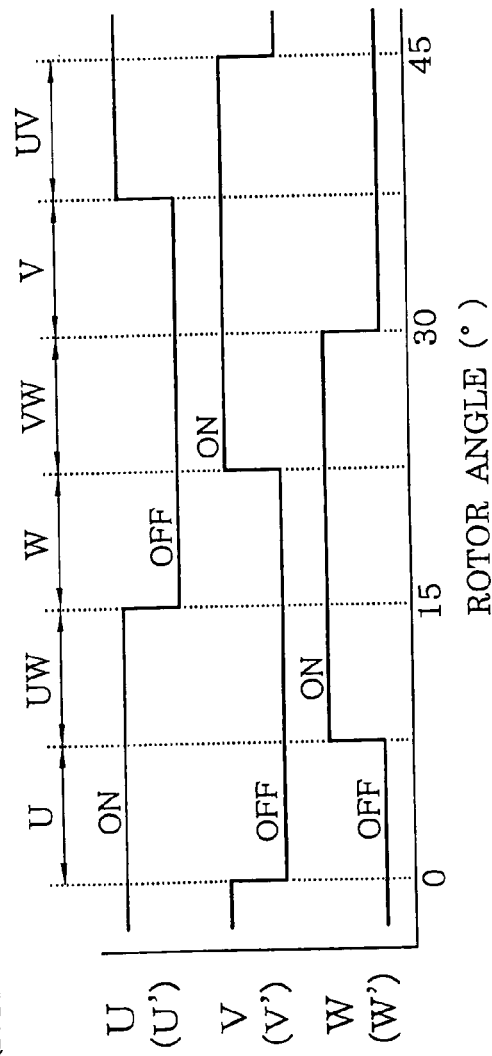
FIG. 7B is a time chart showing a current supply phase switching pattern.

FIGS. 7A and 7B show output waveforms of the encoder 46 and a current supply phase switching pattern in a case that the rotor 32 is rotated in the reverse direction (i.e., the rotation direction from the non-P-position to the P-position), respectively. In either of the case that the rotor 32 is rotating in the reverse direction (i.e., the rotation direction from the non-P-position to the P-position) and the case that the rotor 32 is rotating in the normal direction (i.e., the rotation direction from the P-position to the non-P-position), switching is made between one-phase current supply and two-phase current supply every time the rotor 32 rotates by 7.5°. As the rotor 32 rotates by 45°, current supply is effected for all the phases around in order of U-phase→U and W-phases→W-phase V and W-phases→V-phase→U and V-phases, for example. Every time the current supply phase is switched, the rotor 32 rotates by 7.5° and the magnetic poles of the rotary magnet 47 that face the A-phase signal magnetism detecting element 48 and the B-phase signal magnetism detecting element 49 change from an N pole to an S pole (or an N' pole to an S' pole) or from an S pole to an N pole (or an S' pole to an N' pole), whereby the levels of the A-phase signal and the B-phase signal are inverted alternately.

As a result, the encoder count increases (or decreases) by two every time the rotor rotates by 7.5°. Further, every time current supply is effected for all the phases around and the rotor rotates by 7.5°, the Z-phase magnetism detecting element 50 faces a wide N' pole corresponding to a reference rotation position of the rotor 32 and the Z signal has a high-level value "1." In this specification, an event that the A-phase signal, the B-phase signal, or the Z-phase signal has a high-level value "1" may be referred to as "the A-phase signal pulse, the B-phase signal pulse, or a Z-phase signal pulse is output."

In the SR motor 12 incorporating the encoder 46, a position switching control is performed in the following manner. Every time the instructed shift position (i.e., target position) is switched from the P-position to the non-P-position or in the opposite direction, a feedback control is performed in which the rotor 32 is rotated to the target position by sequentially switching the current supply phase of the SR motor 12 on the basis of the encoder count. When the encoder count has reached a target count that is set in accordance with the target position, the feedback control is finished with a determination that the rotor 32 has reached the target position. The rotor 32 is stopped at the target position.

In such a feedback control of the SR motor 12, the current supply phase is switched in synchronism with pulses of A-phase and B-phase signals of the encoder 46. Therefore, if the rotation of the rotor 32 is stopped for a certain reason during a feedback control and the encoder 46 comes not to output the A-phase and B-phase signals, the current supply phase can no longer be switched by the feedback control and hence the rotor 32 cannot be rotated to the target position.

In view of the above, in this embodiment, the ECU 41 of the position switching controller 42 performs, parallel with a feedback control, from the start of the feedback control of the SR motor 12 to arrival of the rotor 32 to a target position, time-synchronous current supply phase setting processing in which the current supply phase is set on the basis of the encoder count in a prescribed cycle (e.g., every 1 ms).

In this configuration, even if the rotation of the rotor 32 is stopped for a certain reason during a feedback control and the encoder 46 comes not to output the A-phase and B-phase signals, a current supply phase is set by the time-synchronous current supply phase setting processing on the basis of an encoder count at that time point. Therefore, the current supply phase can be switched by the time-synchronous current supply phase setting processing even in a state that the rotation of the rotor 32 is stopped, and the rotor 32 can be rotated to a position that is as close to a target position as possible. The reliability of the drive control (i.e., position switching control) of the SR motor 12 can thus be increased.

Figure 26:
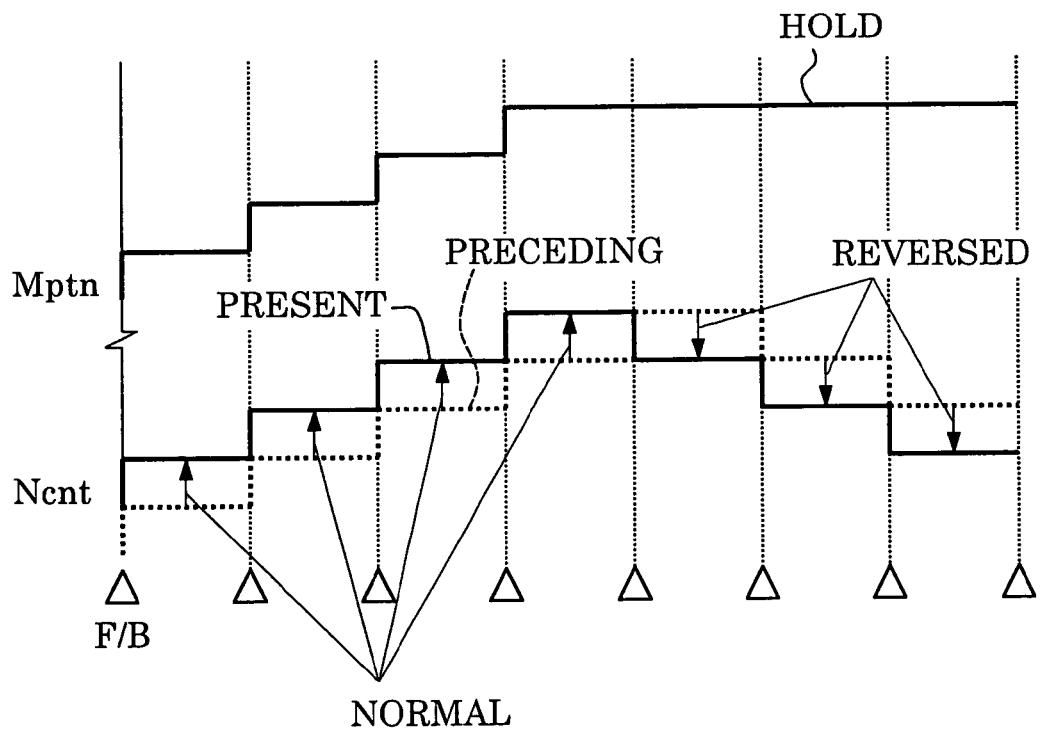
FIG. 26 is a time chart illustrating an exemplary control of a conventional current supply phase holding process.

Here, there may occur an event that for a certain reason the rotation direction of the rotor 32 is reversed during the feedback control. When such reversing is detected, it is necessary to fix the current supply phase immediately to stop the reverse rotation (otherwise, the reverse rotation continues). In general, reversing is detected by comparing preceding and present encoder counts, that is, by determining whether the increasing or decreasing direction of the encoder count has reversed (FIG. 26).

Figure 27:
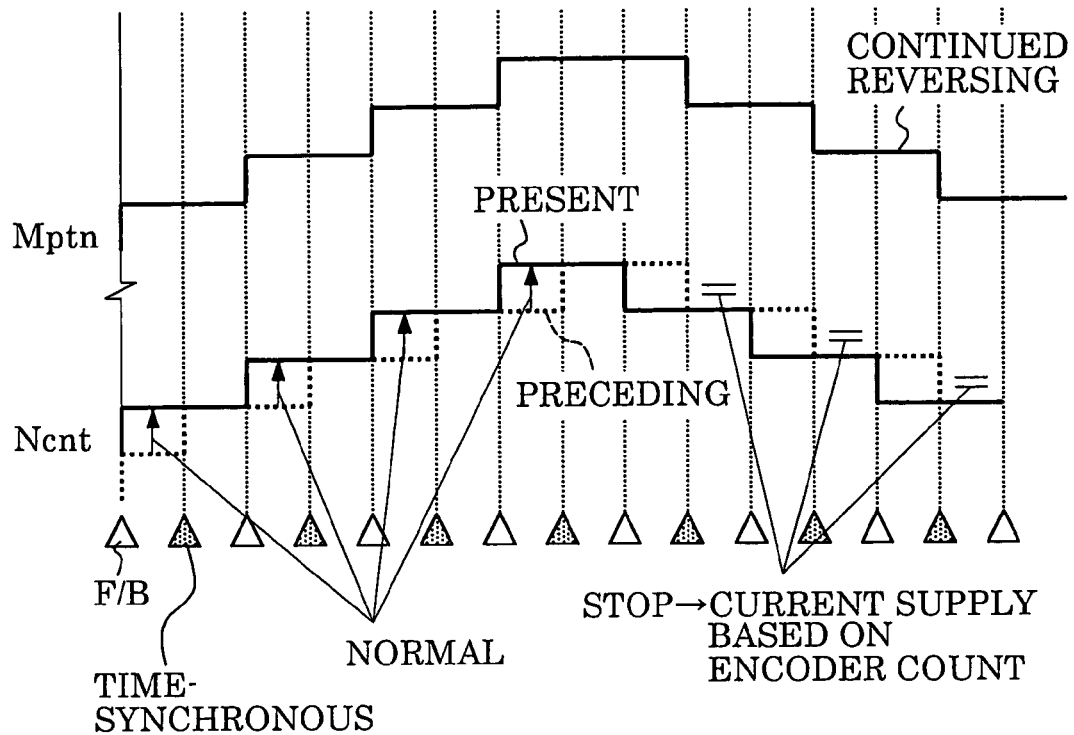
FIG. 27 is a time chart illustrating an exemplary control of a current supply phase holding process of a comparative example.

However, as shown in FIG. 27, where the current supply phase is switched by both of feedback processing and time-synchronous current supply phase setting processing, a preceding encoder count of the preceding feedback processing is updated by the time-synchronous current supply phase setting processing. This may cause a problem that even if the rotation direction of the rotor 32 has been reversed actually, preceding and present encoder counts become identical to produce a determination result "stopped." AS a result, the time-synchronous current supply phase setting processing continues to switch the current supply phase to cause the rotor 32 to continue to rotate in the reverse direction.

In view of the above, in this embodiment, when detecting that the rotation direction of the rotor 32 has been reversed while it is rotated to a target position, the ECU 41 of the position switching controller 42 hold (fixes) the current supply phase to the preceding one and thereby stops the reverse rotation.

In this case, reversing is detected in the following manner. When the rotor 32 is being rotated in such a direction that the encoder count increases, a maximum value of the encoder count is stored, with updating, in a memory (not shown) of the ECU 41 and whether reversing has occurred is determined by comparing a present encoder count with the maximum value. When the rotor 32 is being rotated in such a direction that the encoder count decreases, a minimum value of the encoder count is stored, with updating, in the memory and whether reversing has occurred is determined by comparing a present encoder count with the minimum value. Reversing can be detected by using a maximum or minimum value of the encoder count even in the situation that a preceding encoder count of the preceding feedback processing is updated by the time-synchronous current supply phase setting processing.

Figure 28:
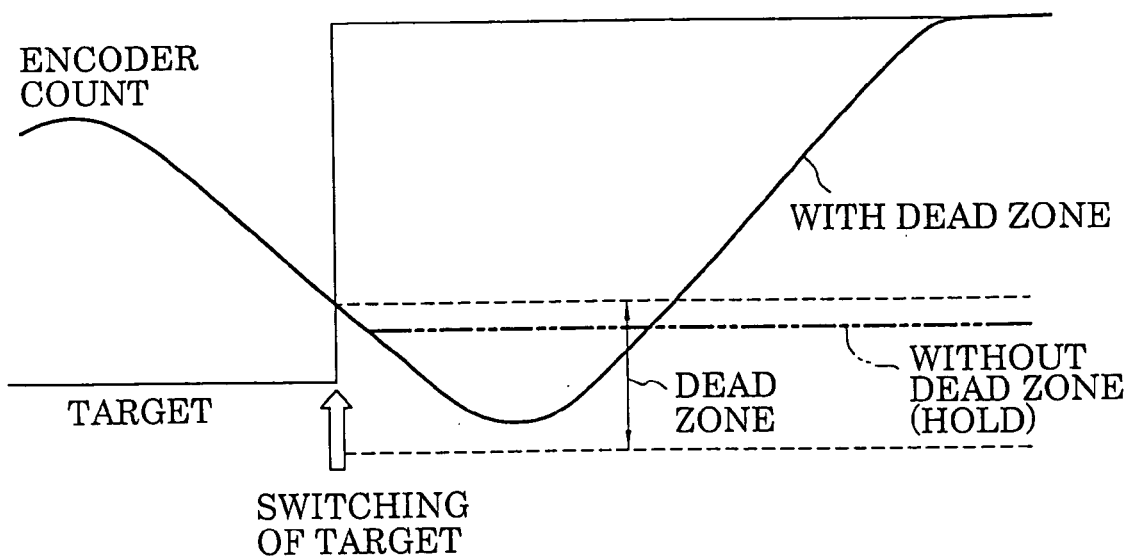
FIG. 28 is a time chart illustrating how the encoder count changes when the target position is switched during a feedback control.

Here, as shown in FIG. 28, there may occur a case that the rotation direction of the rotor 32 should be reversed forcibly when the target position is switched during a feedback control (i.e., during rotation of the rotor 32). Even if the target position is switched during a feedback control, because of the inertia of the rotor 32, it is impossible to reverse the rotation direction of the rotor 32 immediately. Actually, certain time is needed to reverse the rotation direction of the rotor 32 from the switching of the target position. Until reversing, a state is established that the rotation direction of the rotor 32 is opposite to the intended one when viewed from the new target position. Therefore, if the detection of reversing is too accurate (that is, if there is no dead zone), a problem may occur that when the target position is switched during a feedback control, a transient operation of the rotor 32 due to its inertia immediately after the switching of the target position is determined "reversing" and the SR motor 12 is stopped forcibly.

As a countermeasure, in this embodiment, in determining whether reversing has occurred by comparing a present encoder count with a maximum or minimum value, a dead zone of a prescribed count is set for the maximum or minimum value and a determination result "reversed" is non-Produced in the dead zone. With this measure, even if the target position is switched during the feedback control, a transient operation of the rotor 32 due to its inertia immediately after the switching of the target position is not determined "reversing." The rotor 32 can be rotated-to the new target position even if the target position is switched during a feedback control.

Further, in this embodiment, when a current supply phase held state is detected in the reversing-detecting operation, switching is made to an open-loop control in which the current supply phase is switched sequentially without feedback of encoder count information. The number of times of switching of the current supply phase is counted and the rotor 32 is rotated to a target position on the basis of that count. This makes it possible to restore a feedback-control-possible state automatically from a state that the current supply phase is fixed due to detection of reversing.

The details of individual routines that are executed by the ECU 41 of the position switching controller 42 will be described below.

[Encoder Counter]

Figures 8, 9:
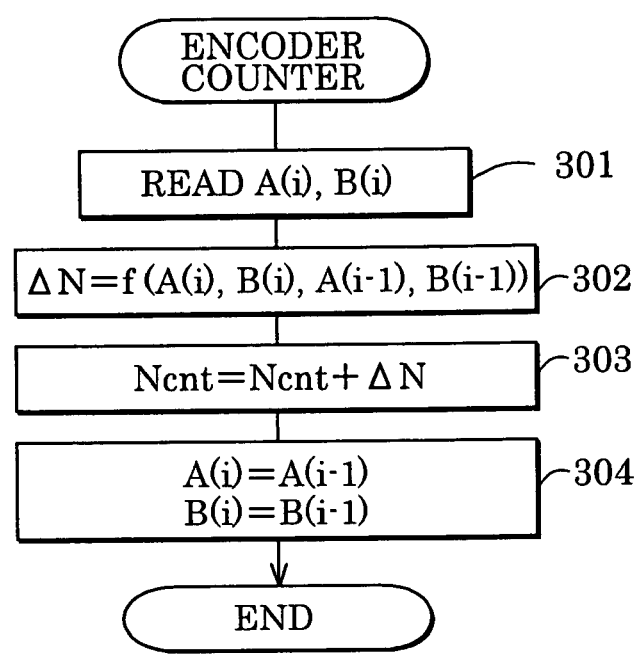
FIG. 8 is a flowchart of an encoder counter routine.
FIG. 9 shows an exemplary count increment ΔN calculation map.

The details of an encoder counter routine shown in FIG. 8 will be described below. This routine is activated by The B-phase interruption processing in synchronism with both of rising edges and trailing edges of the A-phase signal and the B-phase signal and counts both of rising edges and trailing edges of the A-phase signal and the B-phase signal in the following manner. Upon activation of this routine, at step 301, a value A(i) of the A-phase signal and a value B(i) of the B-phase signal are read. At the next step 302, a count difference (increment) $\Delta N$ corresponding to the present values A(i) and B(i) and preceding values A(i−1) and B(i−1) of the A-phase signal and the B-phase signal is calculated by searching a count increment $\Delta N$ calculation map shown in FIG. 9.

Figure 10:
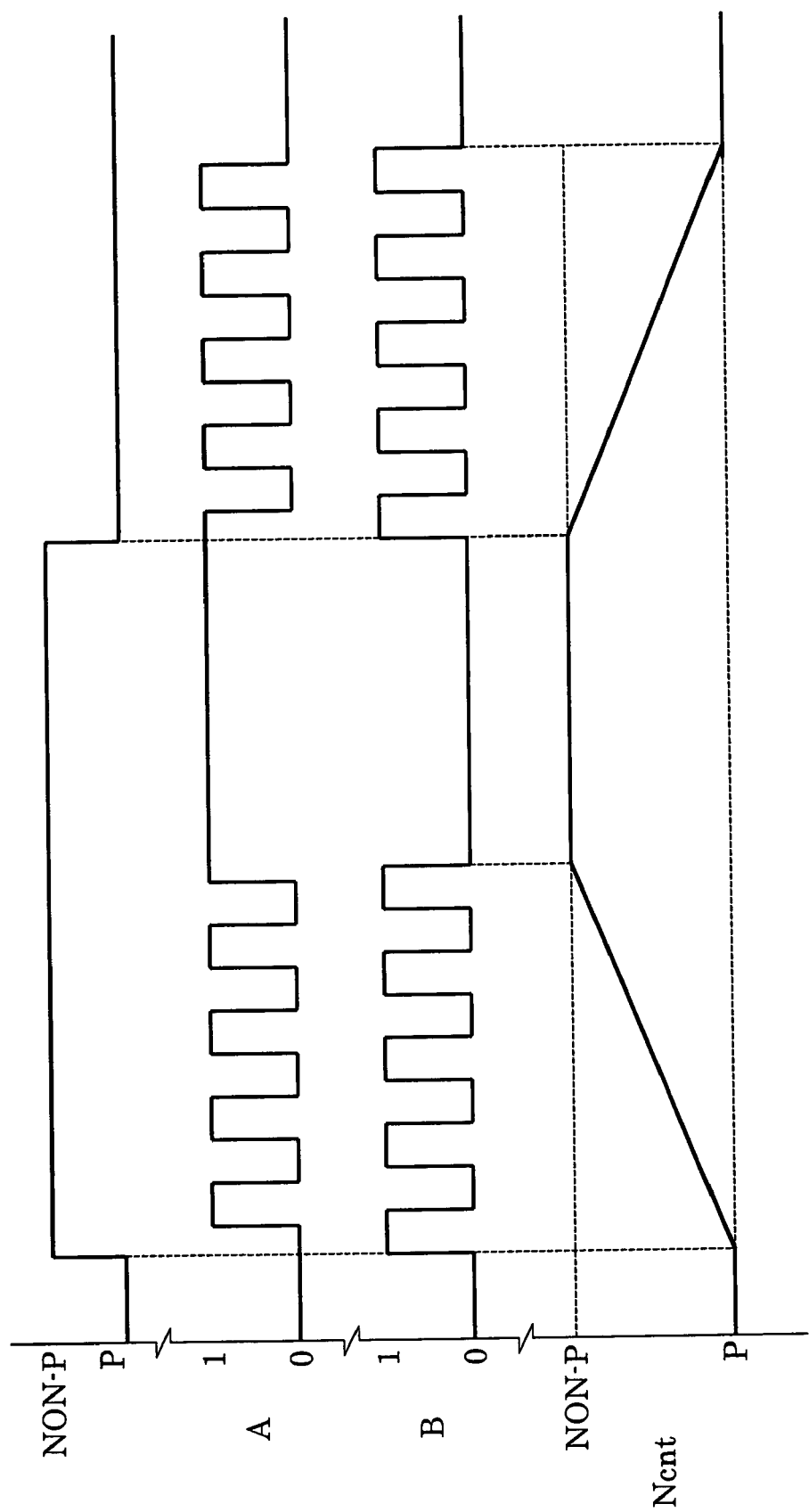
FIG. 10 is a time chart showing a relationship between an instructed shift position, the A-phase signal, the B-phase signal, and an encoder count.

The reason for using the present values A(i) and B(i) and the preceding values A(i−1) and B(i−1) of the A-phase signal and the B-phase signal is to determine a rotation direction of the rotor 32 on the basis of the order of occurrence of pulses of the A-phase signal and the B-phase signal. As shown in FIG. 10, in the case of normal rotation (i.e., the rotation direction from the P-position to the non-P-position), the encoder count Ncnt is increased by giving the positive sign to the count increment $\Delta N$. In the case of reverse rotation (i.e., the rotation direction from the non-P-position to the P-position), the encoder count Ncnt is decreased by giving the negative sign to the count increment $\Delta N$.

After the calculation of the count increment $\Delta N$, the routine proceeds to step 303, where a new encoder count Ncnt is calculated by adding the count increment $\Delta N$ as calculated at step 302 to the preceding encoder count Ncnt. At the next step 304, for the next counting processing, the present values A(i) and B(i) of the A-phase signal and the B-phase signal are stored as values A(i−1) and B(i−1), respectively. This routine is then finished.

[Control Mode Setting]

Figure 11:
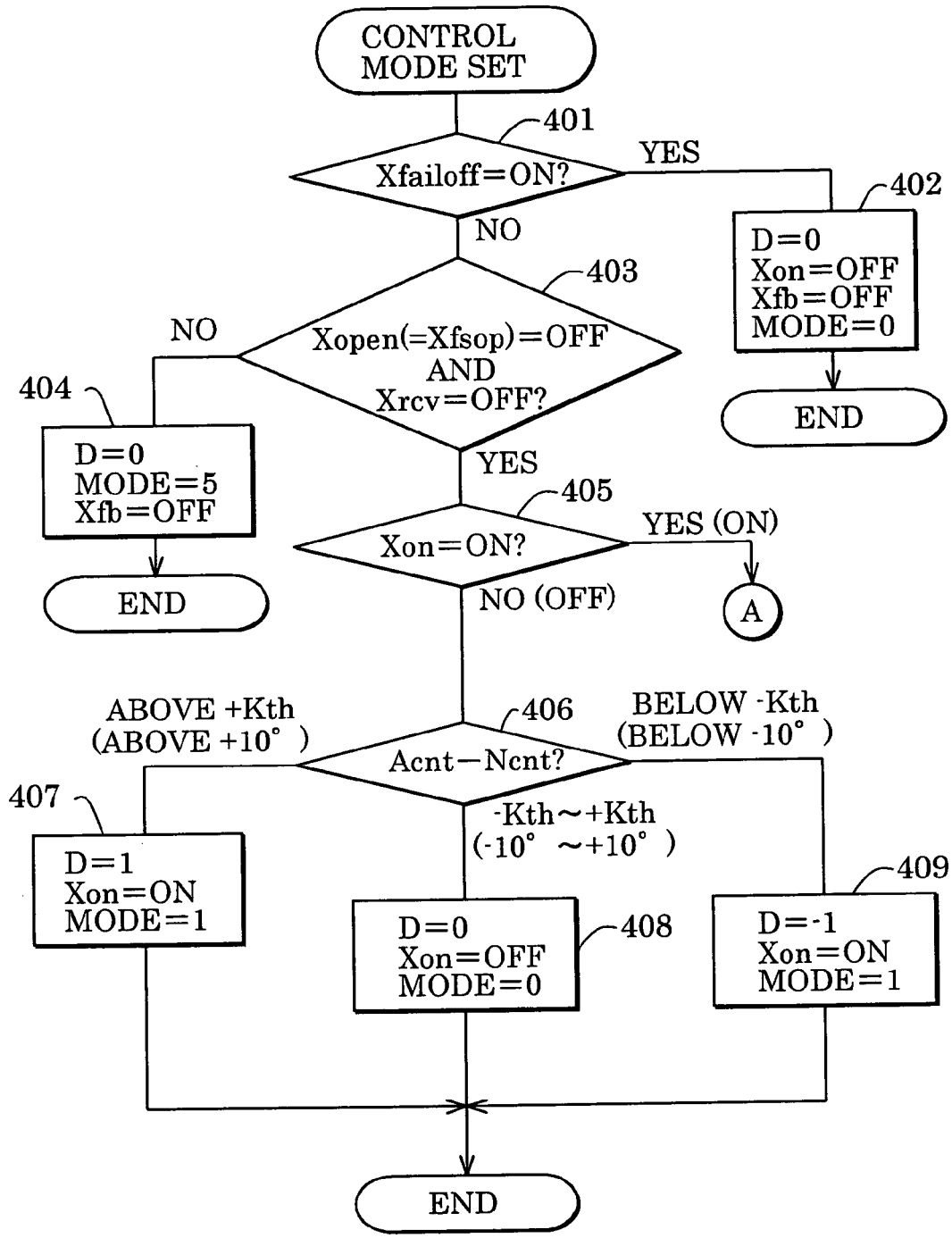
FIGS. 11–13 are flowcharts of a control mode setting routine.
Figure 12:
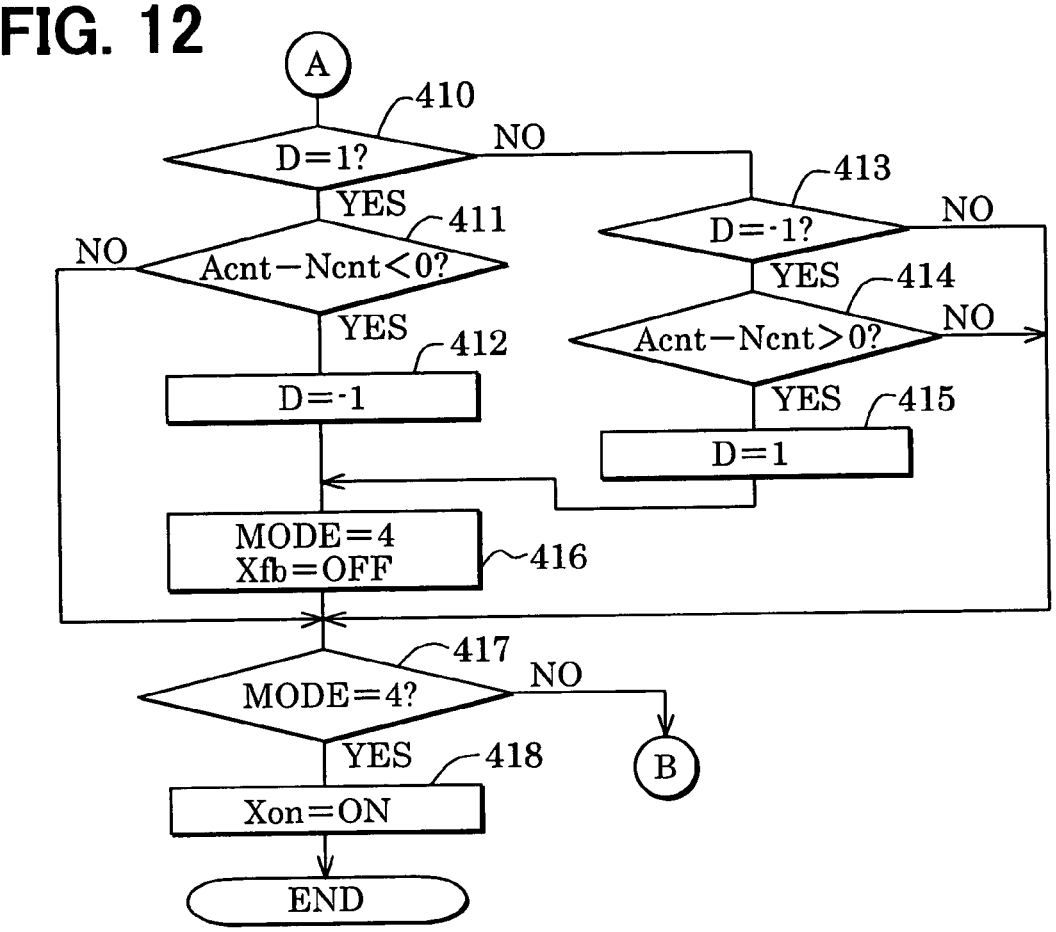
Figure 13:
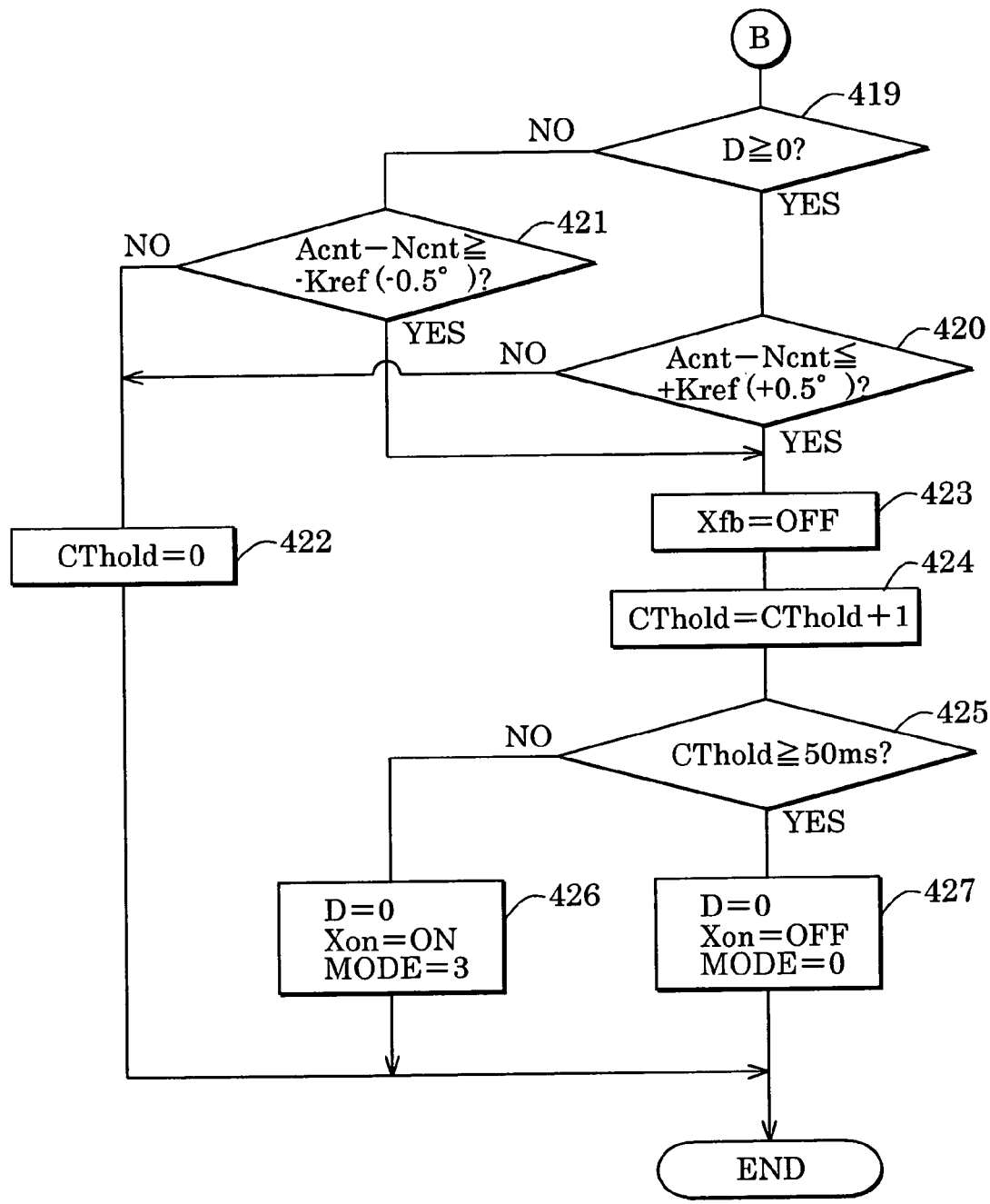

A control mode setting routine shown in FIGS. 11–13 is executed in a prescribed cycle (e.g., every 1 ms) after the end of an initial drive. The initial drive is processing for correlating the encoder count with an actual rotation position of the rotor 32 after application of power to the ECU 41. In the initial drive, edges of the A-phase signal and the B-phase signal of the encoder 46 are counted while current supply is effected for all the phases of the SR motor 12 around according to a prescribed time schedule, whereby a corresponding relationship between the encoder count and the rotation position (i.e., current supply phase) of the rotor 32 at the end of the initial drive is learned. More specifically, the encoder count at the end of an initial drive is learned as an initial positional deviation learned value and encoder counts in a later feedback control or the like are corrected by the initial positional deviation learned value. In this manner, a deviation between the encoder count and the current supply phase (i.e., rotation position of the rotor 32) at the end of the initial drive is corrected for, as a result of which correct current supply phases can be selected in the feedback control or the like.

[Control Mode Setting]

A control mode setting routine shown in FIGS. 11–13, which is executed every predetermined time (e.g., every 1 ms) after the end of an initial drive, specifies a control mode in the following manner by setting a control mode determination value "mode" to one of 0, 1, 3, 4, and 5.

mode=0: current supply off (standby)
mode=1: ordinary drive (feedback control start position stopping and holding process and feedback control)
mode=3: target position stopping and holding process
mode=4: reversing position stopping and holding process
mode=5: open-loop control Upon activation of the control mode setting routine, at step 401, it is determined whether a system failure flag Xfailoff is set to "on" meaning that the position switching control device 42 is in failure. If the flag Xfailoff is "on," the routine proceeds to step 402, where a process for keeping the SR motor 12 in the current supply-off state is executed, whereupon the following settings are made: a rotation direction instruction value D=0 (stop), a current supply flag Xon=off (current supply off), a feedback permission flag Xfb=off (a feedback control prohibited), and the control mode determination value "mode"=0 (current supply off).

On the other hand, if the system failure flag Xfailoff is "off" (no failure), the routine proceeds from step 401 to step 403, where it is determined whether a fail-safe process execution flag Xfsop is "off" and the recovery process execution flag Xrcv is "off." If one or both of the fail-safe process execution flag Xfsop and the recovery process execution flag Xrcv are "on," the routine proceeds to step 404, where the following settings are made to execute an open-loop control: the rotation direction instruction value D=0 (stop), the control mode determination value "mode"=5 (open-loop control), and the feedback permission flag Xfb=off (feedback control prohibited).

If both of the fail-safe process execution flag Xfsop and the recovery process execution flag Xrcv are "off," the routine proceeds to step 405, where it is determined whether the current supply flag Xon is "on" (current supply on). If the current supply flag Xon is "off" (current supply off), the routine proceeds to step 406, where the difference between a target count Acnt and an encoder count Ncnt (i.e., the difference between a target position and a position of the rotor 32) is calculated and it is determined on the basis of the difference Acnt−Ncnt which of normal rotation (i.e., rotation from the P-position position to the non-P-position position), reverse rotation (i.e., rotation from the non-P-position position to the P-position position), and a stop the current rotation mode is. At this time, a value as corrected by using an initial positional deviation learned value Gcnt that was learned in the initial drive routine of FIGS. 8 and 9 is used as the encoder count Ncnt:

$$Ncnt=Ncnt-Gcnt$$

If the difference Acnt−Ncnt between the target count Acnt and the encoder count Ncnt is greater than or equal to +Kth (e.g., +10°), it is determined that the rotor 32 needs to be rotated in the normal direction (i.e., the rotation direction from the P-position position to the non-P-position position). The routine proceeds to step 407, where the following settings are made: the rotation direction instruction value D=1 (normal rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is smaller than or equal to −Kth (e.g., −10°), it is determined that the rotor 32 needs to be rotated in the reverse direction (i.e., the rotation direction from the non-P-position position to the P-position position). The routine proceeds to step 409, where the following settings are made: the rotation direction instruction value D=−1 (reverse rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is in a range of −Kth to +Kth (e.g., −10° to +10°), it is determined that the rotor 32 can be kept at the target position by spring force of the detent spring 23 (i.e., it is not necessary to energize the SR motor 12). The routine proceeds to step 408, where the following settings are made to keep the SR motor 12 in a current supply-off state: the rotation direction instruction value D=0 (stop), the current supply flag Xon=off (current supply off), and the control mode determination value "mode"=0 (current supply off).

On the other hand, if it is determined at step 405 that the current supply flag Xon is "on" (current supply on), steps 410–415 shown in FIG. 12 are executed, whereby it is determined whether the instructed shift position (target position) has been reversed, and if the instructed shift position has been reversed, the rotation direction instruction value D is reversed.

More specifically, first, it is determined at step 410 whether the rotation direction instruction value D is equal to "1" (normal rotation). If the rotation direction instruction value D is equal to "1" (normal rotation), the routine proceeds to step 411, where whether it is necessary to change the rotation direction of the rotor 32 from the normal direction to the reverse direction is determined on the basis of whether the difference Acnt−Ncnt between the target count Acnt and the encoder count Ncnt has a negative value. If it is necessary to change the rotation direction of the rotor 32 that way, the routine proceeds to step 412, where the rotation direction instruction value D is set to "−1" (reverse rotation).

In contrast, if it is determined at step 410 that the rotation direction instruction value D is not equal to "1" (normal rotation), that is, if it is determined that the value D is equal to "0" or "−1," the routine proceeds to step 413, where it is determined whether the rotation direction instruction value D is equal to "−1" (reverse rotation). If the value D is equal to "−1" (reverse rotation), the routine proceeds to step 414, where whether it is necessary to change the rotation direction of the rotor 32 from the reverse direction to the normal direction is determined on the basis of whether the difference Acnt−Ncnt between the target count Acnt and the encoder count Ncnt has a positive value. If it is necessary to change the rotation direction of the rotor 32 that way, the routine proceeds to step 415, where the rotation direction instruction value D is set to "1" (normal rotation).

If the rotation direction instruction value D has been reversed in the above manner, the routine proceeds to step 416, where the following settings are made to reverse the rotation direction of the rotor 32: the control mode determination value "mode"=4 (reversing position stopping and holding process) and the feedback permission flag Xfb=off (feedback control prohibited). Then, the routine proceeds to step 417. On the other hand, if the rotation direction instruction value D has not been reversed, the routine proceeds to step 417 skipping step 416.

At step 417, it is determined whether the control mode determination value "mode" is equal to "4", (reversing position stopping and holding process). If the determination result is "yes," the routine proceeds to step 418, where the current supply flag Xon is set to "on" (current supply on), whereupon a reversing position stopping and holding process is executed.

On the other hand, if the determination result at step 417 is "no" (i.e., a reversing position stopping and holding process is not be executed), steps 419–421 shown in FIG. 13 are executed, whereby it is determined whether the feedback control should be finished. Specifically, it is determined at step 419 whether the rotation direction instruction value D is greater than or equal to "0" (normal rotation or a stop). If the value D≧0, the routine proceeds to step 420, where whether the feedback control should be finished is determined on the basis of whether the difference Acnt−Ncnt between the target count Acnt and the encoder count Ncnt is smaller than or equal to +Kref (e.g., +0.5°). If the rotation direction instruction value D is equal to "−1" (reverse rotation), the routine proceeds to step 421, where whether the feedback control should be finished is determined on the basis of whether the difference Acnt−Ncnt between the target count Acnt and the encoder count Ncnt is greater than or equal to −Kref (e.g., −0.50).

Figure 14:
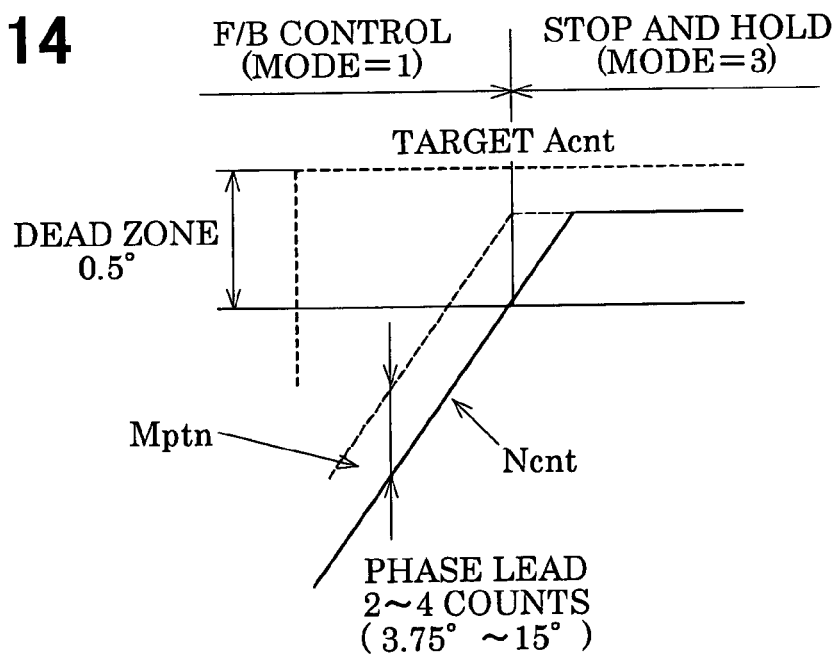
FIG. 14 is a time chart showing timing of a transition from a feedback control to a target position stopping and holding process.

That is, as shown in FIG. 14, by setting the feedback control end determination value Kref to the phase lead (e.g., 2 to 4 counts) of the current supply phase, the feedback control is finished at an instant that precedes, by a time corresponding to the phase lead of the current supply phase, an instant that is determined by the target count Acnt. With this measure, the last current supply phase of the feedback control comes to coincide with a current supply phase with which the rotor 32 is to be stopped and kept at the target position (target count Acnt).

If the determination result at step 420 or 421 is "no" (i.e., the feedback control should not be finished), the routine proceeds to step 422, where the count CThold of a stopping and holding time counter for counting the time of a target position stopping and holding process is reset.

On the other hand, if the determination result at step 420 or 421 is "yes" (i.e., the feedback control should be finished), the routine proceeds to step 423, where the feedback permission flag Xfb is set to "off" (feedback control prohibited), whereupon the feedback control is finished and a transition is made to a target position stopping and holding process. At the next step 424, the count CThold of the stopping and holding time counter is incremented to count the time of the target position stopping and holding process.

Then, at step 425, it is determined whether the time CThold of the target position stopping and holding process has reached a prescribed time (e.g., 50 ms). If the time CThold has not reached the prescribed time (e.g., 50 ms) yet, the routine proceeds to step 426, where the following settings are maintained to continue the target position stopping and holding process: the rotation direction instruction value D=0 (stop), the current supply flag Xon=on (current supply on), and the control mode determination value "mode"=3 (target position stopping and holding process).

When the time CThold of the target position stopping and holding process has reached the prescribed time (e.g., 50 ms), the routine proceeds to step 427, where the following settings are made to turn off the current supply of the SR motor 12: the rotation direction instruction value D=0 (stop), the current supply flag Xon=off (current supply off), and the control mode determination value "mode"=0 (current supply off).

Figure 15:
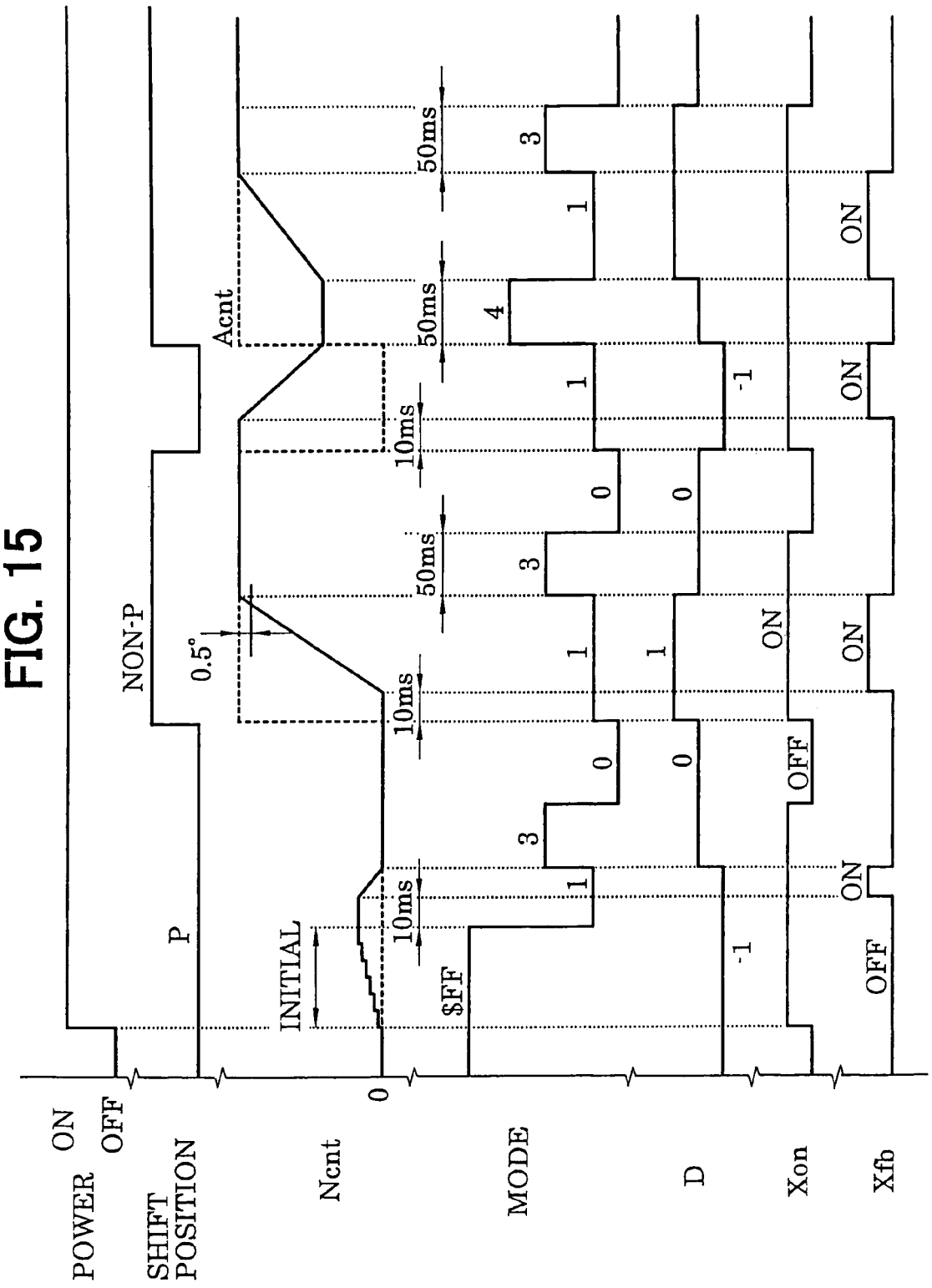
FIG. 15 is a time chart showing an exemplary control on the SR motor.

The control mode determination values "mode" are shown exemplarily in FIG. 15.

[Time-synchronous Motor Control]

Figure 16:
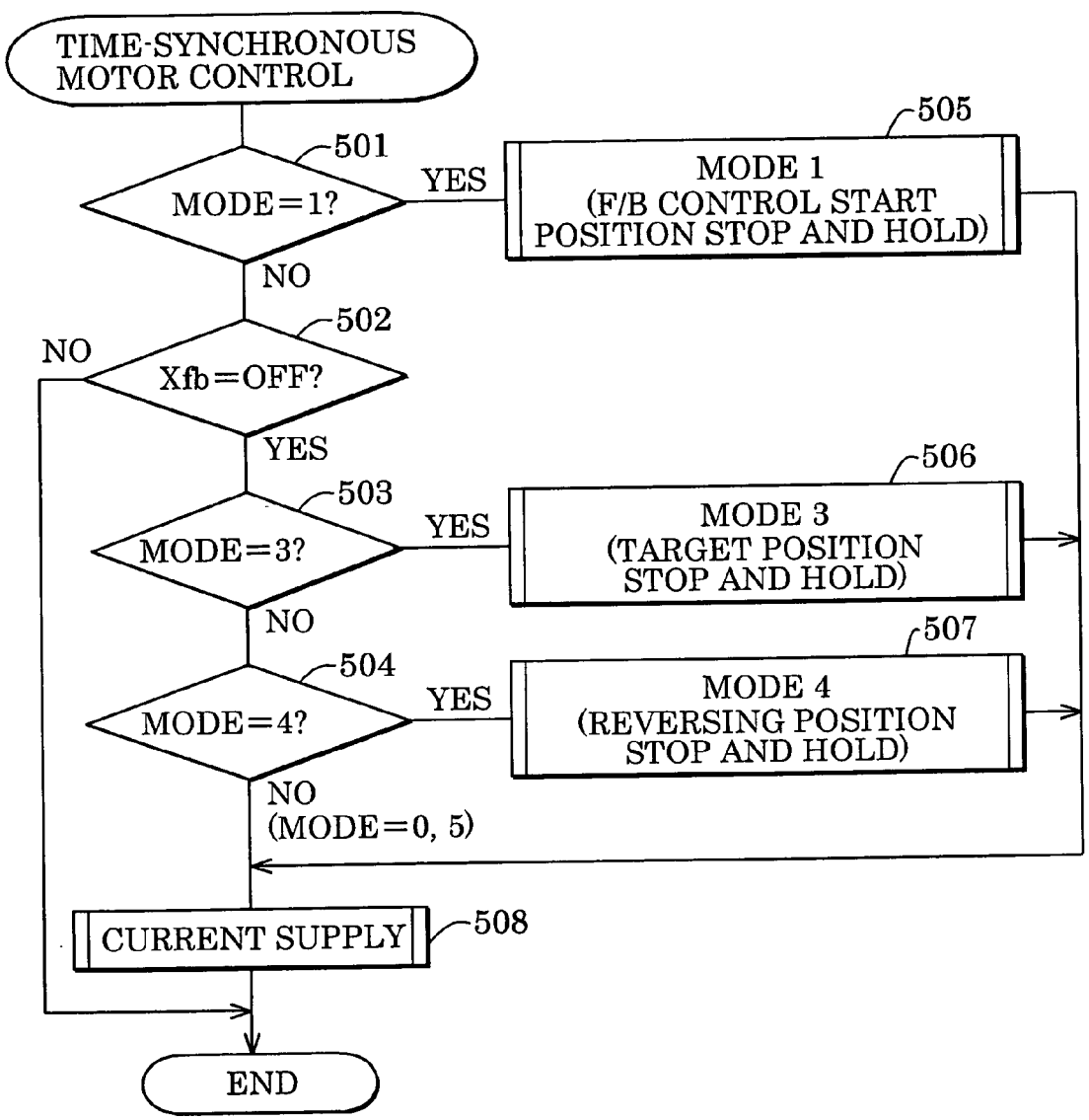
FIG. 16 is a flowchart of a time-synchronous motor control routine.

A time-synchronous motor control routine shown in FIG. 16 is activated in a prescribed cycle (e.g., every 1 ms) after the end of the initial drive. A feedback control start position stopping and holding process, a target position stopping and holding processing, or a reversing position stopping and holding process is executed in this routine.

Figure 17:
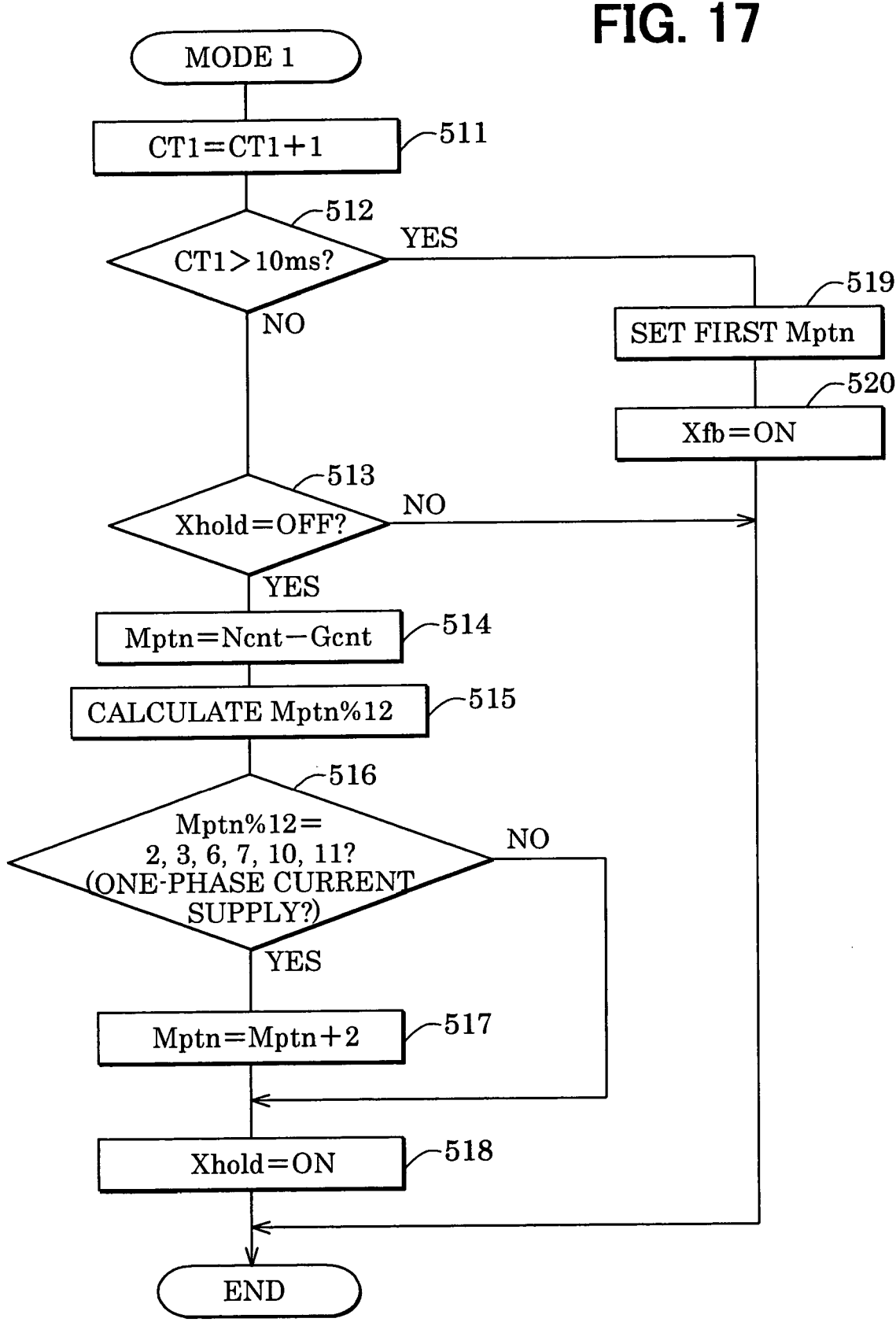
FIG. 17 is a flowchart of a mode-1 routine.

Upon activation of this routine, it is determined at step 501 whether the control mode determination value "mode" is equal to "1" (ordinary drive). If the control mode determination value "mode" is "1," the routine moves to step 505, where a mode-1 routine shown in FIG. 17 is executed, whereby a current supply phase determination value Mptn indicating a current supply phase with which to execute a feedback control start position stopping and holding process and a time-synchronous current supply phase setting process is calculated.

On the other hand, if it is determined at step 501 that the control mode determination value "mode" is not equal to "1," the routine moves to step 502, where it is determined whether the feedback permission flag Xfb is "off" (feedback control prohibited). If the feedback permission flag Xfb is "on" (feedback control permitted), the routine is finished without executing the remaining steps. In this case, current supply phase setting and current supply processing are performed by a feedback control routine shown in FIG. 22.

In this routine, if the control mode determination value "mode" is equal to "1," step 505 (i.e., mode-1 routine of FIG. 17) is executed even if the feedback control is being performed. Therefore, during the feedback control, a feedback process in which the feedback control routine of FIG. 22 sets the current supply phase in synchronism with pulses of the A-phase signal and the B-phase signal that are output from the encoder 46 and a time-synchronous current supply phase setting process in which the mode-1 routine of FIG. 17 sets the current supply phase in a prescribed cycle are executed in parallel. With this measure, even if the rotor 32 is stopped for a certain reason during a feedback control, a current supply phase determination value Mptn is calculated by the time-synchronous current supply phase setting process and the rotor 32 is rotated toward a target position.

Figure 18:
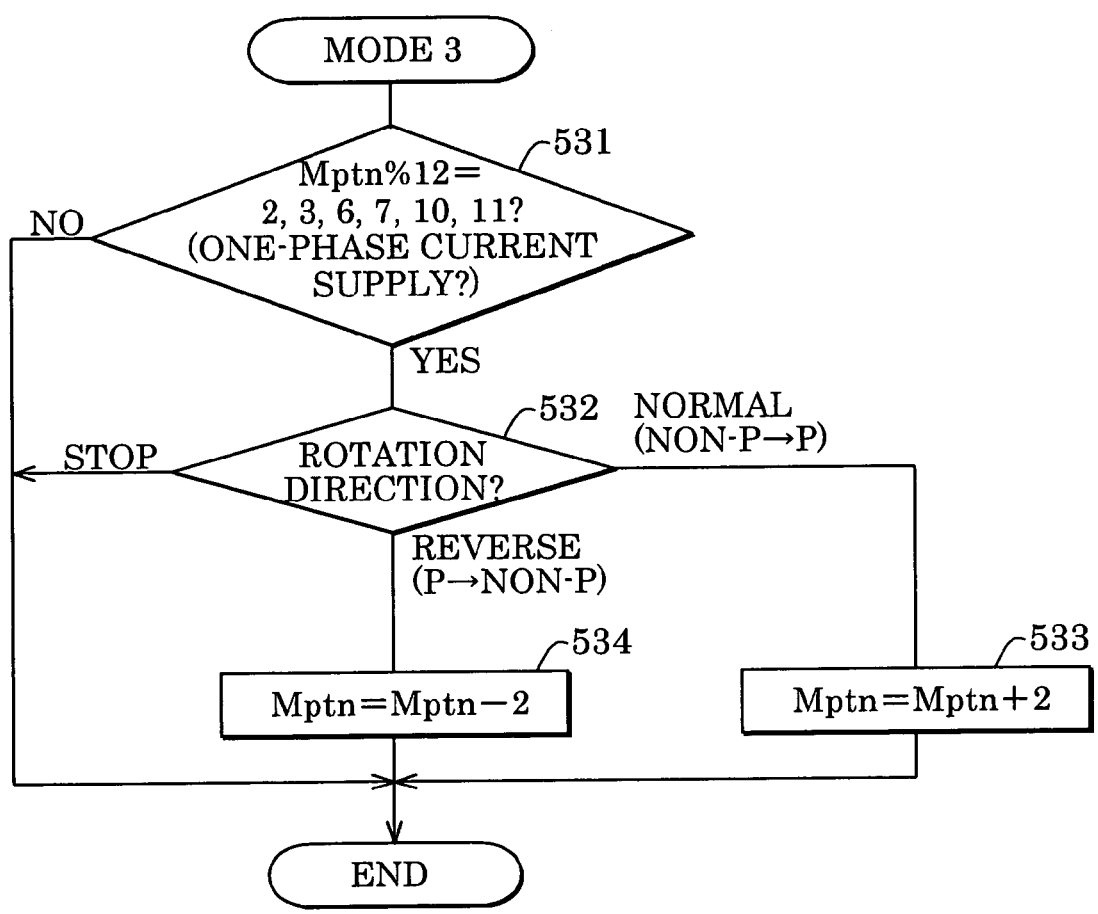
FIG. 18 is a flowchart of a mode-3 routine.

On the other hand, if it is determined at step 502 that the feedback permission flag Xfb is "off" (feedback control prohibited), it is determined at steps 503 and 504 whether the control mode determination value "mode" is equal to "3" or "4." If the control mode determination value "mode" is equal to "3" (target position stopping and holding process), the routine moves from step 503 to 506, where a mode-3 routine shown in FIG. 18 is executed, whereby the current supply phase determination value Mptn indicating a current supply phase with which to execute a target position stopping and holding process is calculated.

Figure 19:
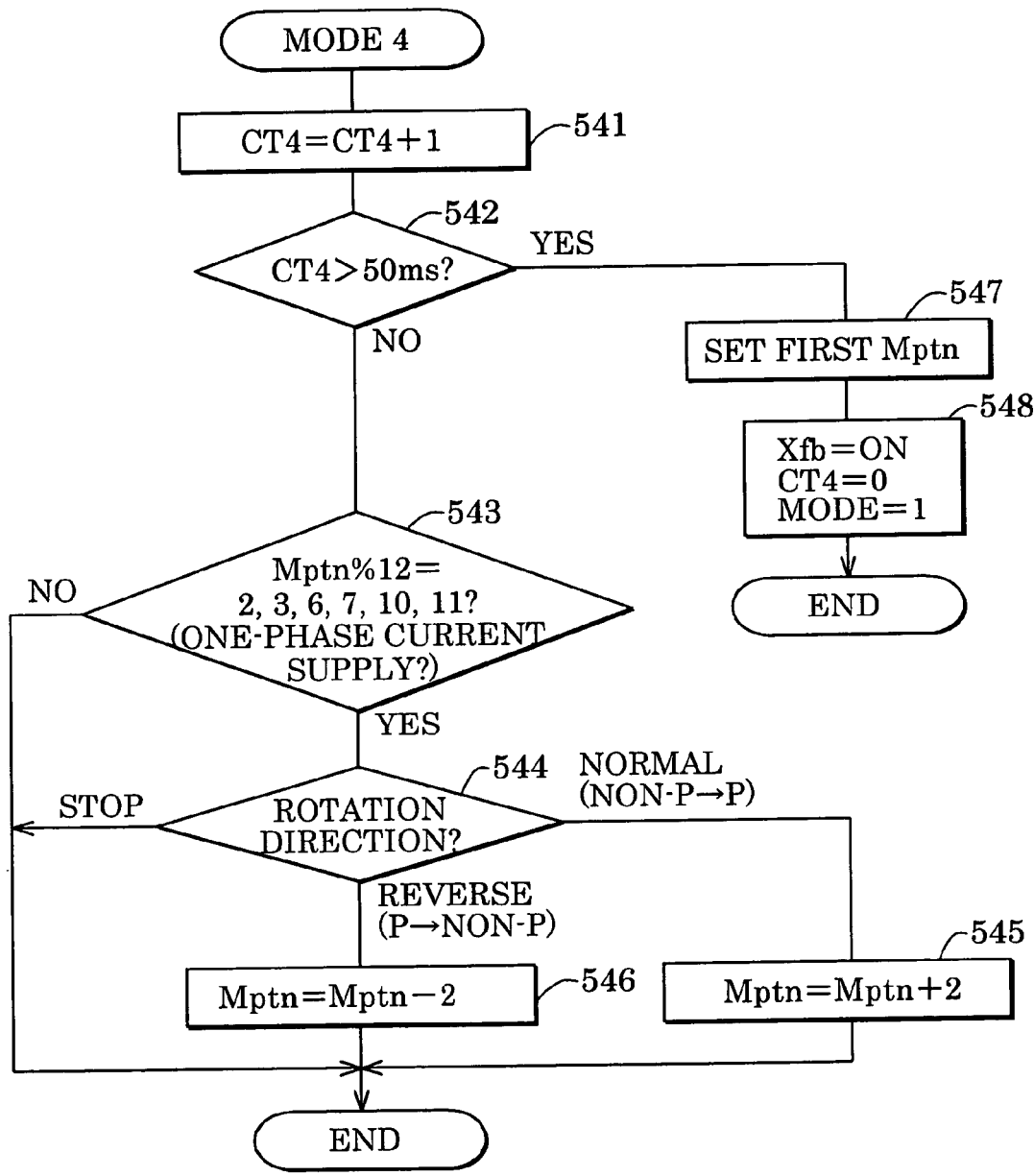
FIG. 19 is a flowchart of a mode-4 routine.

If the control mode determination value "mode" is equal to "4" (reversing position stopping and holding process), the routine moves from step 504 to 507, where a mode-4 routine shown in FIG. 19 is executed, whereby a current supply phase determination value Mptn indicating a current supply phase with which to execute a reversing position stopping and holding process is calculated.

Figure 20:
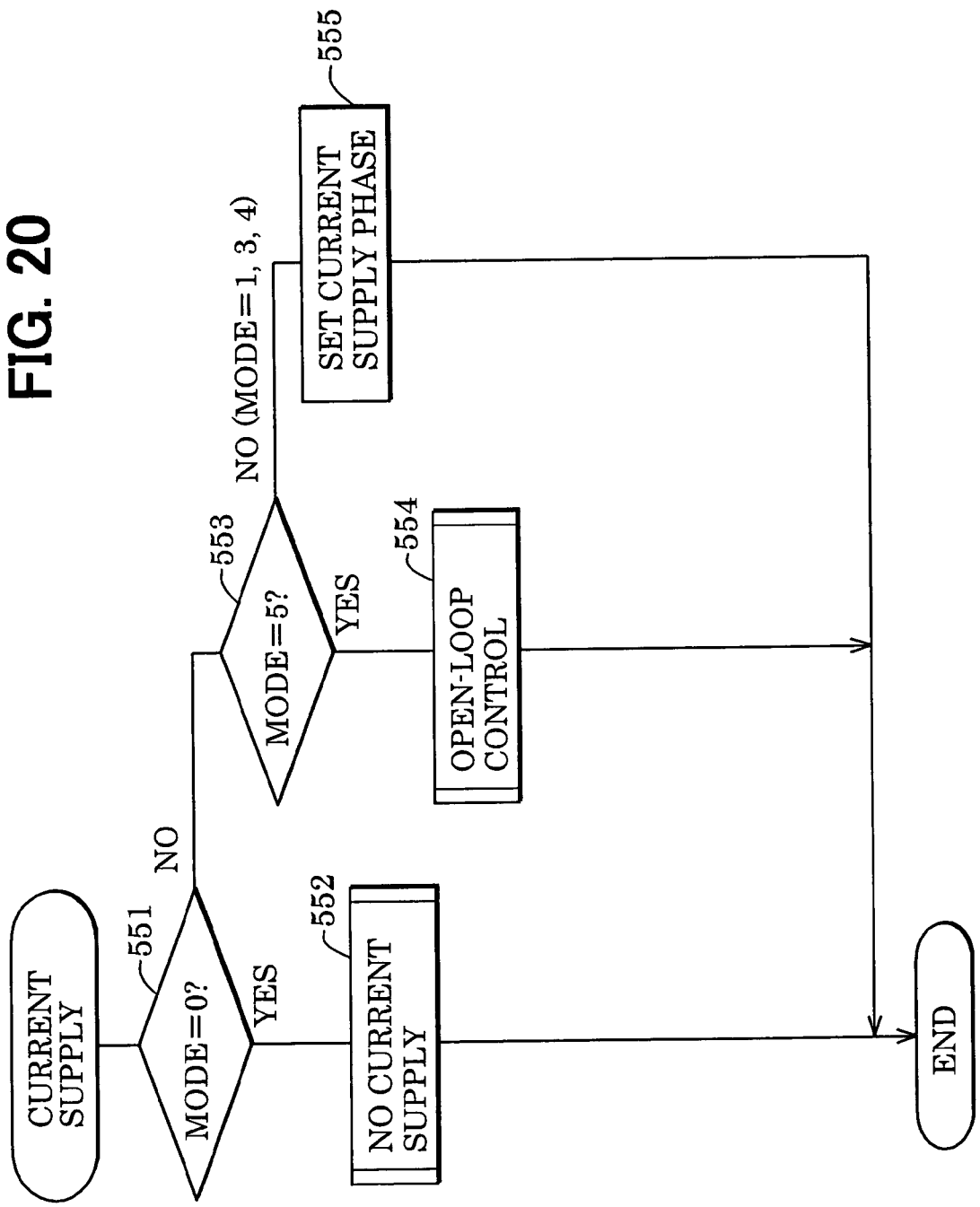
FIG. 20 is a flowchart of a current supply processing routine.

As described above, if the control mode determination value "mode" is equal to 1, 3, or 4, the current supply phase determination value Mptn is calculated and the routine proceeds to step 508, where a current supply processing routine shown in FIG. 20 is executed, that is, an ordinary drive, a target position stopping and holding process, or a reversing position stopping and holding process is executed.

On the other hand, if the determination results at both steps 503 and 504 are "no," that is, if the control mode determination value "mode" is equal to 0 or 5, the routine directly proceeds to step 508, where the current supply processing routine shown in FIG. 20 is executed, that is, the current supply is turned off or an open-loop control is performed.

[Mode-1]

The mode-1 routine shown in FIG. 17 is a subroutine that is activated at step 505 of the time-synchronous motor control routine of FIG. 16. In the mode-1 routine, a current supply phase determination value Mptn indicating a current supply phase with which to execute a feedback control start position stopping and holding process and a time-synchronous current supply phase setting process is set in the following manner.

Upon activation of this routine, at step 511, the count CT1 of a current supply time counter for counting an execution time of a feedback control start position stopping and holding process is incremented. At the next step 512, it is determined whether the time CT1 of the feedback control start position stopping and holding process has exceeded a prescribed time (e.g., 10 ms).

If the time CT1 of the feedback control start position stopping and holding process has not exceeded the prescribed time (e.g., 10 ms) yet, the routine proceeds to step 513, where it is determined whether a stopping and holding process current supply phase storage flag Xhold is "off" (not stored), that is, whether the present instant is immediately before a start of the feedback control start position stopping and holding process. If the stopping and holding process current supply phase storage flag Xhold is "off," the routine proceeds to step 514, where a present position count Ncnt−Gcnt is set as a current supply phase determination value Mptn for the feedback control start position stopping and holding process:

$$Mptn = Ncnt - Gcnt$$

The present position count Ncnt−Gcnt is an encoder count Ncnt as corrected by using an initial positional deviation learned value Gcnt, and represents the present position of the rotor 32 correctly.

Then, the routine proceeds to step 515, where the current supply phase determination value Mptn is divided by 12 and a remainder Mptn % 12 is obtained. The number "12" is an increase or decrease of the encoder count Ncnt (i.e., current supply phase determination value Mptn) that occurs when current supply is effected for all the phases around. A current supply phase is determined on the basis of the value Mptn % 12 according to a conversion table shown in FIG. 21.

At the next step 516, whether one-phase current supply (U-phase, V-phase, or W-phase) is going to be performed is determined on the basis of whether the value Mptn % 12 is equal to 2, 3, 6, 7, 10, or 11. If one-phase current supply is going to be performed, the routine proceeds to step 517, where the current supply phase determination value Mptn is incremented by "2" that corresponds to one step so that the two-phase current supply (U and V-phases, V and W-phases, or U and W-phases) will be performed. Executing the feedback control start position stopping and holding process with two-phase current supply which produces higher holding torque than one-phase current supply does prevents the rotor 32 from vibrating in the vicinity of a feedback control start position and hence can reliably stop and hold the rotor 32 at the feedback control start position.

The stopping and holding process current supply phase storage flag Xhold is set to "on" (stored) at the next step 518, and this routine is finished. When this routine is activated later, the determination result at step 513 should be "no" and hence steps 514–518 are not executed. That is, the processing of setting a current supply phase determination value Mptn indicating a current supply phase with which to execute the feedback control start position stopping and holding process is executed only once immediately before the start of the feedback control start position stopping and holding process.

Figure 23:
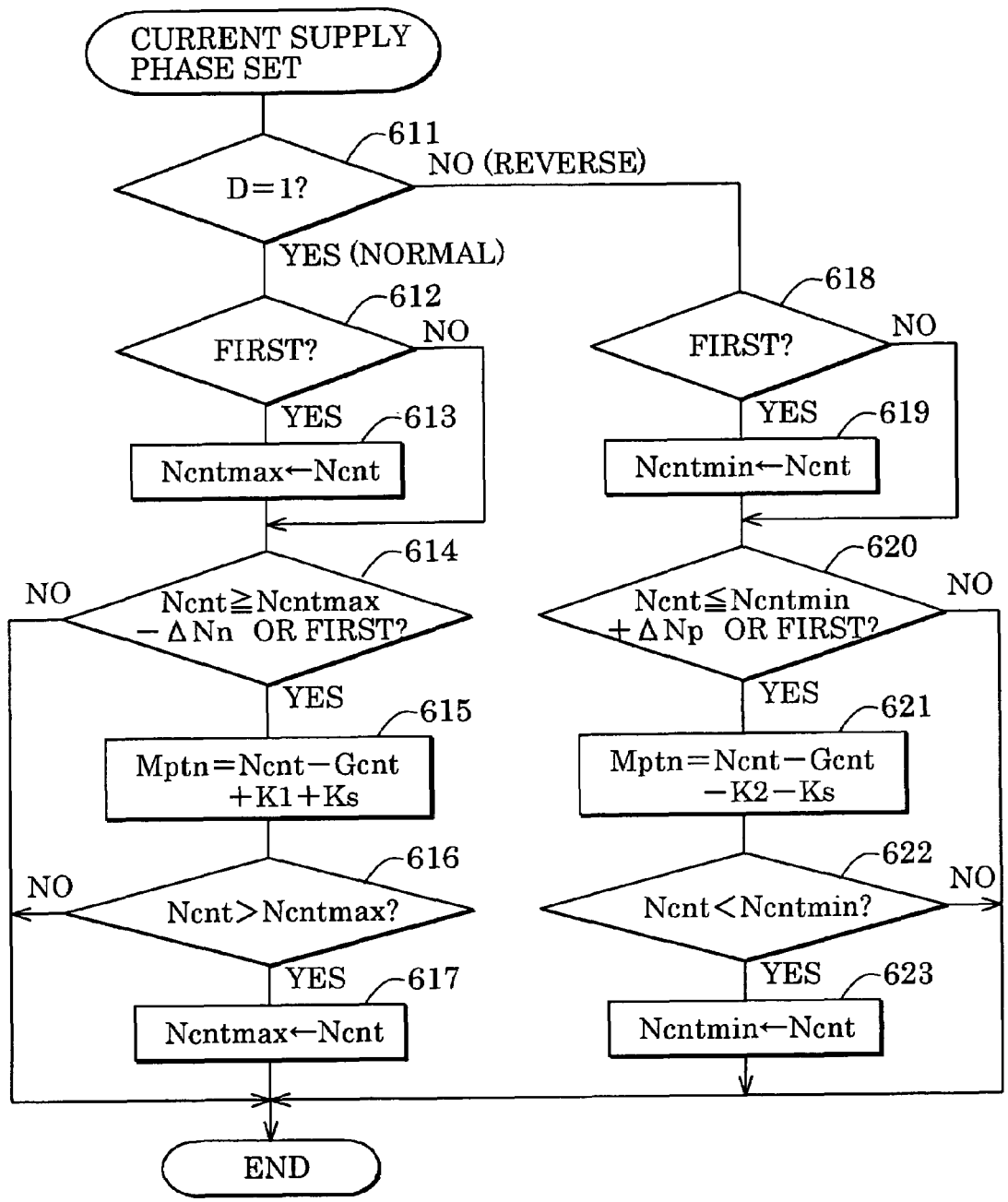
FIG. 23 is a flowchart of a current supply phase setting routine.

Then, when the time CT1 of the feedback control start position stopping and holding process has exceeded the prescribed time (e.g., 10 ms), the determination result at step 512 becomes "yes," whereupon the feedback control start position stopping and holding process is finished and a transition is made to a feedback control. During the feedback control, every time this routine is activated in the prescribed cycle (e.g., every 1 ms), at step 519 a current supply phase setting routine shown in FIG. 23 is executed and a current supply phase determination value Mptn is calculated. The current supply phase setting routine shown in FIG. 23 is also activated at step 602 in the feedback control routine in FIG. 22). Then, the routine proceeds to step 520, where the feedback permission flag Xfb is set to "on" (feedback control permitted).

In the control mode setting routine shown in FIGS. 11–13, when the feedback control has made the difference Acnt−Ncnt between the target count Acnt and the encoder count Ncnt smaller than or equal to the prescribed value, it is determined that the rotor 32 has reached the target position (feedback control termination timing), whereupon the feedback permission flag Xfb is set to "off", the feedback control is finished, and the control mode determination value "mode" is set to "3" (target position stopping and holding process). The control mode determination value "mode" is set to "0" (current supply of f) at a time point when a prescribed time (e.g., 50 ms) has elapsed since then (see steps 419 and the following steps in FIG. 13).

Therefore, the mode-1 routine of FIG. 17 is not activated after completion of the feedback control, and hence the setting of the current supply phase by the time-synchronous current supply mode setting process of step 519 is performed from the start of the feedback control to the arrival of the rotor 32 to the target position (i.e., to the completion of the feedback control).

Figure 24:
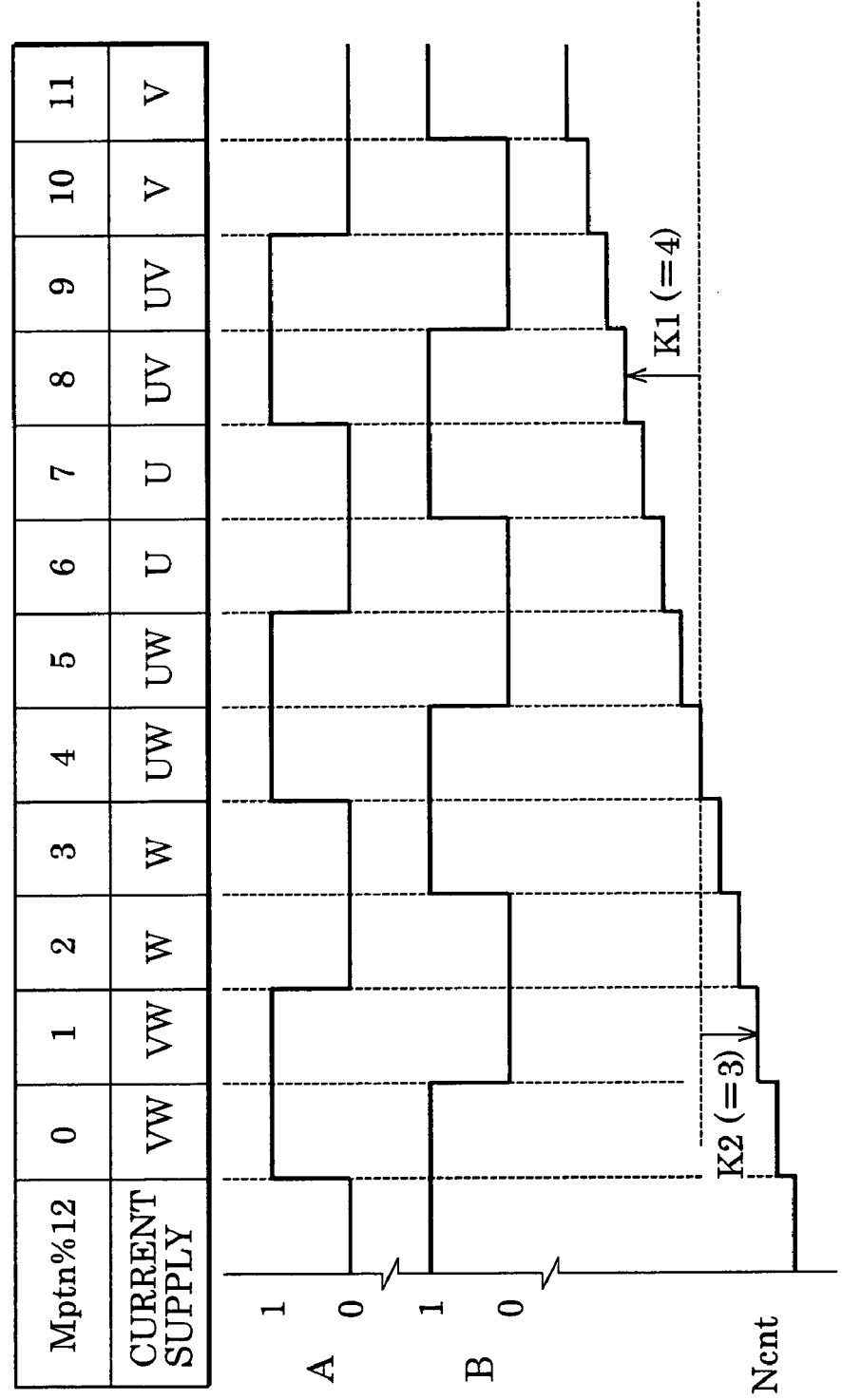
FIG. 24 is a time chart illustrating a current supply process in which rotation is started from a state corresponding to U and W-phases.

FIG. 24 is a time chart illustrating A-phase for which current supply is effected first in the case where rotation is started from a state corresponding to the U and W-phases. In this case, to start normal rotation (i.e., rotation from the P-position to the non-P-position), a current supply phase determination value Mptn is calculated according to the following equation by using an encoder count Ncnt, an initial positional deviation learned value Gcnt, and a normal rotation direction phase lead K1:

$$Mptn = Ncnt - Gcnt + K1$$

If the normal rotation direction phase lead K1 is equal to 4, for example, a current supply phase determination value Mptn is calculated according to the following equation:

$$Mptn = Ncnt - Gcnt + 4$$

To start normal rotation from a state corresponding to the U and W-phases, mod(Ncnt−Gcnt) is 4 and hence Mptn % 12 is equal to 8 (=4+4). The U and V-phases are set as first current supply phases.

On the other hand, to start reverse rotation (i.e., rotation from the non-P-position to the P-position) from a state corresponding to the U and W-phases, if a reverse rotation direction phase lead K2 is equal to 3, for example, a current supply phase determination value Mptn is calculated according to the following equation:

$$Mptn = Ncnt - Gcnt - K2$$
$$= Ncnt - Gcnt - 3$$

To start reverse rotation from a state corresponding to the U and W-phases, Mptn % 12 is equal to 1 (=4−3). The V and W-phases are set as first current supply phases.

In this manner, by setting the normal rotation direction phase lead K1 and the reverse rotation direction phase lead K2 to 4 and 3, respectively, current supply phase switching patterns for the normal rotation direction and the reverse rotation direction can be made symmetrical. In either of the normal rotation direction and the reverse rotation direction, rotation can be started by effecting current supply first for A-phase of a position that is two steps deviated from the current position of the rotor 32.

[Mode-3]

The mode-3 routine shown in FIG. 18 is a subroutine that is activated at step 506 of the time-synchronous motor control routine of FIG. 16. In the mode-3 routine, a current supply phase determination value Mptn (current supply phase) for a target position stopping and holding process is set in the following manner.

Upon activation of this routine, at step 531, whether the current supply phase at the end of the feedback control is one phase (U-phase, V-phase, or W-phase) is determined on the basis of whether the value Mptn % 12 is equal to 2, 3, 6, 7, 10, or 11. If it is one-phase, steps 532–534 are executed, whereby the current supply phase determination value Mptn is incremented or decremented by 2 in accordance with the rotation direction of the feedback control performed so far and the current supply phase is thereby changed to two phases next to the current one phase.

In doing so, at step 532 the rotation direction is determined in the following manner. The rotation direction instruction value D is set to "0" (stop) at step 426 in FIG. 13 immediately before this routine is activated (i.e., when the feedback control has finished). Therefore, the rotation direction cannot be determined by checking the rotation direction instruction value D. In view of this, in this embodiment, with attention paid to the fact that the current supply phase determination value Mptn at the end of the feedback control and the position count Ncnt–Gcnt are different from each other by the phase lead K1 or K2 of the current supply phase, the rotation direction is determined in the following manner in accordance with a magnitude relationship between the current supply phase determination value Mptn at the end of the feedback control and the position count Ncnt–Gcnt.

If Mptn>(Ncnt–Gcnt), the rotation direction is determined to be normal rotation (i.e., the rotation direction from the P-position to the non-P-position). The routine proceeds to step 533, where the current supply phase determination value Mptn is incremented by 2 to as to effect two-phase current supply.

On the other hand, if Mptn<(Ncnt–Gcnt), the rotation direction is determined to be reverse rotation (i.e., the rotation direction from the non-P-position to the P-position). The routine proceeds to step 534, where the current supply phase determination value Mptn is decremented by 2 to effect two-phase current supply. If Mptn=(Ncnt–Gcnt), it is determined that the rotor 32 is stopped and hence the current supply phase is not changed.

As described above, like the feedback control start position stopping and holding process, the target position stopping and holding process is executed with two-phase current supply which produces higher torque than one-phase current supply does. This makes it possible to prevent the rotor 32 from vibrating in the vicinity of a target position and hence to reliably stop and keep the rotor 32 at the target position.

[Mode-4]

The mode-4 routine shown in FIG. 19, which is a subroutine that is activated at step 507 of the time-synchronous motor control routine of FIG. 16, sets a current supply phase determination value Mptn for a reversing position stopping and holding process in the following manner.

Upon activation of this routine, at step 541, the count CT4 of a current supply time counter that counts the time of a reversing position stopping and holding process. At the next step 542, it is determined whether the time CT4 of the reversing position stopping and holding process has exceeded a prescribed time (e.g., 50 ms).

If the time CT4 of the reversing position stopping and holding process has not exceeded the prescribed time (e.g., 50 ms), the routine proceeds to step 543, where whether the current supply phase is one phase (U-phase, V-phase, or W-phase) is determined on the basis of whether the value Mptn % 12 is equal to 2, 3, 6, 7, 10, or 11. If the current supply phase is one phase, steps 544–546 are executed, whereby the current supply phase determination value Mptn is incremented or decremented by 2 in accordance with the rotation direction of the feedback control performed so far and the current supply phase is thereby changed to two phases next to the current one phase. Steps 543–546 are the same as steps 531–534 of the above mode-3 routine of FIG. 18.

As described above, like the feedback control start position stopping and holding process and the target position stopping and holding process, the reversing position stopping and holding process is executed with two-phase current supply which produces higher torque than one-phase current supply does. This makes it possible to prevent the rotor 32 from vibrating in the vicinity of a reversing position and hence to reliably stop the rotor 32 at the reversing position and keep it there.

Then, when the time CT4 of the reversing position stopping and holding process has exceeded the prescribed time (e.g., 50 ms), the determination result at step 542 becomes "yes," whereupon the reversing position stopping and holding process is finished and the feedback control is restarted. First, at step 547, a first current supply phase determination value Mptn for the new feedback control is set by adding or subtracting, in accordance with a rotation direction, a count (e.g., 4 or 3) corresponding to A-phase lead of the current supply phase to or from the current supply phase determination value Mptn for the reversing position stopping and holding process, whereupon driving for rotating the rotor 32 is started. Then, the routine proceeds to step 548, where the following settings are made: the feedback permission flag Xfb=on (feedback control permitted), the current supply time count CT4=0, and the control mode determination value "mode"=1 (ordinary drive). Then this routine is finished.

[Current Supply Process]

The current supply processing routine shown in FIG. 20 is a subroutine that is activated at step 508 of the time-synchronous motor control routine of FIG. 16. This routine is also activated at step 603 of the feedback control routine (described later) shown in FIG. 22.

Upon activation of the current supply processing routine of FIG. 20, at step 551, it is determined whether the control mode determination value "mode" is equal to "0" (current supply off). If the control mode determination value "mode" is equal to "0" (current supply off), the routine proceeds to step 552, where all the phases are rendered in a current supply-off state to establish a standby state.

On the other hand, if the determination result at step 551 is "no," the routine proceeds to step 553, where it is determined whether the control mode determination value "mode" is equal to "5" (open-loop control). If the control mode determination value "mode" is equal to "5" (open-loop control), the routine proceeds to step 554, where an open-loop control is performed. In the open-loop control, the rotor 32 is rotated to a target position by setting current supply phases by time-synchronous processing having a cycle of 1 ms, for example, when the encoder 46 has failed or an operation abnormality has occurred in the SR motor 12.

Figures 21, 22:
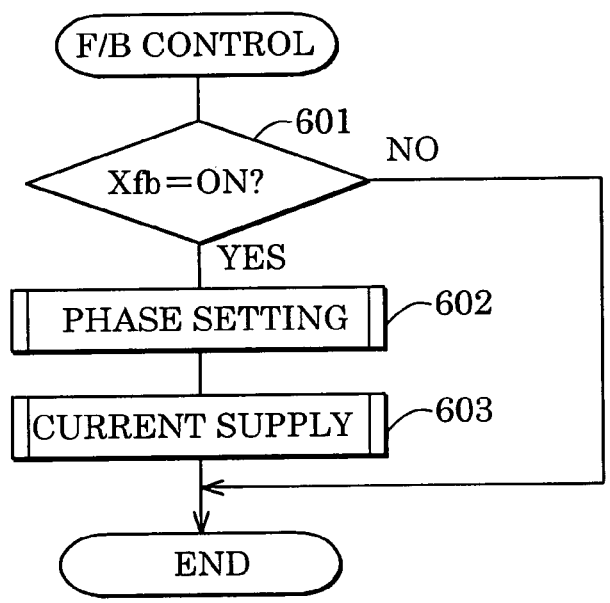
FIG. 21 shows an exemplary conversion table to be used for converting a value Mptn % 12 into a current supply phase in the case of a one/two-phase energizing method.
FIG. 22 is a flowchart of a feedback control routine.

If the determination results at both of steps 551 and 553 are "no," that is, if the control mode determination value "mode" is equal to 1 (feedback control start position stopping and holding process and feedback control), 3 (target position stopping and holding process), or 4 (reversing position stopping and holding process), the routine proceeds to step 555, where a current supply phase is set in accordance with a value Mpt % 12 using the conversion table of FIG. 21.

[Feedback Control]

Next, the details of the feedback control routine shown in FIG. 22 will be described. This routine is executed by A and B-phase interruption processing. In this routine, in a state that the feedback control execution conditions are satisfied after the end of an initial drive, the rotor 32 is rotated until its rotation position (Ncnt−Gcnt) reaches a position that is 0.5°, for example, short of a target position (target count Acnt) by switching the current supply phase on the basis of the encoder count Ncnt and an initial positional deviation learned value Gcnt.

Upon activation of the feedback control routine of FIG. 22, at step 601, it is determined whether the feedback permission flag Xfb is "on" (i.e., whether the feedback control execution conditions are satisfied). If the feedback permission flag Xfb is "off" (i.e., the feedback control execution conditions are not satisfied), this routine is finished without executing the remaining steps.

Figure 31:
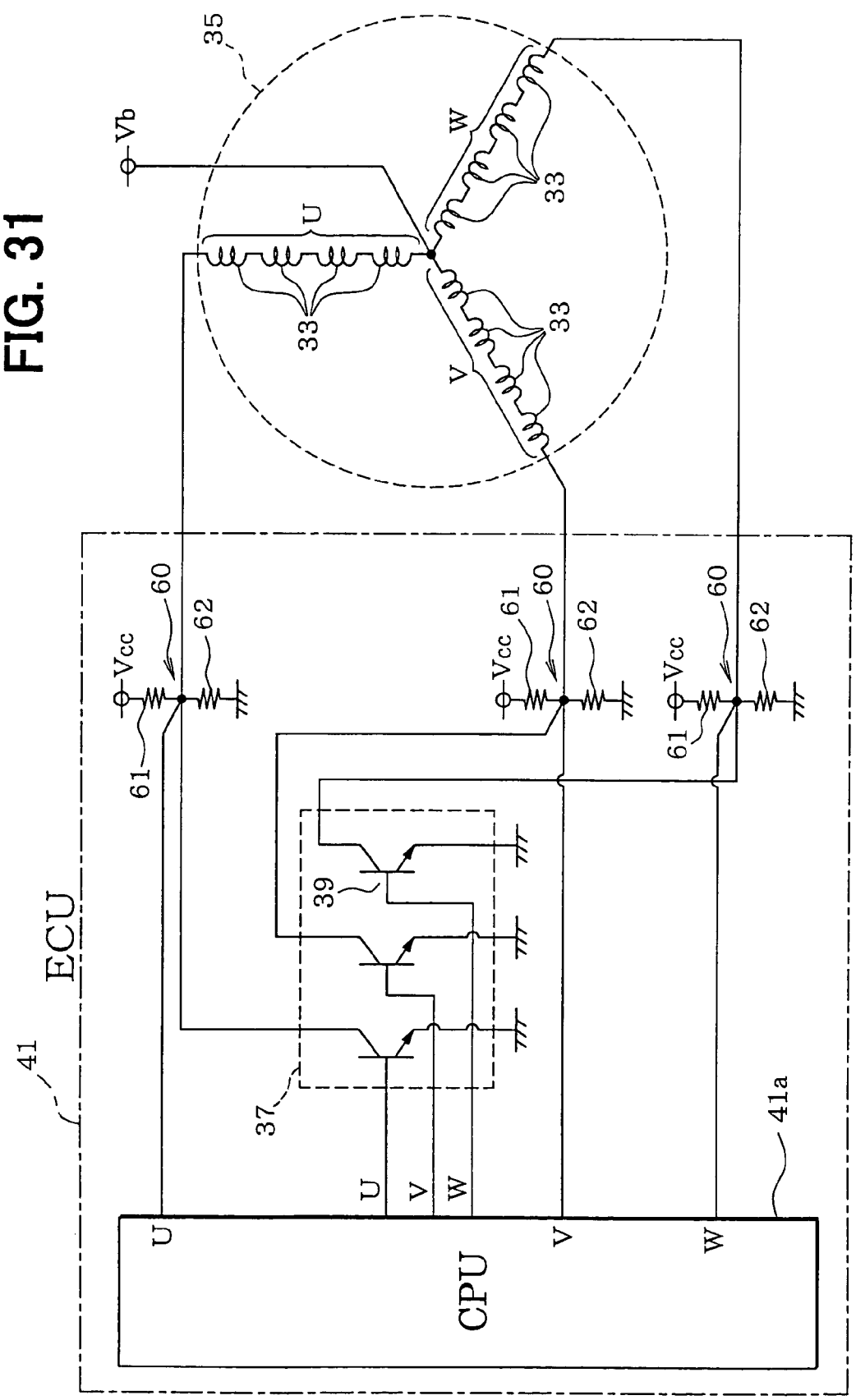
FIG. 31 is a circuit diagram of a circuit configuration for driving an SR motor according to a second embodiment of the invention.

On the other hand, if the feedback permission flag Xfb is "on," the routine proceeds to step 602, where a current supply phase setting routine shown in FIG. 31 is executed, whereby a current supply phase is set on the basis of a current encoder count Ncnt and an initial positional deviation learned value Gcnt. At the next step 603, the current supply processing routine of FIG. 20 is executed.

[Current Supply Phase Setting]

The current supply phase setting routine shown in FIG. 23 is a subroutine that is activated at step 602 of the feedback routine of FIG. 22 and at step 519 of the mode-1 routine of FIG. 17.

Upon activation of this routine, it is determined at step 611 whether the rotation direction instruction value D indicating a rotation direction toward a target position is equal to "1" that means the normal (forward) rotation direction (i.e., the rotation direction from the P-position to the non-P-position). If it is determined that the rotation direction instruction value D is equal to "1" (normal rotation direction), the routine proceeds to step 612, where it is determined whether the present energization is the first one to be performed at the start of a feedback control. If it is determined that the present energization is the first one, the routine proceeds to step 613, where the present encoder count Ncnt is set as an initial value of a maximum value Ncntmax (described later). The routine then proceeds to step 614. On the other hand, if the present energization is not the first one, the routine proceeds to step 614 skipping step 613.

At step 614, whether a normal rotation drive execution condition is satisfied is determined on the basis of whether one of the following two conditions [A-1] and [A-2] is met:

[A-1]: No reversing has been detected during the normal rotation drive.

[A-2]: The present energization is the first one to be performed at the start of the feedback control.

The condition [A-1] means that the present encoder count Ncnt is greater than or equal to a maximum value Ncntmax among encoder counts so far occurred or is not smaller than the maximum value Ncntmax by more than a dead zone width ΔNn even if it is smaller than the maximum value Ncntmax.

$$Ncnt \geq Ncntmax - \Delta Nn$$

The dead zone width ΔNn is employed to prevent an event that a transient operation of the rotor 32 due to its inertia that is caused by target position switching during the normal rotation drive, for example, is determined as reversing. In this embodiment, the dead zone width ΔNn is set to 2 to 4 counts, for example.

If one of the two conditions [A-1] and [A-2] is met, the normal rotation drive execution condition is satisfied and the routine proceeds to step 615, where the current supply phase determination value Mptn is updated according to the following equation by using a present encoder count Ncnt, an initial positional deviation learned value Gcnt, a normal rotation direction phase lead K1, and a speed phase lead correction amount Ks:

$$Mptn = Ncnt - Gcnt + K1 + Ks$$

The normal rotation direction phase lead K1 is a phase lead of the current supply phase that is necessary to rotate the rotor 32 in the normal direction (i.e., a phase lead of the current supply phase with respect to the present rotation phase of the rotor 32), and is set to "4," for example.

The speed phase lead correction amount Ks is a phase lead correction amount that is set in accordance with a rotation speed of the rotor 32. For example, the speed phase lead correction amount Ks is set to "0" in a low-speed range and is increased to "1", or "2," for example, as the rotation speed increases. As a result, the current supply phase determination value Mptn is corrected so as to indicate a current supply phase that is suitable for a rotation speed of the rotor 32.

After the updating of the current supply phase determination value Mptn, the routine proceeds to step 616, where it is determined whether the present encoder count Ncnt is greater than the maximum value Ncntmax. If the present encoder count Ncnt is greater than the maximum value Ncntmax, the routine proceeds to step 617, where the storage data of the maximum value Ncntmax in the memory of the ECU 42 is rewritten to the present encoder count Ncnt. While the rotor 32 is rotated in the normal direction, the encoder count Ncnt is increased periodically. Therefore, the encoder count maximum value Ncntmax is updated periodically.

On the other hand, if reversing has occurred for a certain reason during the normal rotation drive and the encoder count Ncnt has decreased, a determination result "no" is produced at step 616. In this case, this routine is finished without updating the storage data of the encoder count maximum value Ncntmax. In this manner, during the normal rotation drive, a maximum value Ncntmax among encoder counts so far occurred is stored in the memory of the ECU 42.

On the other hand, if neither of the two conditions [A-1] and [A-2] is met at step 614, that is, if reversing has been detected during the normal rotation drive (Ncnt<Ncntmax−ΔNn) and the present energization is second or later energization, the normal rotation drive execution condition is not satisfied and hence this routine is finished immediately. In this case, the current supply phase Mptn is not updated to prevent reversing. The current supply phase is kept at the preceding phase and current supply is effected for the preceding phase, whereby braking torque is generated in such a direction as to suppress the reverse rotation of the rotor 32.

If it is determined at step 611 that the rotation direction instruction value D is equal to "−1" (reverse rotation direction, i.e., the rotation direction from the non-P-position to the P-position), the routine proceeds to step 618, where it is determined whether the present energization is the first one to be performed at the start of a feedback control. If it is determined that the present energization is the first one, the routine proceeds to step 619, where a present encoder count Ncnt is set as an initial value of a minimum value Ncntmin. The routine then proceeds to step 620. On the other hand, if the present energization is not the first one, the routine proceeds to step 620 skipping step 619.

At step 620, whether a reverse rotation drive execution condition is satisfied is determined on the basis of whether one of the following two conditions [B-1] and [B-2] is met:

[B-1]: No reversing to normal rotation has been detected during the reverse rotation drive.

[B-2]: The present energization is the first one to be performed at the start of a feedback control.

The condition [B-1] means that the present encoder count Ncnt is smaller than or equal to a minimum value Ncntmin among encoder counts so far occurred or is not greater than the minimum value Ncntmax by more than a dead zone width ΔNp even if it is greater than the minimum value Ncntmin.

$$Ncnt < Ncntmin + \Delta Np$$

The dead zone width ΔNp is employed to prevent an event that a transient operation of the rotor 32 due to its inertia that is caused by target position switching during a reverse rotation drive, for example, is determined as reversing to normal rotation. In this embodiment, the dead zone width ΔNp is set to 2 to 4 counts, for example.

If one of the two conditions [B-1] and [B-2] is met, the reverse rotation drive execution condition is satisfied and the routine proceeds to step 621, where the current supply phase determination value Mptn is updated according to the following equation by using a present encoder count Ncnt, an initial positional deviation learned value Gcnt, a reverse rotation direction phase lead K2, and a speed phase lead correction amount Ks:

$$Mptn = Ncnt - Gcnt - K2 - Ks$$

The reverse rotation direction phase lead K2 is a phase lead of the current supply phase that is necessary to rotate the rotor 32 in the reverse direction (i.e., a phase lead of the current supply phase with respect to the present rotation phase of the rotor 32), and is set to "3," for example. The speed phase lead correction amount Ks is set in the same manner as in the case of the normal rotation.

After the updating of the current supply phase determination value Mptn, the routine proceeds to step 622, where it is determined whether the present encoder count Ncnt is smaller than the minimum value Ncntmin. If the present encoder count Ncnt is smaller than the minimum value Ncntmin, the routine proceeds to step 623, where the storage data of the minimum value Ncntmin in the memory of the ECU 42 is rewritten to the present encoder count Ncnt. While the rotor 32 is rotated in the reverse direction, the encoder count Ncnt is increased periodically. Therefore, the encoder count minimum value Ncntmin is updated periodically.

On the other hand, if reversing to normal rotation has occurred for a certain reason during the reverse rotation drive and the encoder count Ncnt has increased, a determination result "no" is produced at step 622. In this case, this routine is finished without updating the storage data of the encoder count minimum value Ncntmin. In this manner, during the reverse rotation drive, a minimum value Ncntmin among encoder counts so far occurred is stored in the memory of the ECU 42.

On the other hand, if neither of the two conditions [B-1] and [B-2] is met at step 620, that is, if reversing to normal rotation has been detected during the reverse rotation drive (Ncnt>Ncntmax−ΔNp) and the present energization is second or later energization, the reverse rotation drive execution condition is not satisfied and hence this routine is finished immediately. In this case, the current supply phase Mptn is not updated to prevent reversing to normal rotation. The current supply phase is kept at the preceding phase and current supply is effected for the preceding phase, whereby braking torque is generated in such a direction as to suppress the normal rotation of the rotor 32.

After the present current supply phase determination value Mptn has been determined in the above manner, the current supply processing routine of FIG. 20 is executed. During a feedback control, at step 555 a current supply phase corresponding to a value Mptn % 12 is selected and currents are supplied to the windings 33 and 34 of the selected current supply phase by searching the conversion table in FIG. 21.

Figure 30:
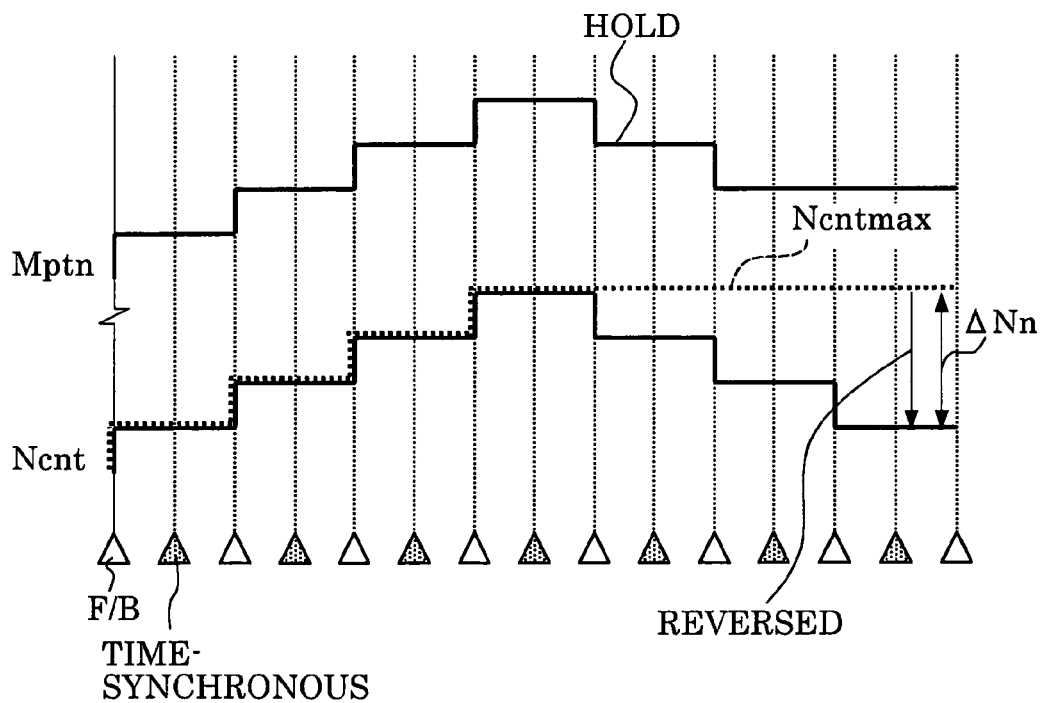
FIG. 30 is a time chart illustrating an exemplary control of a current supply phase holding process in which a dead zone is provided.

FIG. 30 shows an exemplary control in which the dead zone width ΔNn is set to 2 counts. If the encoder count Ncnt is within a dead zone ΔNn corresponding to a maximum value Ncntmax, it is not determined that reversing has occurred and hence current supply phase holding is not effected. In the dead zone ΔNn, as the encoder count Ncnt decreases, the current supply phase Mptn also decreases and the current supply phase is switched accordingly. When the encoder count Ncnt has thereafter decreased past the dead zone ΔNn, a determination result "reversed" is produced and the current supply phase is held at the preceding one.

[Fail-safe Process]

Figure 25:
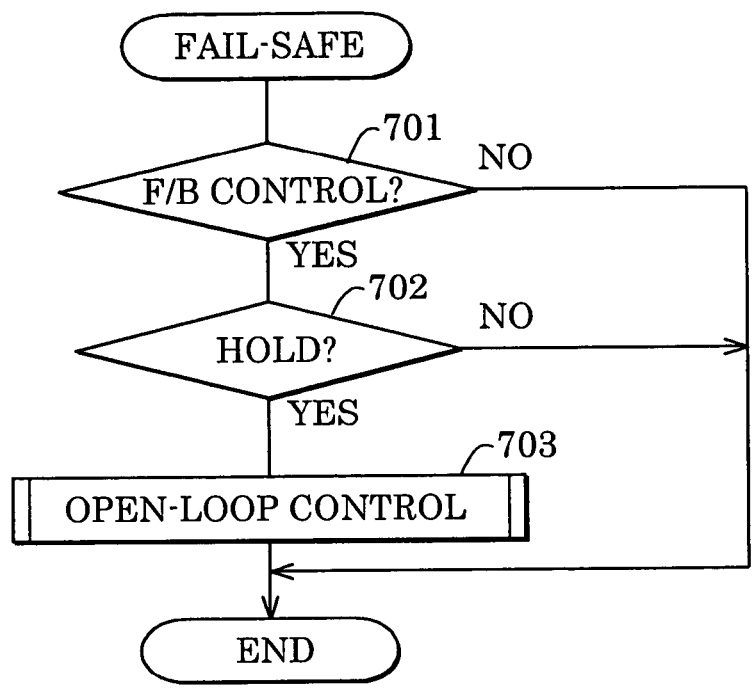
FIG. 25 is a flowchart of a fail-safe processing routine.

A fail-safe processing routine shown in FIG. 25, which is activated in a prescribed cycle, is the open-loop driving process. Upon activation of this routine, it is determined at step 701 whether a feedback (F/B) control is being performed. If a feedback control is not being performed, this routine is finished immediately. If a feedback control is being performed, the routine proceeds to step 702, where it is determined whether current supply phase holding is being effected (i.e., the motor 12 is stopped).

If current supply phase holding is not being effected, this routine is finished immediately. If current supply phase holding is being effected, the routine proceeds to step 703, where switching is made to an open-loop control. In the open-loop control, the current supply phase is switched sequentially without feeding back the encoder count information. Further, the number of times of current supply mode switching is counted and the rotor 32 is rotated to a target position on the basis of the count thus obtained. This processing enables an automatic recovery from a state that the current supply phase is fixed because of detection of reversing to a state that a feedback control can be performed.

In the first embodiment, a time-synchronous current supply phase setting process in which the current supply phase is set in a prescribed cycle on the basis of the encoder count from the start of a feedback control on the SR motor 12 to arrival of the rotor 32 to a target position is executed parallel with the feedback control. Therefore, even if the rotation of the rotor 32 is stopped for a certain reason during the feedback control and the encoder 46 no longer outputs the A-phase signal and the B-phase signal, the time-synchronous current supply phase setting process enables setting of a current supply phase on the basis of an encoder count at that time point and hence the rotor 32 can be rotated to a position that is as close to the target position as possible.

Further, whether reversing has occurred is determined by storing, with updating, a maximum value or a minimum value of the encoder count during a feedback control and comparing a present encoder count with the maximum or minimum value. Therefore, even in a situation that a preceding value of the encoder count of feedback processing is updated by time-synchronous current supply phase setting processing (FIG. 27), reversing can be detected by using the maximum or minimum value of the encoder count. This makes it possible to hold the current supply phase at the preceding one when reversing has occurred in the feedback control, which solves a problem that the rotation direction continues to be reversed by the time-synchronous current supply phase setting processing.

For example, reversing may be detected by determining a rotation direction of the rotor 32 on the basis of the order of occurrence of pulses of the A-phase signal and the B-phase signal.

In determining whether reversing has occurred by comparing a present encoder count with a maximum or minimum value, a dead zone of a prescribed count is set for the maximum or minimum value to avoid producing a determination result "reversed" in the dead zone. Therefore, even if the target position is switched during a feedback control, the dead zone prevents an event that a transient operation of the rotor 32 due to its inertia that is caused immediately after the target position switching is determined as reversing. The rotor 32 can be rotated to a new target position even if the target position is switched during a feedback control.

Figure 29:
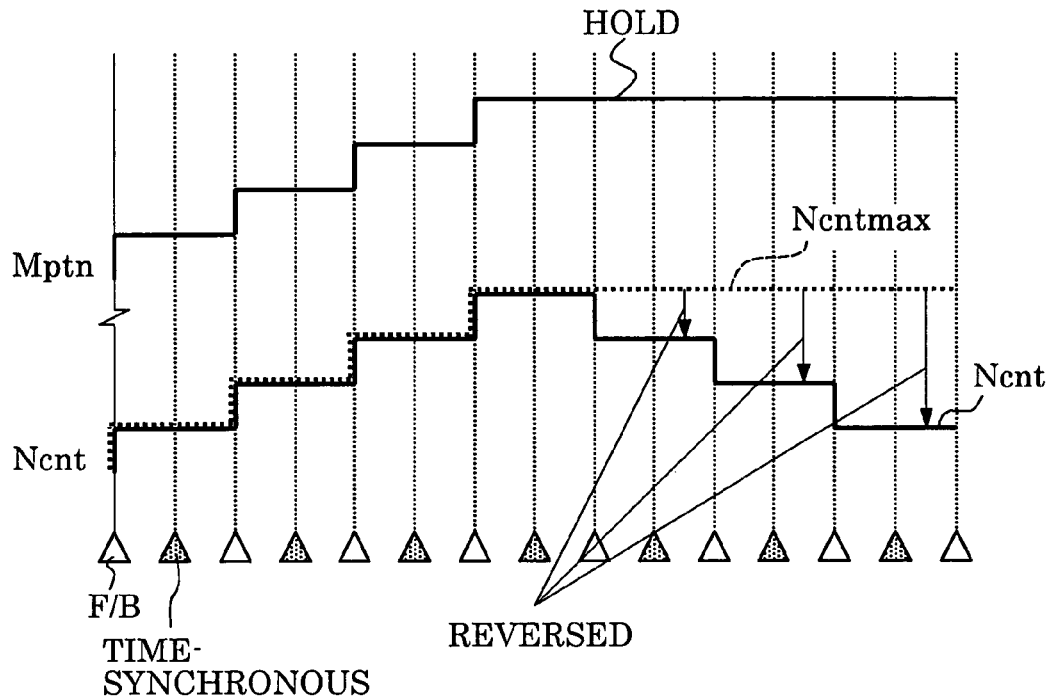
FIG. 29 is a time chart illustrating an exemplary control of a current supply phase holding process in which no dead zone is provided.

This embodiment is not limited to the configuration in which a dead zone is provided. For example, where the invention is applied to a system in which reversing does not tend to occur because of its nature such as a system in which a feedback control is always started from a state that the motor is stopped, the dead zone may omitted as shown in FIG. 29. In this configuration, a determination result "reversed" is produced and the current supply phase is fixed immediately when a present encoder count is smaller than a maximum value even by 1 count (or greater than a minimum value even by 1 count).

Since a time-synchronous current supply phase setting process is executed over the entire period from the start of a feedback control to arrival of the rotor 32 to a target position, even if the rotor 32 is stopped with any timing the time-synchronous current supply phase setting process can set a current supply phase immediately (i.e., without delay) after the rotor 32 is stopped. This provides an advantage that the stop time of the rotor 32 can be shortened.

Alternatively, a time-synchronous current supply phase setting process may be executed until the rotor 32 is rotated to a target position in a period when the rotation speed of the rotor 32 is lower than a prescribed value. This provides an advantage that the computation load of the CPU of the ECU 41 can be reduced, because a time-synchronous current supply phase setting process is executed only when the rotation speed of the rotor 32 has decreased to a speed that may cause a stop of the rotor 32.

(Second Embodiment)

In a second embodiment, if a disconnection is detected in the windings of one phase when a feedback control is started, the first current supply phase is set to one of the other two phases in which no disconnection is detected. More specifically, a phase that follows the disconnection-detected phase (hereinafter referred to as "disconnection phase") in the order of current supply phase switching is set as the first current supply phase. This measure maximizes the number of times of current supply phase switching (i.e., the number of times of energization) that is performed until the disconnection-detected phase is selected as a current supply phase after a feedback control being started. Therefore, the rotation speed of the rotor 32 and hence its inertia is increased sufficiently by a time when the disconnection-detected phase will be selected as a current supply phase, whereby the feedback control can be performed reliably.

Further, in this embodiment, when a feedback control is started, a feedback control start position stopping and holding process for holding the rotor 32 at a feedback control start position by effecting current supply for the first current supply phase for a prescribed time is executed for a prescribed time and then the rotor 32 is rotated by switching the current supply phase. This measure makes it possible to reliably synchronize a rotation position of the rotor 32 at the start of the feedback control with the first current supply phase and to thereby perform the feedback control reliably.

If a disconnection is detected in the windings of one phase, the time of a feedback control start position stopping and holding process (i.e., the current supply time of the first current supply phase) is set longer than in the ordinary case, for the following reason. If the windings of a phase that would be the first current supply phase in the normal case are disconnected, the actual first current supply phase is made different from the first current supply phase in the normal case and hence a deviation exists in the positional relationship between the first current supply phase and the actual rotation position of the rotor 32. Therefore, because of the disconnection, synchronizing the first current supply phase with the rotation position of the rotor 32 takes longer time than in the normal case. If a disconnection is detected in the windings of one phase, the first current supply phase can be synchronized reliably with the rotation position of the rotor 32 by setting the current supply time of the first current supply phase (i.e., the time of the feedback control start position stopping and holding process) longer than in the ordinary case.

The above motor control is performed by the CPU 41a of the ECU 41 of the position switching controller 42 according to the following routine.

[Winding Disconnection Detection]

Figure 32:
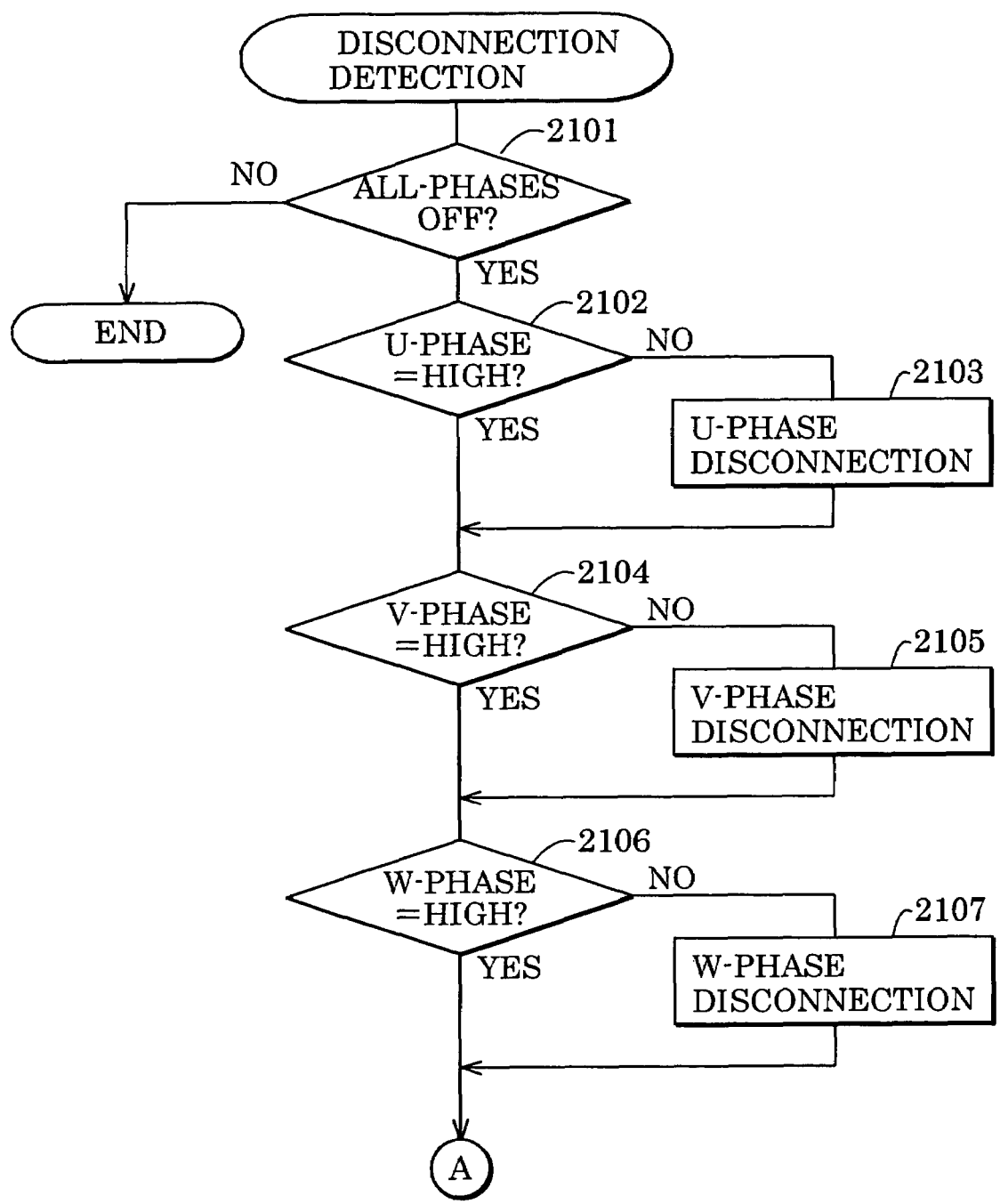
FIGS. 32 and 33 are flowcharts of a winding disconnection detection routine.
Figure 33:
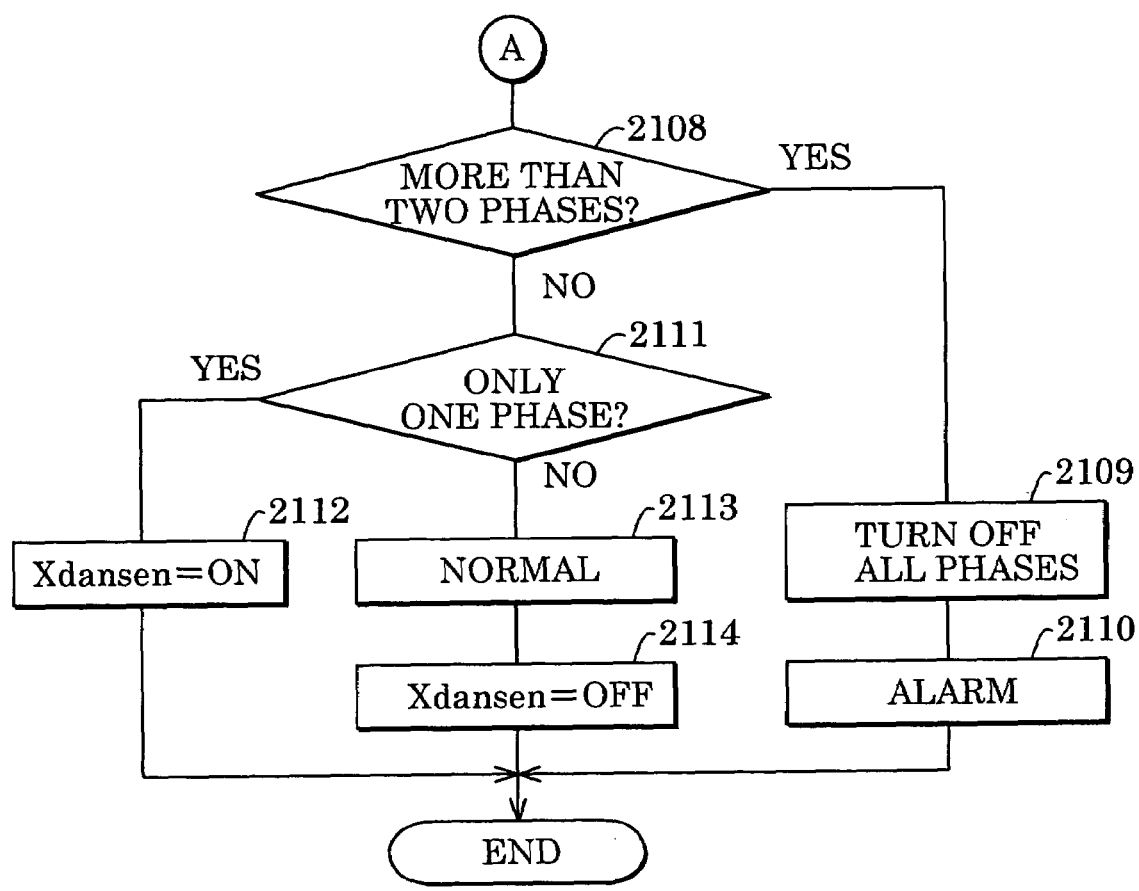

A winding disconnection detection routine shown in FIGS. 32 and 33 is activated in a prescribed cycle (e.g., every 8 ms). This routine detects a possible disconnection in the windings 33 of each phase by the following method.

As shown in FIG. 31, a disconnection detection circuit 60 is provided on the current supply line of the windings 33 of each phase. A voltage level at the connecting point of two resistors 61 and 62 of the disconnection detection circuit 60 of each phase (i.e., a voltage level of the current supply line of each phase) is read into the CPU 41a via each input port of the CPU 41a. Where the windings 33 of each phase is normal (i.e., free of disconnection), when a switching element 39 of a motor driver 37 is turned off, the voltage level of the connecting point of the two resistors 61 and 62 is increased because of the presence of a battery voltage Vb that is applied thereto via the windings 33, whereby the voltage level (hereinafter referred to as "port level") of the corresponding input port of the CPU 41a becomes a high level. When the switching element 39 is thereafter turned on, continuity is established between the connecting point of the two resistors 61 and 62 and the ground via the switching element 39, whereby the port level of the CPU 41a becomes a low level.

On the other hand, where a disconnection exists in the windings 33 of a certain phase, the battery voltage Vb is not applied to the connecting point of the resistors 61 and 62 via the windings 33 even if the switching element 39 is turned off. Therefore, the corresponding port level of the CPU 41a is kept at a low level, that is, it is not inverted to a high level.

On the basis of the above relationships, the CPU 41a of the ECU 41 determines whether a disconnection exists in the windings 33 of the individual phases by determining whether the port levels of the respective phases are at a low level in a state that the switching elements 39 of all the phases are off, that is, none of the windings 33 of all the phases are energized.

Upon activation of the winding disconnection detection routine of FIGS. 32 and 33, it is determined at step 2101 whether current supply is turned off for all the phases. If current supply is not turned off for all the phases, this routine is finished without executing the remaining steps. When current supply is turned off for all the phases later, the routine proceeds from step 2101 to step 2102, where whether the windings 33 of the U-phase are normal (i.e., free of disconnection) is determined on the basis of whether the U-phase port level of the CPU 41a is at a high level. If the U-phase port level is at a low level, the routine proceeds to step 2103, where it is determined that the U-phase windings 33 are disconnected.

Then, the routine proceeds to step 2104, where whether the windings 33 of the V-phase are normal (i.e., free of disconnection) is determined on the basis of whether the V-phase port level is at a high level. If the V-phase port level is at a low level, the routine proceeds to step 2105, where it is determined that the V-phase windings 33 are disconnected.

Then, the routine proceeds to step 2106, where whether the windings 33 of the W-phase are normal (i.e., free of disconnection) is determined on the basis of whether the W-phase port level is at a high level. If the W-phase port level is at a low level, the routine proceeds to step 2107, where it is determined that the W-phase windings 33 are disconnected.

After whether a disconnection exists in the windings 33 of the U, V, and W-phases has been determined in the above manner, the routine proceeds to step 2108 in FIG. 33, where it is determined whether disconnections exist in the windings 33 of two or all of the three phases. If disconnections exist in the windings 33 of two or all of the three phases, the rotor 32 cannot be rotated. Therefore, the routine proceeds to step 2109, where current supply is prohibited for all the phases. At the next step 2110, an alarm message is displayed on an alarm display section 38 of an instrument panel.

On the other hand, if disconnections do not exist in the windings 33 of two or all of the three phases, the routine proceeds to step 2111, where it is determined whether a disconnection exists in the windings of only one phase. If a disconnection exists in the windings of only one phase, the routine proceeds to step 2112, where a one-phase disconnection flag Xdansen is set to "on."

On the other hand, if the determination result at step 2111 is "no," the routine proceeds to step 2113, where it is determined that the windings 33 of all the phases are normal (i.e., free of disconnection). At the next step 2114, the one-phase disconnection flag Xdansen is set to "off."

[Encoder Counter]

Figures 34, 35:
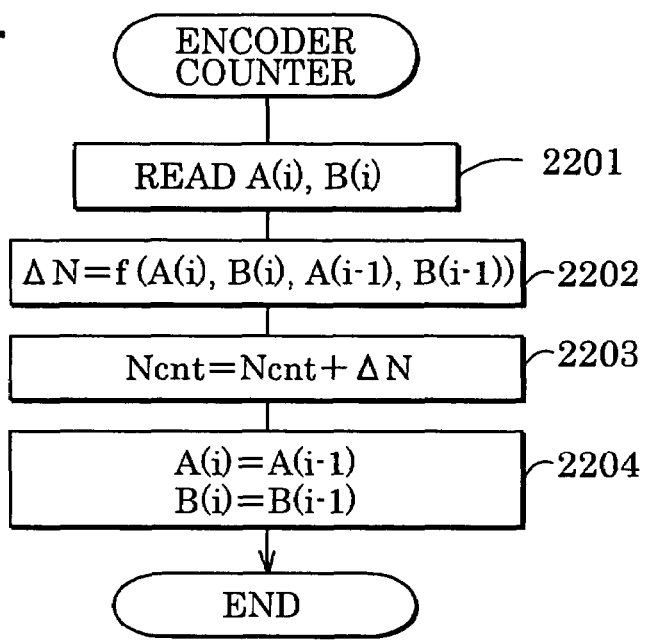
FIG. 34 is a flowchart of an encoder counter routine.
FIG. 35 shows an exemplary count increment ΔN calculation map.

Next, the details of an encoder counter routine shown in FIG. 34 will be described. This routine is activated by The B-phase interruption processing in synchronism with both of rising edges and trailing edges of the A-phase signal and the B-phase signal and counts both of rising edges and trailing edges of the A-phase signal and the B-phase signal in the following manner. Upon activation of this routine, at step 2201, a value A(i) of the A-phase signal and a value B(i) of the B-phase signal are read. At the next step 2202, a count increment $\Delta N$ corresponding to the present values A(i) and B(i) and preceding values A(i-1) and B(i-1) of the A-phase signal and the B-phase signal is calculated by searching a count increment $\Delta N$ calculation map shown in FIG. 35.

Figure 36:
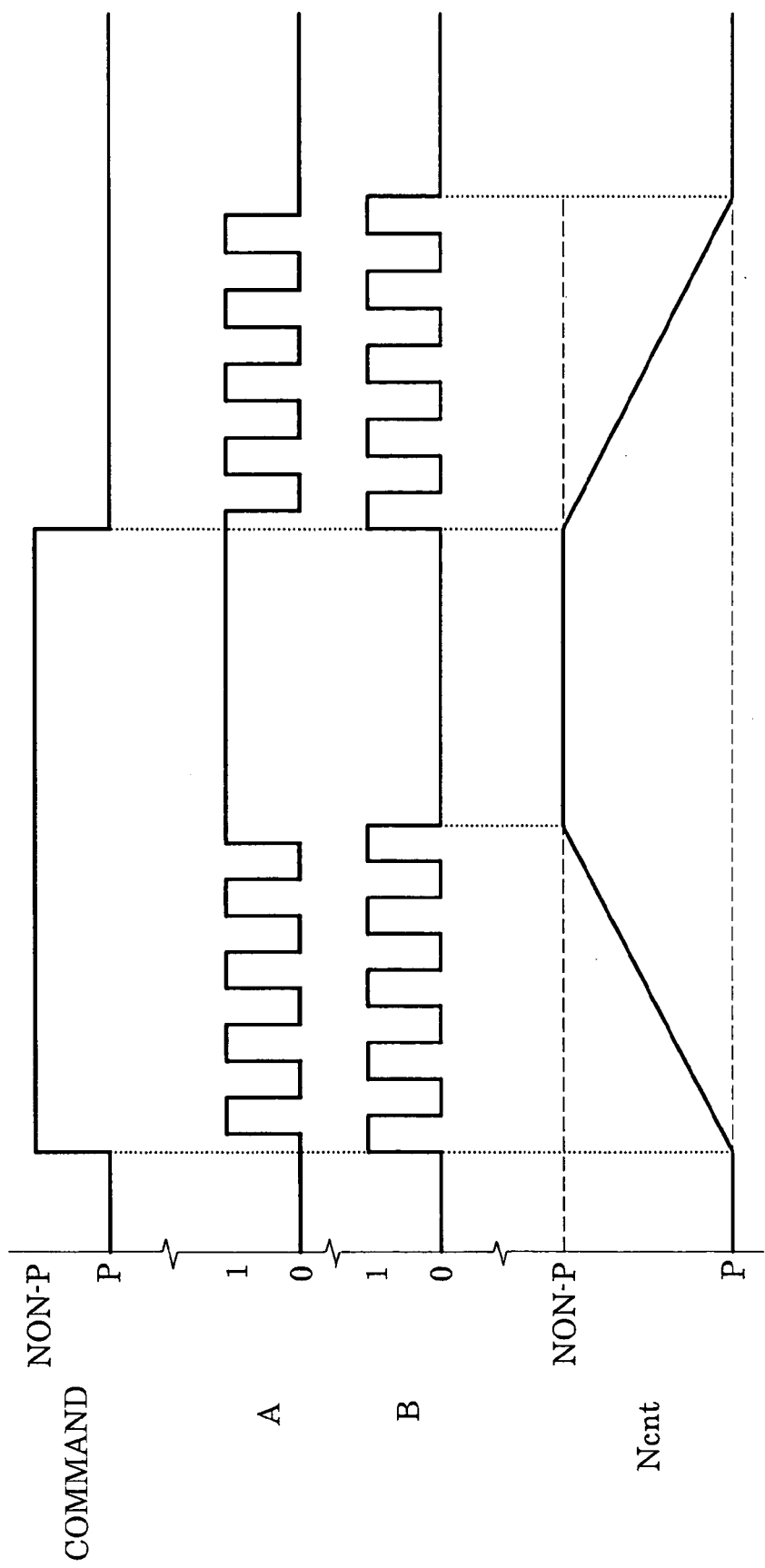
FIG. 36 is a time chart showing a relationship between an instructed shift position, the A-phase signal, the B-phase signal, and an encoder count.

The reason for using the present values A(i) and B(i) and the preceding values A(i-1) and B(i-1) of the A-phase signal and the B-phase signal is to determine a rotation direction of the rotor 32 on the basis of the order of occurrence of pulses of the A-phase signal and the B-phase signal. As shown in FIG. 36, in the case of normal rotation (i.e., the rotation direction from the P-position to the non-P-position), the encoder count Ncnt is increased by giving the positive sign to the count increment $\Delta N$. In the case of reverse rotation (i.e., the rotation direction from the non-P-position to the P-position), the encoder count Ncnt is decreased by giving the negative sign to the count increment $\Delta N$.

After the calculation of the count increment $\Delta N$, the routine proceeds to step 2203, where a new encoder count Ncnt is calculated by adding the count increment $\Delta N$ as calculated at step 2202 to the preceding encoder count Ncnt. At the next step 2204, for the next counting processing, the present values A(i) and B(i) of the A-phase signal and the B-phase signal are stored as values A(i-1) and B(i-1), respectively. This routine is then finished.

[Feedback Control Start Position Stopping and Holding Process]

Figure 37:
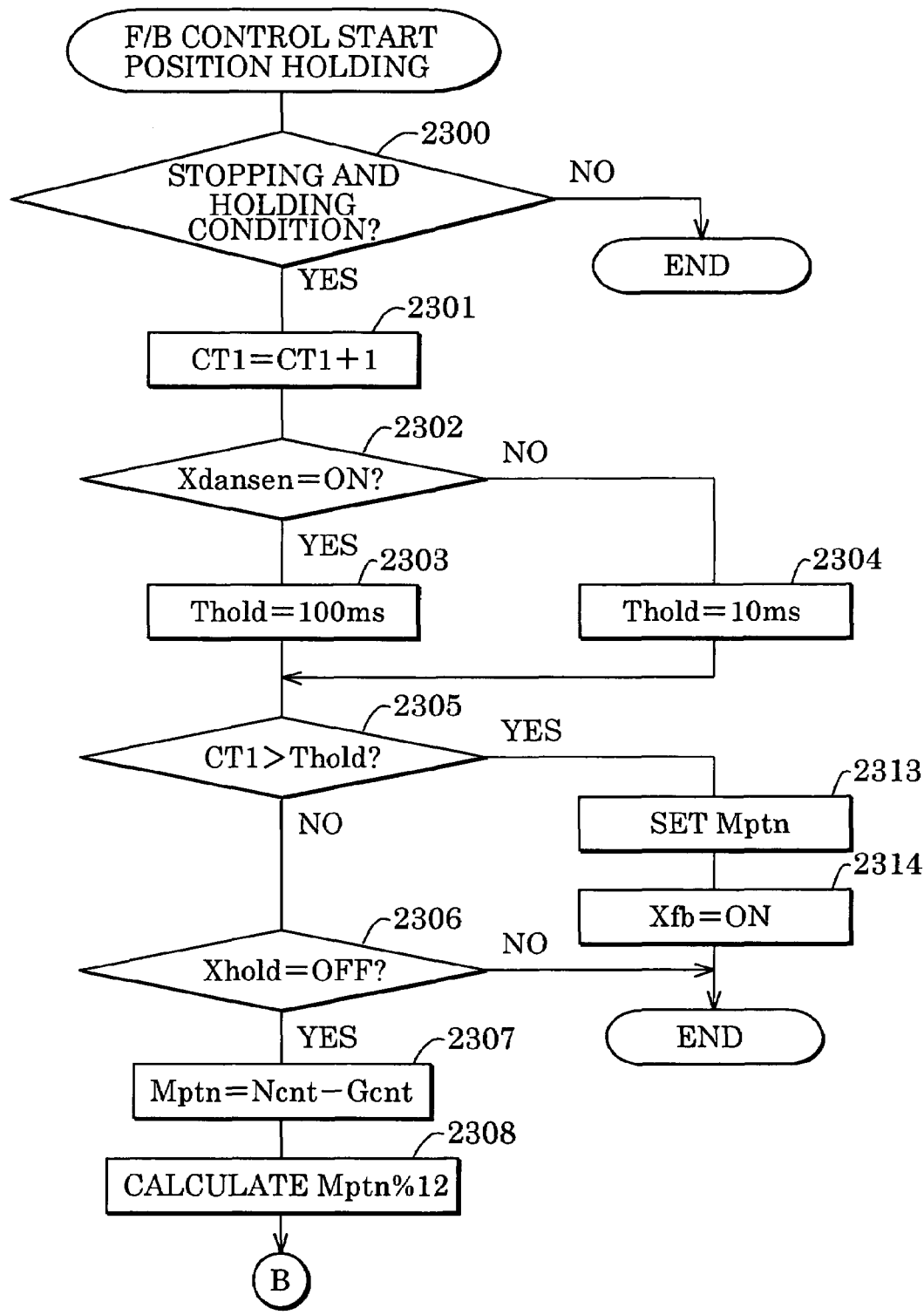
FIGS. 37 and 38 are flowcharts of a feedback control start position stopping and holding process.

A feedback control start position stopping and holding processing routine shown in FIGS. 37 and 38, which is activated in a prescribed cycle (e.g., every 1 ms), sets, in the following manner, a current supply phase determination value Mptn indicating a current supply phase with which to execute a feedback control start position stopping and holding process.

Upon activation of this routine, it is determined at step 2300 whether a feedback control start position stopping and holding process execution condition is satisfied. The feedback control start position stopping and holding process execution condition is satisfied if the following two conditions (1) and (2) are met:

(1) The present time is before a start of a feedback control (i.e., the feedback permission flag Xfb is "off").

(2) The target value of the rotor 32 (i.e., the target count Acnt) has been changed and the absolute value of the difference between the target count Acnt and the encoder count Ncnt (Acnt−Ncnt) is greater than or equal to a prescribed value.

If at least one of the two conditions (1) and (2) is not met, the remaining steps are not executed and this routine is finished.

If both of the conditions (1) and (2) are met, the feedback control start position stopping and holding process execution condition is satisfied. The routine proceeds to step 2301, where the count CT1 of the counter for counting an execution time of the feedback control start position stopping and holding process is incremented. At the next step 2302, it is determined whether the one-phase disconnection flag Xdansen is "on" (i.e., whether the windings 33 of one phase are disconnected). If the one-phase disconnection flag Xdansen is "on," the routine proceeds to step 2303, where the time Thold of the feedback control start position stopping and holding process is set to a time (e.g., 100 ms) that is longer than in the normal case. If the one-phase disconnection flag Xdansen is "off" (i.e., no disconnection), the routine proceeds to step 2304, where the time Thold of the feedback control start position stopping and holding process is set to a relatively short time (e.g., 10 ms).

Then, the routine proceeds to step 2305, where it is determined whether the execution time CT1 of the feedback control start position stopping and holding process has exceeded the time Thold that was set at step 2303 or 2304.

If the execution time CT1 of the feedback control start position stopping and holding process has not exceeded the preset time Thold yet, the routine proceeds to step 2306, where it is determined whether a stopping and holding process current supply phase storage flag Xhold is "off" (not stored), (that is, whether the present time is immediately before a start of a feedback control start position stopping and holding process). If the stopping and holding process current supply phase storage flag Xhold is "off," the routine proceeds to step 2307, where a present position count Ncnt−Gcnt is set as a current supply phase determination value Mptn for the feedback control start position stopping and holding process:

$$Mptn=Ncnt-Gcnt$$

The present position count Ncnt−Gcnt is an encoder count Ncnt as corrected by using a reference position learned value Gcnt, and represents a present position of the rotor 32 correctly. The reference position learned value Gcnt is a learned value of a reference position of the rotor 32 that was learned when power was applied to the ECU 41.

Then, the routine proceeds to step 2038 where the current supply phase determination value Mptn is divided by 12 and a remainder Mptn % 12 is obtained. The number "12" is an increase or decrease of the encoder count Ncnt (i.e., current supply phase determination value Mptn) that occurs when current supply is effected for all the phases around. A current supply phase is determined on the basis of the value Mptn % 12 according to the conversion table shown in FIG. 21.

Figure 38:
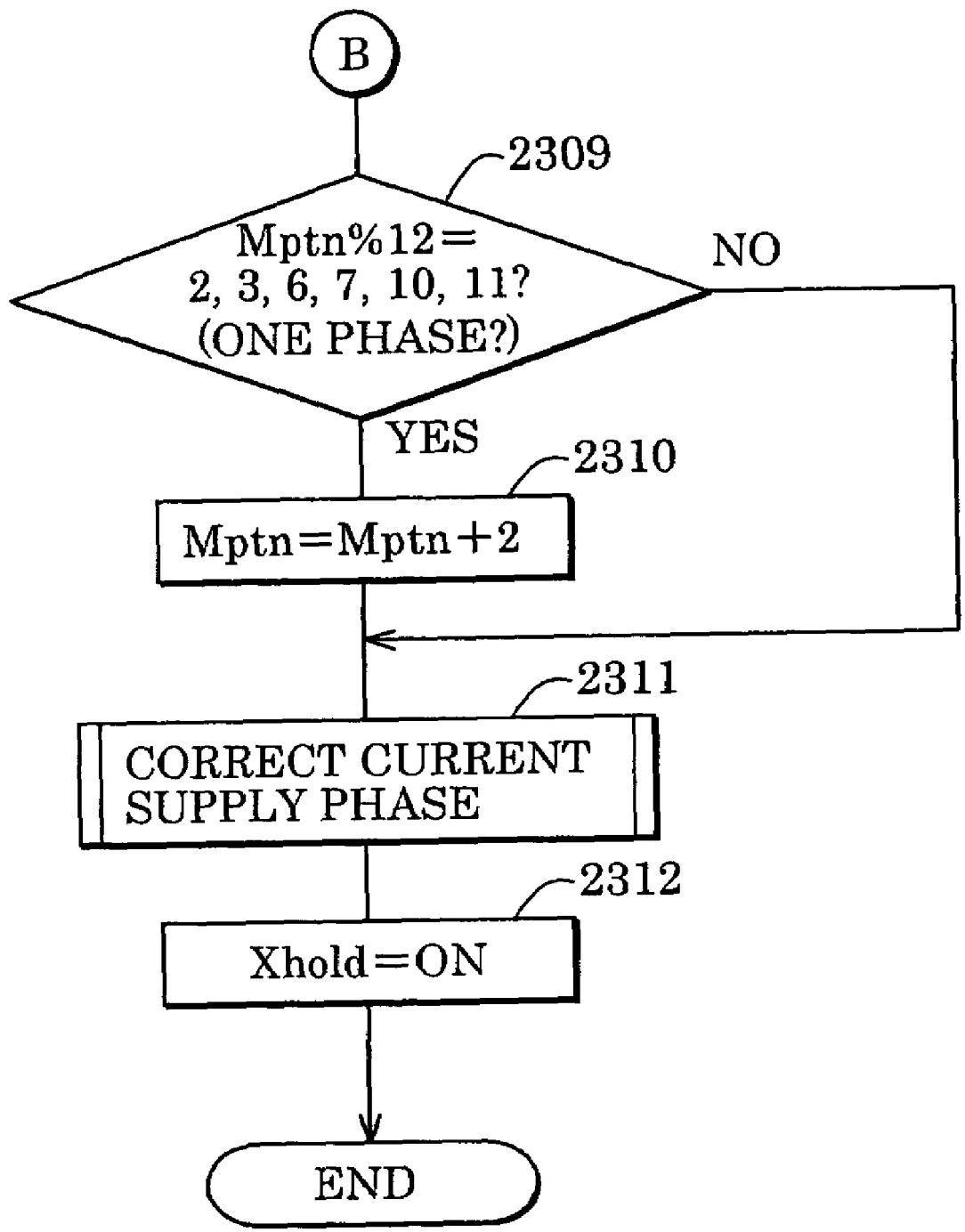

At the next step 2309 in FIG. 38, whether one-phase current supply (U-phase, V-phase, or W-phase) is going to be performed is determined on the basis of whether the value Mptn % 12 is equal to 2, 3, 6, 7, 10, or 11. If one-phase current supply is going to be performed, the routine proceeds to step 2310, where the current supply phase determination value Mptn is incremented by "2" that corresponds to a rotation angle of one energization so that two-phase current supply (U and V-phases, V and W-phases, or U and W-phases) will be performed. Executing the feedback control start position stopping and holding process with two-phase current supply which produces higher torque than one-phase current supply does prevents the rotor 32 from vibrating in the vicinity of a feedback control start position and hence can reliably stop and hold the rotor 32 at the feedback control start position.

At the next step 2311, a one-phase disconnection current supply phase correction routine shown in FIG. 39 (described later) is executed in which the current conduction phase determination value Mptn is corrected if the one-phase disconnection flag Xdansen is "on" (i.e., the windings 33 of one phase are disconnected). The routine proceeds to step 2312, where the stopping and holding process current supply phase storage flag Xhold is set to "on" (stored). This routine is then finished.

When this routine is activated later, the determination result at step 2306 should be "no" and hence steps 2307−2312 are not executed. That is, the processing of setting a current supply phase determination value Mptn indicating a current supply phase with which to execute the feedback control start position stopping and holding process is executed only once immediately before the start of the feedback control start position stopping and holding process.

Then, when the execution time CT1 of the feedback control start position stopping and holding process has exceeded the time Thold that was set at step 2303 or 2304, the determination result at step 2305 becomes "yes," whereupon the feedback control start position stopping and holding process is finished. The routine proceeds to step 2313 in FIG. 37, where a next current supply phase determination value Mptn is set by adding or subtracting a count (e.g., 4 or 3) of a current supply phase of a phase lead that depends on the rotation direction to or from the current supply phase determination value Mptn of the feedback control start position stopping and holding process and a rotation drive on the rotor 32 is started. Then, the routine proceeds to step 2314, where the feedback control permission flag Xfb is set to "on" (feedback control permitted).

[One-phase Disconnection Current Supply Phase Correction]

Figure 39:
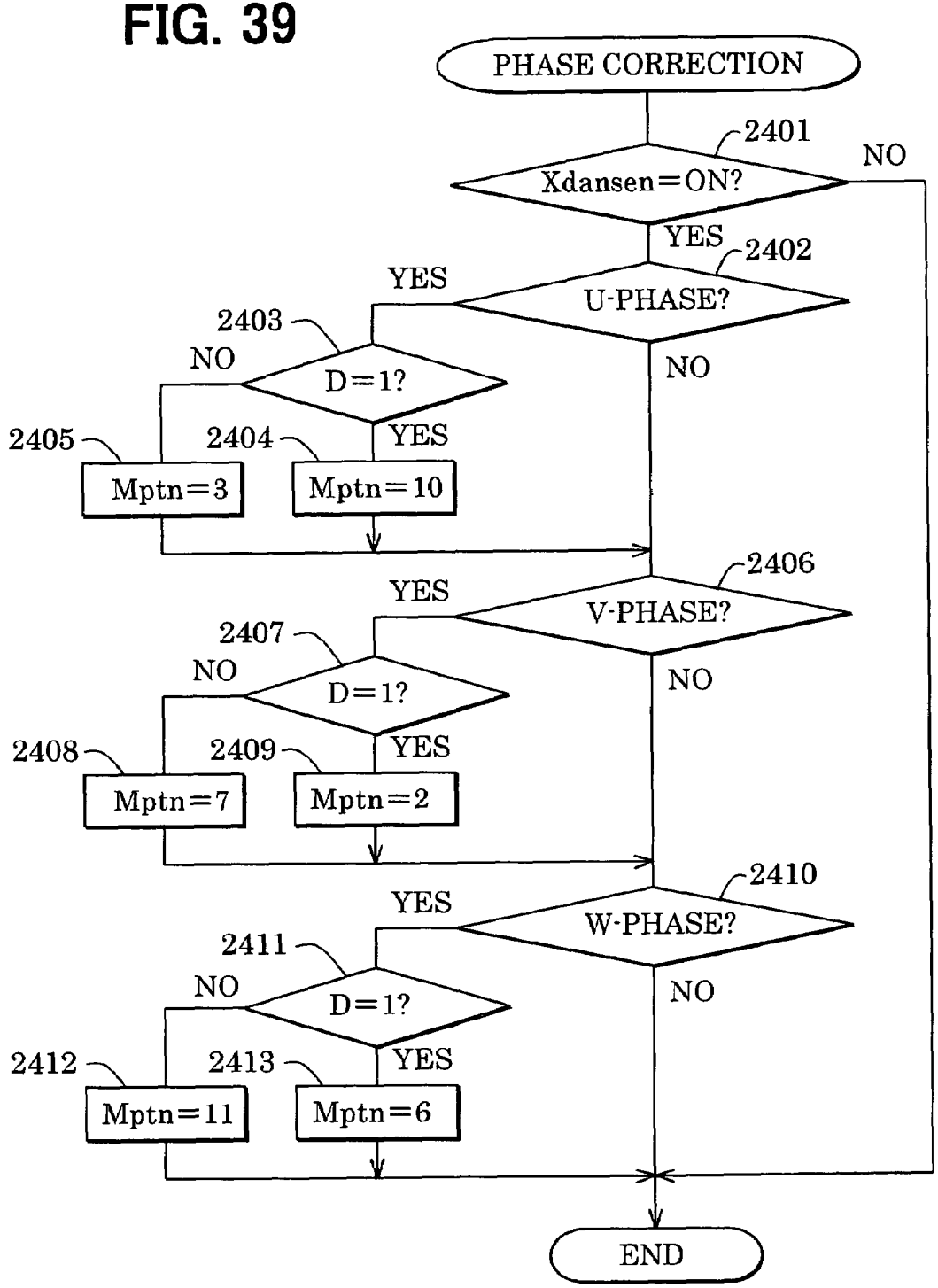
FIG. 39 is a flowchart of a one-phase disconnection current supply phase correction routine.

The one-phase disconnection current supply phase correction routine shown in FIG. 39 is a subroutine that is activated at step 2311 in FIG. 38. Upon activation of this routine, it is determined at step 2401 whether the one-phase disconnection flag Xdansen is "on" (i.e., whether the windings 33 of one phase are disconnected). If the one-phase disconnection flag Xdansen is "off" (no disconnection), this routine is finished without executing the remaining steps.

On the other hand, if the one-phase disconnection flag Xdansen is "on" (the windings 33 of one phase are disconnected), the routine proceeds from step 2401 to step 2402, where it is determined whether the windings 33 of the U-phase are disconnected. If the windings 33 of the U-phase are disconnected, the routine proceeds to step 2403, where it is determined whether the rotation direction instruction value D is equal to "1" that means the normal rotation direction (i.e., the rotation direction from the P-position to the non-P-position). If it is determined that the rotation direction instruction value D is equal to "1" (normal rotation direction), the routine proceeds to step 2404, where the current supply phase determination value Mptn is set to "10" (V-phase). If it is determined that the rotation direction instruction value D is equal to "−1" (reverse rotation direction), the routine proceeds to step 2405, where the current supply phase determination value Mptn is set to "3" (W-phase). With this processing, when a feedback control is started, a phase to which switching should be made from the disconnection-detected phase in the order of current supply phase switching, that is, the U-phase, is set as the first current supply phase (i.e., a current supply phase of a feedback control start position stopping and holding process). As a result, in the case of the U-phase disconnection, the current supply phase is switched in order of V-phase→V and W-phases→W phase→U and W-phases→U-phase→U and V-phases in the case of normal rotation and in order of W-phase→V and W-phases→V-phase→U and V-phases→U-phase→U and W-phases in the case of reverse rotation.

If the windings 33 of the V-phase are disconnected, at steps 2406–2409, the current supply phase determination value Mptn is set to "2" (W-phase) in the case of normal rotation and to 7 (U-phase) in the case of reverse rotation. As a result, in the case of the V-phase disconnection, the current supply phase is switched in order of W-phase→U and W-phases→U phase→U and V-phases→V-phase→V and W-phases in the case of normal rotation and in order of U-phase→U and W-phases→W-phase→V and W-phases→V-phase→U and V-phases in the case of reverse rotation.

If the windings 33 of the W-phase are disconnected, at steps 2410–2413, the current supply phase determination value Mptn is set to "6", (U-phase) in the case of normal rotation and to 11 (V-phase) in the case of reverse rotation. As a result, in the case of the W-phase disconnection, the current supply phase is switched in order of U-phase→U and V-phases→V phase→V and W-phases→W-phase→U and W-phases in the case of normal rotation and in order of V-phase→U and V-phases→U-phase→U and W-phases→W-phase→V and W-phases in the case of reverse rotation.

The current supply phase switching order is finally decided by a current supply phase setting routine shown in FIG. 41 (described later).

[Feedback Control]

Next, the details of a feedback control routine shown in FIG. 40 will be described. This routine is executed by a B-phase interruption processing. In this routine, in a state that a feedback control execution condition is satisfied, the rotor 32 is rotated until its rotation position (i.e., encoder count Ncnt−Gcnt) reaches a position that is 0.5°, for example, short of the target position (i.e., target count Acnt) by switching the current supply phase on the basis of the encoder count Ncnt and a reference position learned value Gcnt.

Figure 40:
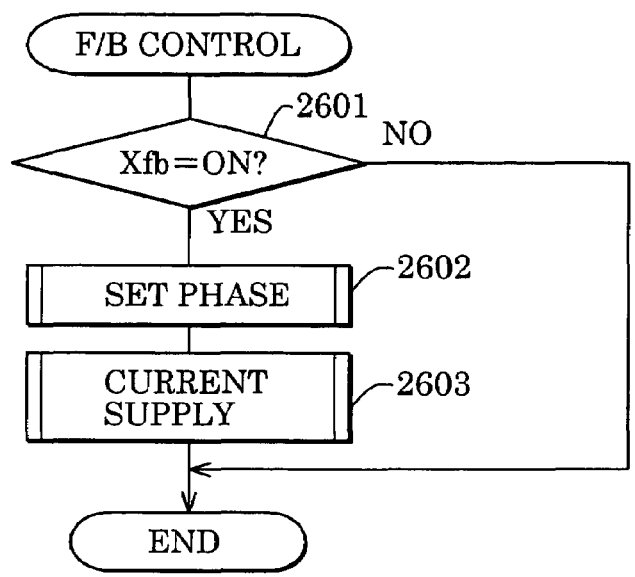
FIG. 40 is a flowchart of a motor feedback control routine.

Upon activation of the feedback control routine of FIG. 40, it is determined at step 2601 whether the feedback permission flag Xfb is "on" (i.e., whether the feedback control execution condition is satisfied). If the feedback permission flag Xfb is "off" (i.e., the feedback control execution condition is not satisfied), this routine is finished without executing the remaining steps.

Figure 41:
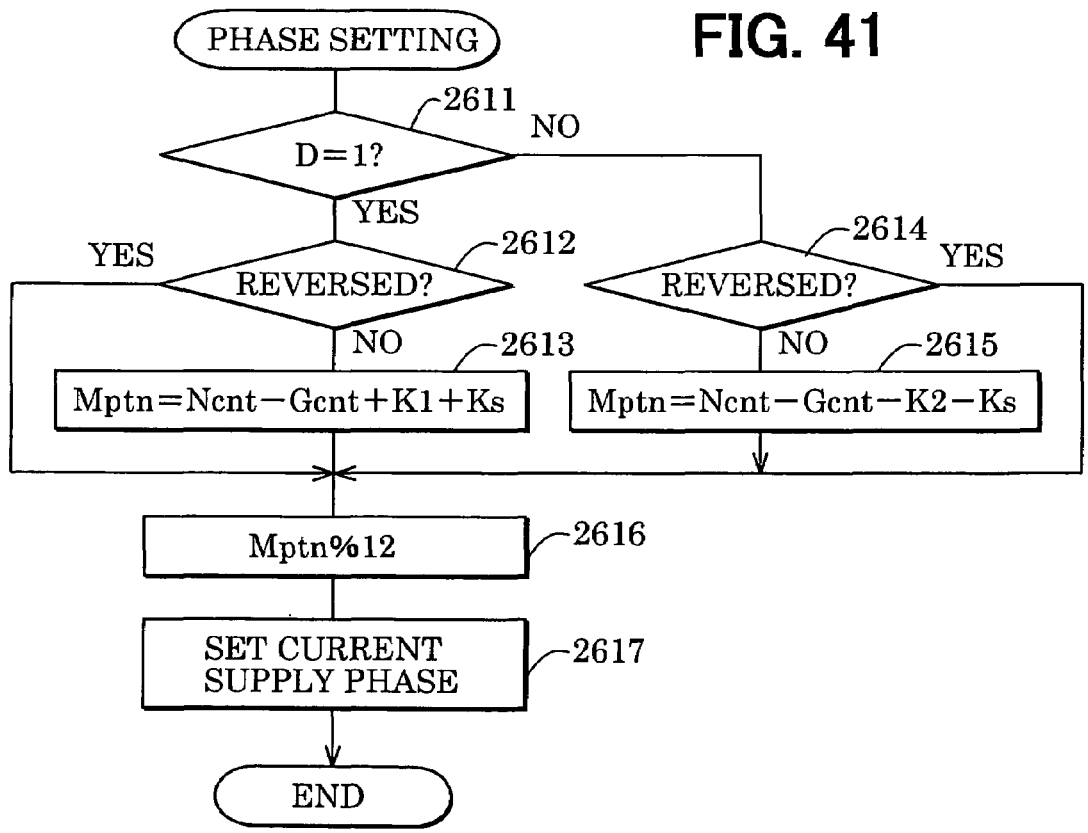
FIG. 41 is a flowchart of a current supply phase setting routine.

On the other hand, if the feedback permission flag Xfb is "on," the routine proceeds to step 2602, where a current supply phase setting routine shown in FIG. 41 is executed, whereby a current supply phase is set on the basis of a present encoder count Ncnt and a reference position learned value Gcnt. At the next step 2603, current supply processing for energizing the windings 33 of the thus-set current energization phase is executed.

[Current Supply Phase Setting]

A current supply processing routine shown in FIG. 41 is a subroutine that is activated at step 2602 of the feedback control routine of FIG. 40. Upon activation of this routine, it is determined at step 2611 whether the rotation direction instruction value D indicating a rotation direction toward the target position is equal to "1" that means the normal rotation direction (i.e., the rotation direction from the P-position to the non-P position). If it is determined that the rotation direction instruction value D is equal to "1" (normal rotation direction), the routine proceeds to step 2612, where it is determined whether the rotation direction of the rotor 32 has reversed (i.e., whether the encoder count Ncnt has decreased) contrary to the rotation direction instruction. If the rotation direction has not reversed, the routine proceeds to step 2613, where the current supply phase determination value Mptn is updated according to the following equation by using a present encoder count Ncnt, a reference position learned value Gcnt, a normal rotation direction phase lead K1, and a speed phase lead correction amount Ks:

$$Mptn = Ncnt - Gcnt + K1 + Ks$$

The normal rotation direction phase lead K1 is a phase lead of the current supply phase that is necessary to rotate the rotor 32 in the normal direction (i.e., a phase lead of the current supply phase with respect to the present position of the rotor 32), and is set to "4," for example.

The speed phase lead correction amount Ks is a phase lead correction amount that is set in accordance with a rotation speed of the rotor 32. For example, the speed phase lead correction amount Ks is set to "0" in a low speed range and is increased to "1" or "2," for example, as the rotation speed increases. As a result, the current supply phase determination value Mptn is corrected so as to indicate a current supply phase that is suitable for a rotation speed of the rotor 32.

On the other hand, if it is determined at step 2612 that the rotation direction of the rotor 32 has reversed contrary to the rotation direction instruction, the current supply phase determination value Mptn is not updated to prevent progress of the reverse rotation. In this case, current supply is effected for the phase for which current supply was effected immediately before the reversing (i.e., the preceding current supply phase), whereby braking torque is generated in such a direction as to suppress the reverse rotation.

If it is determined at step 2611 that the rotation direction instruction value D is equal to "−1" (reverse rotation direction, i.e., the rotation direction from the non-P-position to the P-position), the routine proceeds to step 2614, where it is determined whether the rotation direction of the rotor 32 has reversed (i.e., whether the encoder count Ncnt has increased) contrary to the rotation direction instruction. If the rotation direction has not reversed, the routine proceeds to step 2615, where the current supply phase determination value Mptn is updated according to the following equation by using a present encoder count Ncnt, a reference position learned value Gcnt, a reverse rotation direction phase lead K2, and a speed phase lead correction amount Ks:

$$Mptn = Ncnt - Gcnt - K2 - Ks$$

The reverse rotation direction phase lead K2 is a phase lead of the current supply phase that is necessary to rotate the rotor 32 in the reverse direction (i.e., a phase lead of the current supply phase with respect to the present position of the rotor 32), and is set to "3," for example. The speed phase lead correction amount Ks is set in the same manner as in the case of the normal rotation.

On the other hand, if it is determined at step 2614 that the rotation direction of the rotor 32 has reversed contrary to the rotation direction instruction, the current supply phase determination value Mptn is not updated to prevent progress of the reverse rotation. In this case, current supply is effected for the phase for which current supply was effected immediately before the reversing (i.e., the preceding current supply phase), whereby braking torque is generated in such a direction as to suppress the normal rotation.

After the present current supply phase determination value Mptn has been determined in the above manner, the routine proceeds to step 2616, where the current supply phase determination value Mptn is divided by 12 and a remainder Mptn % 12 is obtained. The number "12" is an increase or decrease of the encoder count Ncnt that occurs when current supply is effected for all the phases around.

After the calculation of the value Mptn % 12, the routine proceeds to step 2617, where a current supply phase corresponding to the value Mptn % 12 is selected by searching the conversion table shown in FIG. 21 and set as a present current supply phase.

Figure 42:
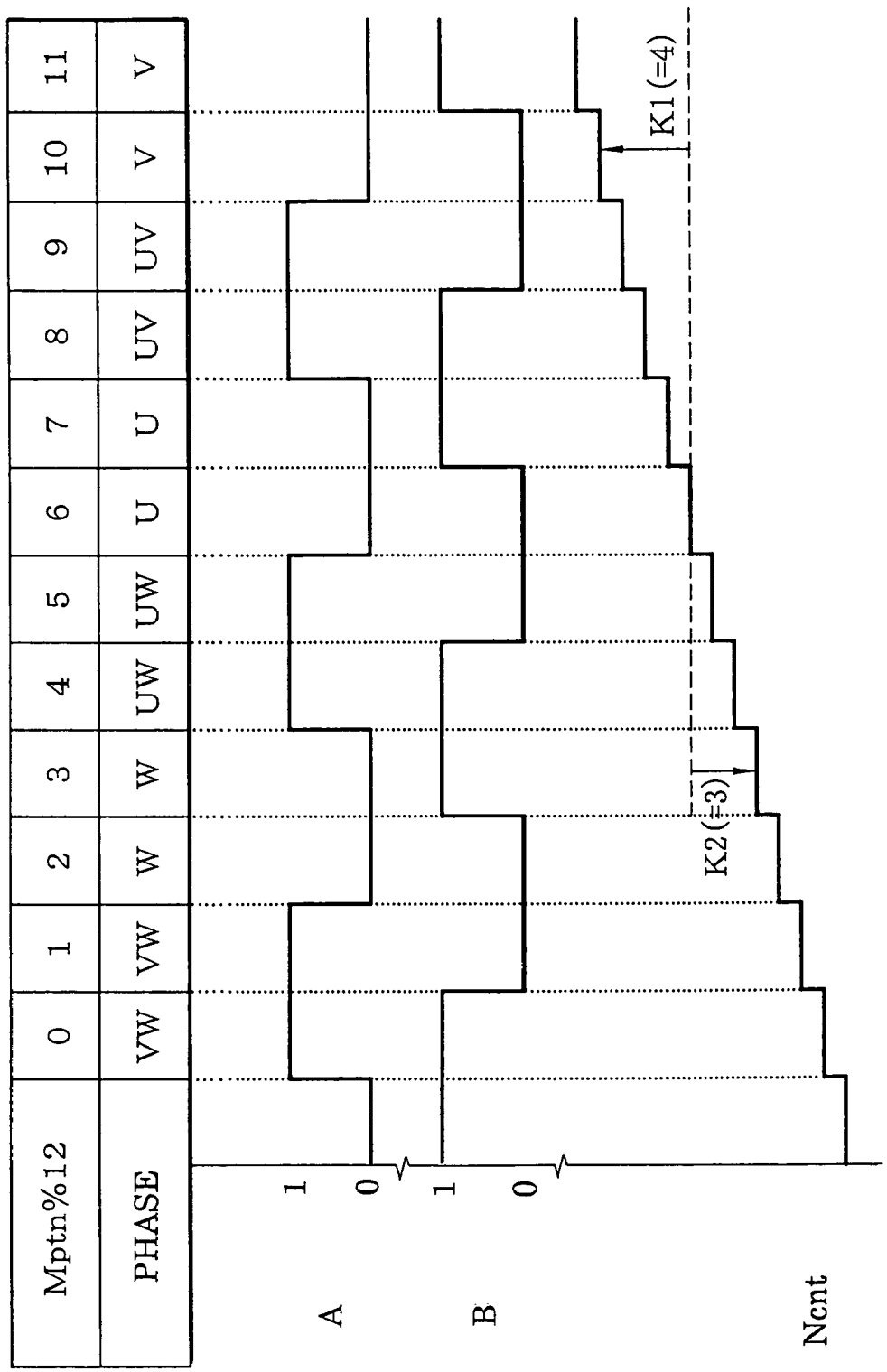
FIG. 42 is a time chart illustrating current supply processing.

FIG. 42 is a time chart illustrating a first current supply phase in a case that rotation is started from the U-phase. In this case, since the speed phase lead correction amount Ks is equal to "0," when normal rotation (i.e., the rotation direction from the P-position to the non-P-position) is to be started, a current supply phase determination value Mptn is calculated according to the following equation:

$$Mptn=Ncnt-Gcnt+K1=Ncnt-Gcnt+4$$

When normal rotation is to be started from the U-phase, the remainder of (Ncnt−Gcnt)/12 is equal to 6 and hence Mptn % 12 is calculated as 6+4=10. The first current supply phase should be the V-phase.

On the other hand, when reverse rotation (i.e., the rotation direction from the non-P-position to the P-position) is to be started from the U-phase, a current supply phase determination value Mptn is calculated according to the following equation:

$$Mptn=Ncnt-Gcnt-K2=Ncnt-Gcnt-3$$

When normal rotation is to be started from the U-phase, Mptn % 12 is calculated as 6−3=3. The first current supply phase should be the W-phase.

As described above, the normal rotation direction phase lead K1 and the reverse rotation direction phase lead K2 are set to 4 and 3, respectively, whereby the current supply phase switching patterns of the normal rotation direction and the reverse rotation direction can be made symmetrical. In either case of the normal rotation direction and the reverse rotation direction, rotation can be started by energizing the windings 33 of a phase that is deviated from the present position of the rotor 32 by two steps.

In the above second embodiment, if a disconnection is detected in the windings 33 of one phase in starting a feedback control of the SR motor 12, the first current supply phase is set to a phase for which no disconnection is detected. Therefore, even if the windings 33 of one phase are disconnected, rotation of the rotor 32 can be started by using the windings of the other phases and a feedback control can be performed. Therefore, the number of systems of drive coils 35 of the SR motor 12 can be decreased to one as in the case of the second embodiment and hence the cost and the size of the SR motor 12 can be reduced.

If a disconnection is detected in the windings 33 of one phase in starting a feedback control, the first current supply phase is set to a phase to which switching should be made from the disconnection-detected phase (disconnection phase) in the order of current supply phase switching. This measure maximizes the number of times of current supply phase switching (i.e., the number of times of energization) that is performed until the disconnection-detected phase is selected as a current supply phase. Therefore, the rotation speed of the rotor 32 and hence its inertia are increased sufficiently by a time when the disconnection-detected phase will be selected as a current supply phase, whereby the feedback control can be performed reliably.

When a feedback control is started, a feedback control start position stopping and holding process for holding the rotor 32 at a feedback control start position by effecting current supply for the first current supply phase for a prescribed time is executed and then the rotor 32 is rotated by switching the current supply phase. This measure makes it possible to reliably synchronize a rotation position of the rotor 32 at the start of the feedback control with the first current supply phase and to thereby perform the feedback control reliably.

Further, if a disconnection is detected in the windings 33 of one phase, the actual first current supply phase is made different from the first current supply phase in the normal case and hence synchronizing the first current supply phase with the rotation position of the rotor 32 takes longer time than in the normal case. In view of the above, if a disconnection is detected in the windings 33 of one phase, the time of a feedback control start position stopping and holding process (i.e., the current supply time of the first current supply phase) is set longer than in the ordinary case. Therefore, the first current supply phase can be synchronized reliably with the rotation position of the rotor 32.

(Third Embodiment)

In the second embodiment, whether a disconnection exists in the windings 33 of each phase is determined by detecting a voltage level of the current supply line of each phase (i.e., a voltage level of the connecting point of the two resistors 61 and 62 of the disconnection detection circuit 60 of each phase). In contrast, in a third embodiment shown in FIGS. 43 and 44, whether a disconnection exists in the windings 33 of each phase is determined by detecting, with a current sensor 63, an energization current flowing through the current supply line of each phase.

Figure 43:
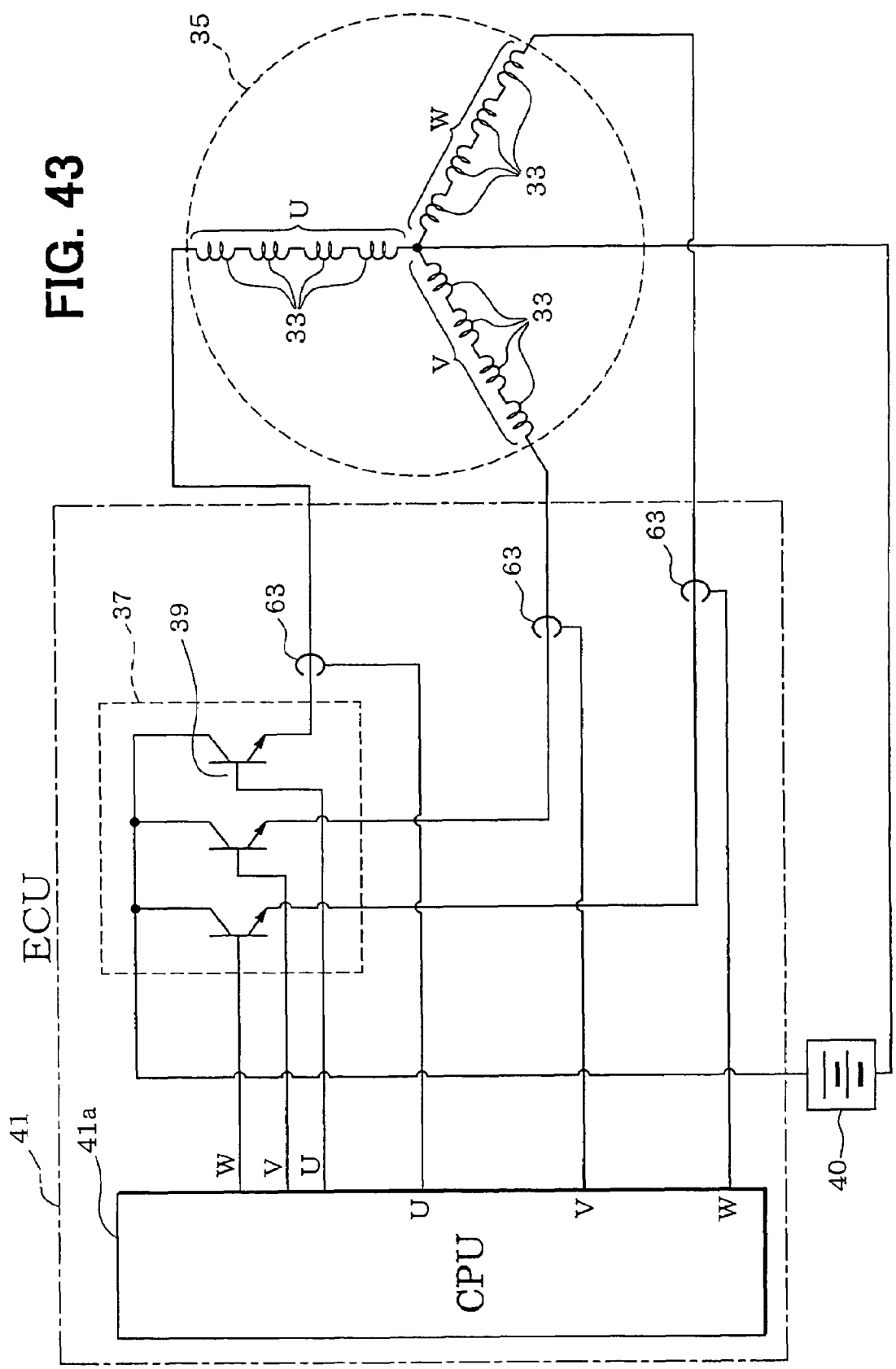
FIG. 43 is a circuit diagram showing a circuit configuration for driving an SR motor according to a third embodiment of the invention.

As shown in FIG. 43, the neutral point of the drive coil 35 is connected to the negative pole of the battery 40 and one end of the windings 33 of each phase is connected to the positive pole of the battery 40 via a corresponding switching element 39 of the motor driver 37. Current supply to the windings 33 of each phase is turned on or off by turning on or off the corresponding switching element 39 of the motor driver 37 by the CPU 41a of the ECU 41.

The current supply line of each phase is provided with a current sensor 63, and an output signal of the current sensor 63 of each phase is input to a corresponding input port of the CPU 41a of the ECU 41.

If the windings 33 of the respective phases are normal (i.e., free of disconnection), an energization current (current supply) is detected by the current sensor 63 of a current supply phase for which a switching element 39 is turned on. However, even if a corresponding switching element 39 is turned on, no energization current flows through the windings 33 of a phase for which the windings 33 are disconnected. Therefore, the current sensor 63 of that phase does not detect an energization current.

On the basis of the above relationships, the CPU 41a of the ECU 41 determines that the windings 33 of the respective phases are free of disconnection if the current sensors 63 of the respective phases detect energization currents when the switching elements 39 of the respective phases are turned on. The CPU 41a determines that the windings 33 of a certain phase are disconnected if the current sensor 63 of that phase detects no energization current even if the switching element 39 of that phase is turned on.

Figure 44:
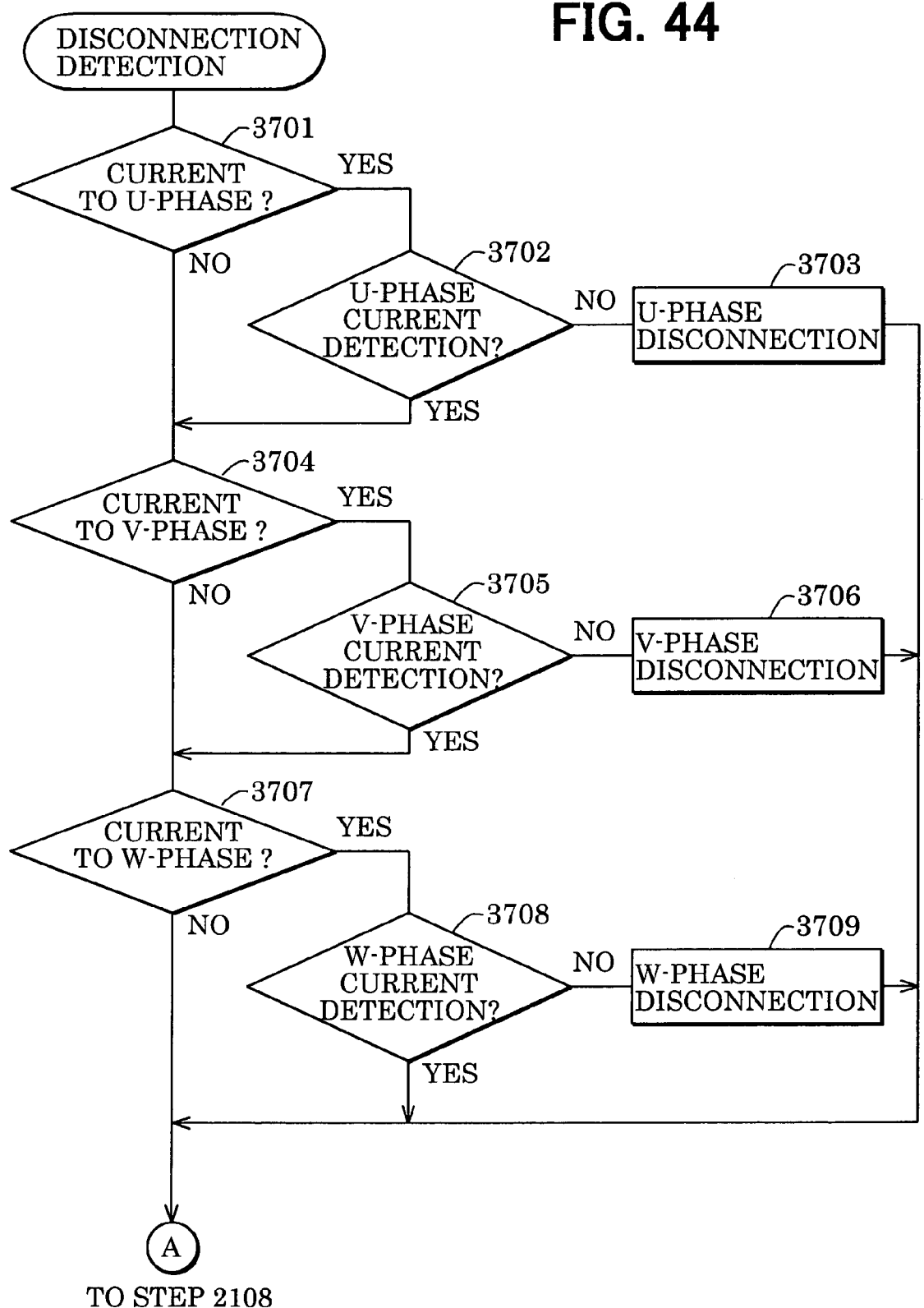
FIG. 44 is a flowchart of a winding disconnection detection routine according to the third embodiment.

The above winding disconnection processing is performed according to a winding disconnection detection routine shown in FIG. 44, which is activated in a prescribed cycle (e.g., every 8 ms). Upon activation of this routine, it is determined at step 3701 whether current supply is being effected for the U-phase (i.e., whether the switching element 39 of the U-phase is on). If current supply is being effected for the U-phase, the routine proceeds to step 3702, where it is determined whether a U-phase energization current has been detected by the U-phase current sensor 63. If no U-phase energization current has been detected, the routine proceeds to step 3703, where a determination result "U-phase disconnection" is produced.

Then, the routine proceeds to step 3704, where it is determined whether current supply is being effected for the V-phase (i.e., whether the switching element 39 of the V-phase is on). If current supply is being effected for the V-phase, the routine proceeds to step 3705, where it is determined whether a V-phase energization current has been detected by the V-phase current sensor 63. If no V-phase energization current has been detected, the routine proceeds to step 3706, where a determination result "V-phase disconnection" is produced.

Then, the routine proceeds to step 3707, where it is determined whether current supply is being effected for the W-phase (i.e., whether the switching element 39 of the W-phase is on). If current supply is being effected for the W-phase, the routine proceeds to step 3708, where it is determined whether a W-phase energization current has been detected by the W-phase current sensor 63. If no W-phase energization current has been detected, the routine proceeds to step 3709, where a determination result "W-phase disconnection" is produced.

After presence/absence of a disconnection in the windings 33 of each phase has been determined in the above manner, step 2108 and the following steps shown in FIG. 33 and described in the second embodiment are executed. If the windings 33 of only one phase are disconnected, the one-phase disconnection flag Xdansen is set to "on." If the windings 33 of two or three phases are disconnected, current supply is prohibited for all the phases and an alarm message is displayed on an alarm display section.

In the third embodiment, the current supply lines of the phases are provided with the current sensors 63, respectively. Alternatively, an energization current flowing through the neutral point of the drive coil 35 may be detected. In this case, only a single current sensor is necessary and hence the cost can be reduced.

Each of the above embodiments employs the one/two-phase energization method in which one-phase current supply and two-phase current supply are performed alternately in a feedback control. Alternatively, the one-phase energization method in which only one-phase current supply is performed or the two-phase energization method in which only two-phase energization is performed may be employed. The encoder is not limited to the magnetic encoder like the encoder 46 and may be an optical encoder or a brush-type encoder, for example. The motor is not limited to the SR motor 12. A brushless motor other than the SR motor may be used as long as it is of such a type that the motor current supply phase is switched sequentially by detecting the rotation position of the rotor on the basis of the count of an encoder output signal.

The position switching device of each of the above embodiments is of such a type that switching is made between two positions, that is, the P-position and the non-P-position. However, for example, the invention can also be applied to a position switching device that switches between positions of P, R, N, D, etc. of an automatic transmission by switching between a position switching valve and a manual valve of the automatic transmission in link with a rotation operation of the detent lever 15.

Further, the invention can be applied to not only position switching devices but also various devices having a brushless motor such as an SR motor as a drive source.

What is claimed is:

1. A motor control apparatus comprising:
    an encoder for producing a pulse signal in synchronism with rotation of a rotor of a motor that rotates a control object;
    an encoder counter for counting a count of the pulse signal of the encoder as an encoder count;
    a controller for sequentially switching a current supply phase of the motor to rotate the rotor to a target position during a feedback control of the motor by detecting a rotation position of the rotor on the basis of the encoder count;
    a first current supply phase setter for setting the current supply phase on the basis of the encoder count in synchronism with pulses of the pulse signal of the encoder during the feedback control of the motor;
    a second current supply phase setter for setting the current supply phase on the basis of the encoder count in a prescribed cycle by time-synchronous processing until the rotor is rotated to the target position;
    a current supply controller for causing, every time the current supply phase is set by each of the first and second current supply phase setter, a current to flow through a winding of the thus-set current supply phase;
    a reversing detector for detecting reversing of a rotation direction of the rotor occurring on its way to the target position; and
    a current supply phase holder for fixing the current supply phase for which current supply is effected by the current supply controller to a preceding current supply phase when the reversing detector has detected reversing.

2. The motor control apparatus according to claim 1, wherein:
    the encoder counter switches between increase and decrease of the encoder count in response to switching between normal rotation and reverse rotation of the rotor; and
    the reversing detector determines whether reserving has occurred by storing, with updating, a maximum value of the encoder count and comparing a present encoder count with the maximum value when the rotor is being rotated in a direction that the encoder count is increased, and determines whether reserving has occurred by storing, with updating, a minimum value of the encoder count and comparing the present encoder count with the minimum value when the rotor is being rotated in such a direction that the encoder count is decreased.

3. The motor control apparatus according to claim 2, wherein the reversing detector sets, in determining whether reversing has occurred by comparing the present encoder count with the maximum value or the minimum value, a dead zone of a prescribed count for the maximum value or the minimum value and does not determine in the dead zone that reversing has occurred.

4. The motor control apparatus according to claim 2, wherein at a start of the feedback control an encoder count at that time is set as an initial value of the maximum value or the minimum value.

5. The motor control apparatus according to claim 1, further comprising:
    an open-loop driver for switching to an open-loop control if the current supply phase holder has detected a state that the current supply phase is fixed, sequentially switching the current supply phase of the motor without feeding back information of the encoder count, counting the number of times of current supply phase switching, and rotates the rotor to the target position on the basis of the counted number of times of current supply phase switching.

6. The motor control apparatus according to claim 1, wherein the motor is a switched reluctance motor.

7. The motor control apparatus according to claim 1, wherein the motor drives a position switching mechanism for switching a position of an automatic transmission of a vehicle.

8. A motor control apparatus comprising:
an encoder for producing a pulse signal in synchronism with rotation of a rotor of a motor that rotates a control object;
a controller for performing a feedback control for rotating the rotor to a target position by detecting a rotation position of the rotor on the basis of a count of the pulse signal of the encoder as an encoder count, and sequentially switching a current supply phase of the motor; and
a disconnection detector for detecting, for each phase, a disconnection in a winding of each phase of the motor,
wherein if the disconnection detector has detected a disconnection in a winding of one phase when the feedback control is started, the controller sets at least first two current supply phases to phases for which no disconnection is detected; and
the controller sets, determining from a predetermined switching order of the current supply phases as the first current supply phase, a phase to which switching should be made from the disconnection-detected phase, if the disconnection detector has detected a disconnection in a winding of one phase when the feedback control is started.

9. The motor control apparatus according to claim 8, wherein the controller prohibits current supply to the motor and causes an alarm display to display an alarm message, if the disconnection detector has detected disconnections in windings of two or more phases.

10. The motor control apparatus according to claim 8, wherein when the feedback control is started, the controller starts the feedback control to execute a feedback control start position stopping and holding process for holding the rotor at a feedback control start position by effecting current supply for the first current supply phase for a prescribed time and to rotate the rotor thereafter by switching the energization phase.

11. The motor control apparatus according to claim 10, wherein if the disconnection detector has detected a disconnection in a winding of one phase, the controller sets a time of the feedback control start position stopping and holding process longer than in an ordinary case.

12. The motor control apparatus according to claim 8, wherein the motor is driven by one system of drive coil in which windings of respective phases are connected to each other.

13. The motor control apparatus according to claim 8, wherein the motor is a switched reluctance motor.

14. The motor control apparatus according to claim 8, wherein the motor drives a position switching mechanism for switching a position of an automatic transmission of a vehicle.

15. The motor control apparatus according to claim 8, wherein setting the phase to which switching should be made from the disconnection-detected phase maximizes the number of times that current supply phase switching is performed until the disconnection detected phase is selected as a current supply phase after feedback control is started.

16. A motor control apparatus comprising:
an encoder for producing a pulse signal in synchronism with rotation of a rotor of a motor that rotates a control object;
a controller for performing a feedback control for rotating the rotor to a target position by detecting a rotation position of the rotor on the basis of a count of the pulse signal of the encoder as an encoder count, and sequentially switching a current supply phase of the motor; and
a disconnection detector for detecting, for each phase, a disconnection in a winding of each phase of the motor,
wherein if the disconnection detector has detected a disconnection in a winding of one phase when the feedback control is started, the controller sets at least first two current supply phases to phases for which no disconnection is detected; and
the controller prohibits current supply to the motor and causes an alarm display to display an alarm message, if the disconnection detector has detected disconnections in windings of two or more phases.

* * * * *